United States Patent [19]

Yamato et al.

[11] Patent Number: 5,680,533

[45] Date of Patent: Oct. 21, 1997

[54] VIDEOGRAPHICS PROGRAM/VIDEO GAME FABRICATING SYSTEM AND METHOD

[75] Inventors: Satoshi Yamato; Toshiaki Suzuki, both of Kyoto-fu, Japan

[73] Assignee: Nintendo Co., Ltd., Kyoto-fu, Japan

[21] Appl. No.: 332,811

[22] Filed: Oct. 31, 1994

[51] Int. Cl.$^6$ ........................................... A63F 9/22
[52] U.S. Cl. .................. 395/173; 395/133; 463/31; 463/24; 463/23; 463/1
[58] Field of Search .................................... 395/133, 173; 364/410 MS File; 273/433 MS File, 434, 435, 436, 437; 463/1, 2, 6, 7, 23, 31, 24

[56] References Cited

U.S. PATENT DOCUMENTS

| | | | |
|---|---|---|---|
| Re. 34,161 | 1/1993 | Nakagawa et al. | 273/85 |
| 3,827,028 | 7/1974 | Schlotterer et al. | 380/4 |
| 4,525,599 | 6/1985 | Curran et al. | 273/460 |
| 4,597,058 | 6/1986 | Izumi et al. | 380/4 |
| 4,652,990 | 3/1987 | Pailen et al. | 380/4 |
| 4,799,635 | 1/1989 | Nakagawa | 380/4 |
| 4,841,291 | 6/1989 | Swix et al. | 345/122 |
| 4,959,861 | 9/1990 | Howlette | 380/4 |
| 5,004,232 | 4/1991 | Wong et al. | 273/435 |
| 5,016,876 | 5/1991 | Loffredo | 273/437 |
| 5,081,676 | 1/1992 | Chou et al. | 380/4 |
| 5,107,443 | 4/1992 | Smith | 395/158 |
| 5,111,409 | 5/1992 | Gasper et al. | 395/152 |
| 5,112,051 | 5/1992 | Darling et al. | 273/148 |
| 5,254,984 | 10/1993 | Wakeland | 345/114 |

(List continued on next page.)

FOREIGN PATENT DOCUMENTS

| | | |
|---|---|---|
| 0 597 316 A2 | 5/1994 | European Pat. Off. . |
| 4-139565 | 5/1992 | Japan . |
| 2 033 703 | 5/1980 | United Kingdom . |
| 2 163 929 | 3/1986 | United Kingdom . |
| 2163929 | 3/1986 | United Kingdom . |

OTHER PUBLICATIONS

Cherry, Wes, Microsoft "Solitaire" program, 1992.
Mendoza, Jonathan, "The Official DOOM Survivor's Strategies and Secrets," 1994, SYBEX, San Francisco, US.
Microsoft Press Computer Dictionary, 2nd Edition, p. 205 (1993).
Terra, "SimCity for Windows", Computer Shopper, v. 12, n. 8, p. 587. Aug. 1992.
Microsoft Windows User's Guide, Version 3.1, pp. 73–75 (1991).
May, *Great Game Add–Ins*, Computer, v15, n10, p. 92(4), Oct. 1993.
Simon, *Windows Shareware*, Windows Sources, v1, n4, p. 79(2), May 1993.

*Primary Examiner*—Heather R. Herndon
*Assistant Examiner*—Joseph R. Burwell
*Attorney, Agent, or Firm*—Nixon & Vanderhye, P.C.

[57] ABSTRACT

A videographics/video game fabricating system includes a multiprocessor based game processor console which includes a main central processing unit (CPU) which controls editing operations and operating system task execution and a game CPU for executing the model video game which is loaded into a pluggable RAM cartridge. The model video game provides a starting point from which a user can readily create an original video game including desired aspects of the model software. The system permits a user to modify any of the game's moving objects, background screens, music or sound effects. The main CPU and game CPU cooperate in the game execution and editorial process such that an editing screen generated by the main CPU is superimposed on a game screen generated by the program executing CPU. The system utilizes unique "unit" based data structures in which moving objects are processed on a unit basis and where each object is assigned a unit ID which is associated with a wide range of object, game characteristics, game processing and location data including status information, present screen display location, object format, character size, pose information, collision threshold information, tempo information, attribute data, and animation data. A wide range of information is likewise stored in data structures associated with background screens referred to as "stage" data.

90 Claims, 50 Drawing Sheets

U.S. PATENT DOCUMENTS

| | | | |
|---|---|---|---|
| 5,282,247 | 1/1994 | McLean et al. | 380/4 |
| 5,307,456 | 4/1994 | MacKay | 395/154 |
| 5,324,035 | 6/1994 | Morris et al. | 273/138 |
| 5,331,417 | 7/1994 | Soohoo | 348/584 |
| 5,337,357 | 8/1994 | Chou et al. | 380/4 |
| 5,357,604 | 10/1994 | San et al. | 395/162 |
| 5,388,841 | 2/1995 | San et al. | 273/435 |
| 5,428,685 | 6/1995 | Kadooka et al. | 380/4 |
| 5,437,464 | 8/1995 | Terasima et al. | 273/434 |
| 5,498,002 | 3/1996 | Gechter | 463/31 |
| 5,498,003 | 3/1996 | Gechter | 463/31 |

TO FIG. 2B

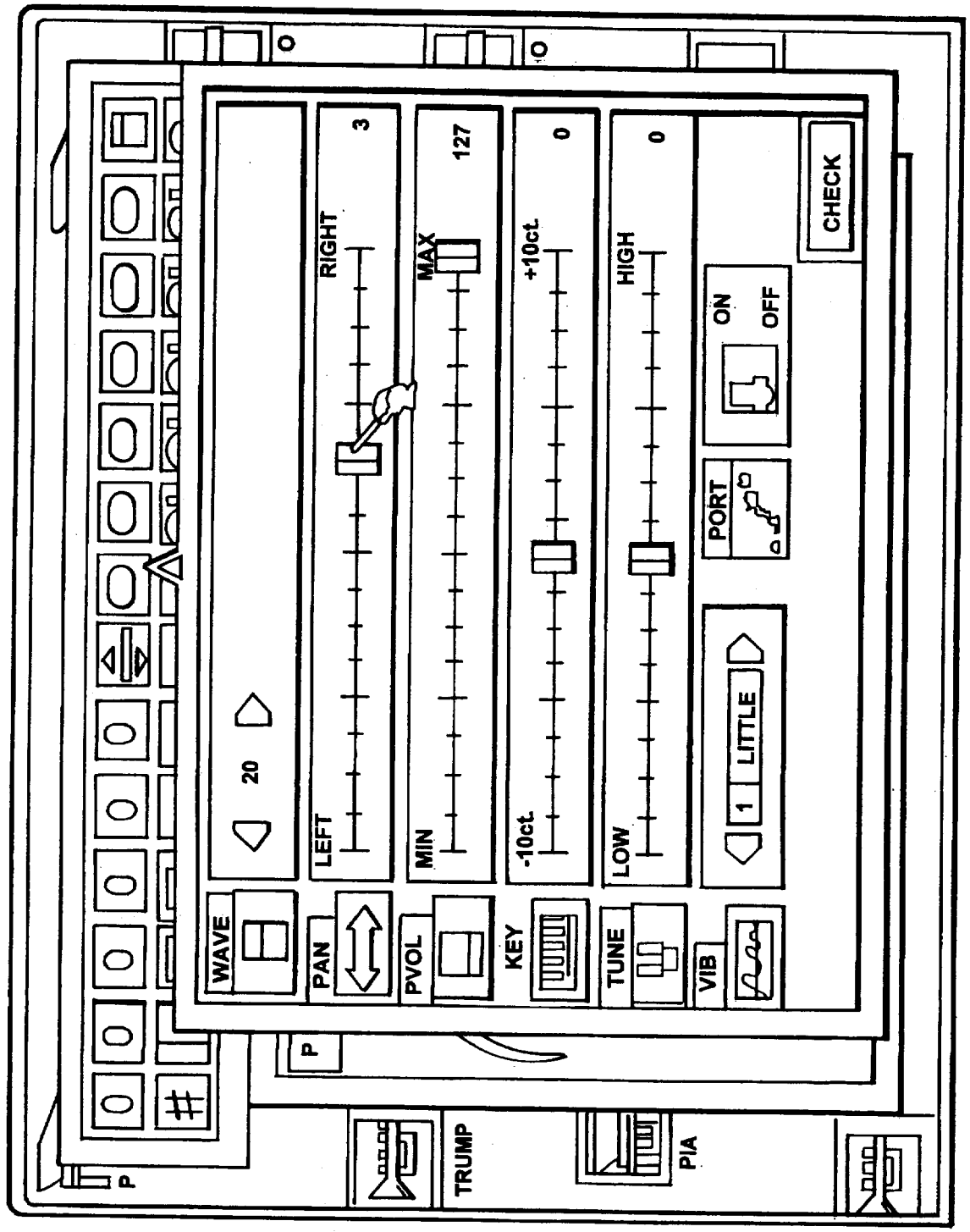

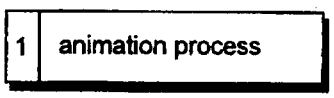
FIG. 30B
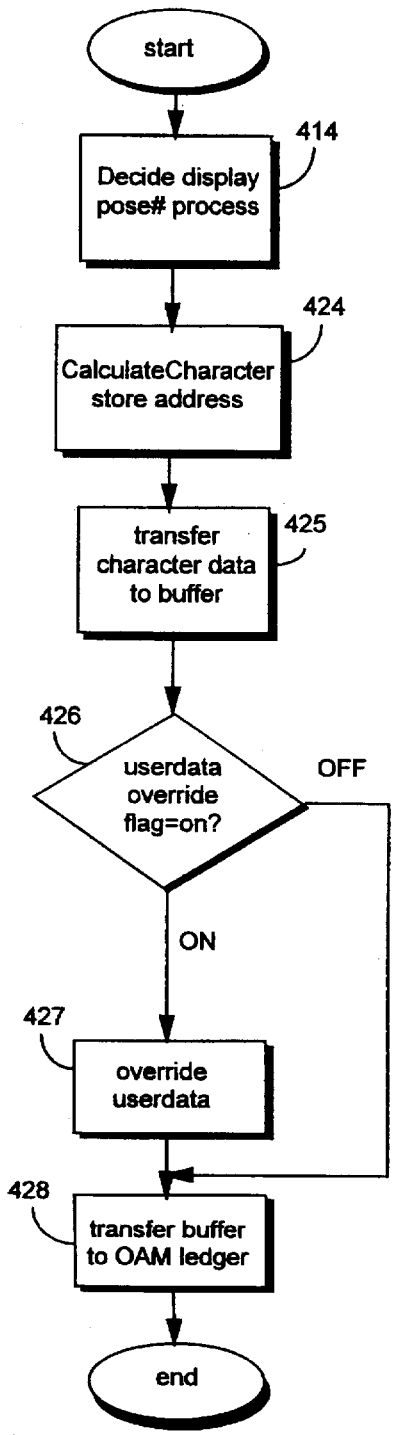
FIG. 30C
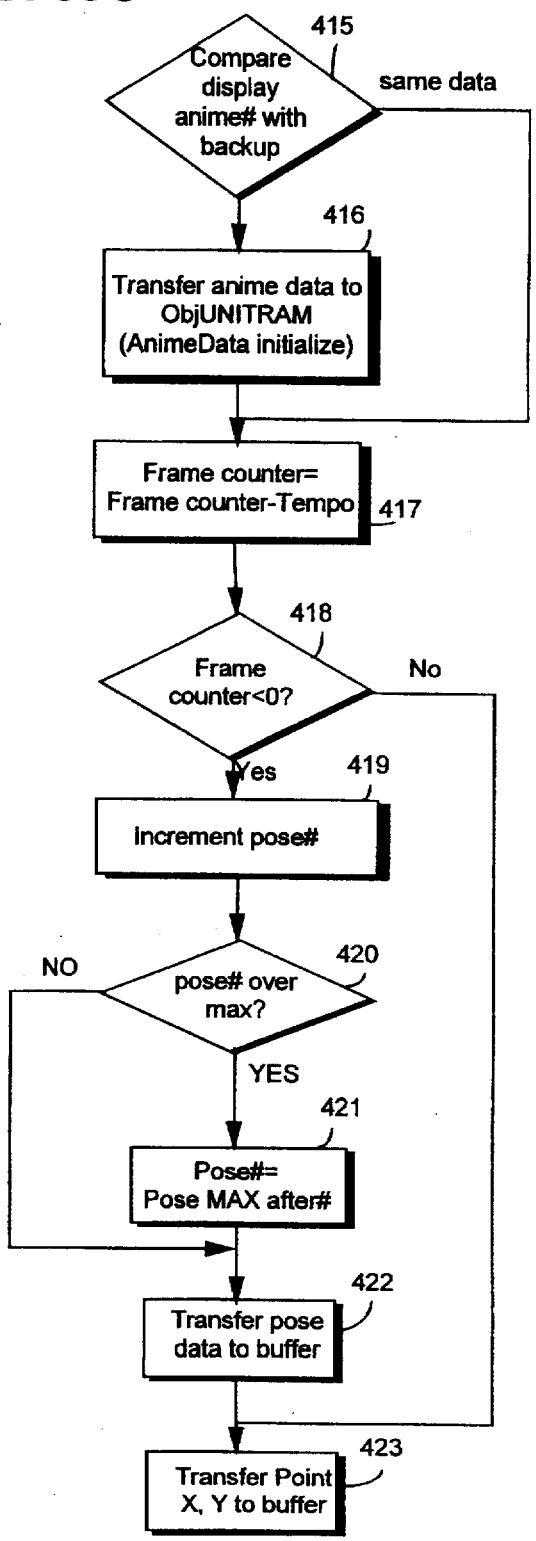

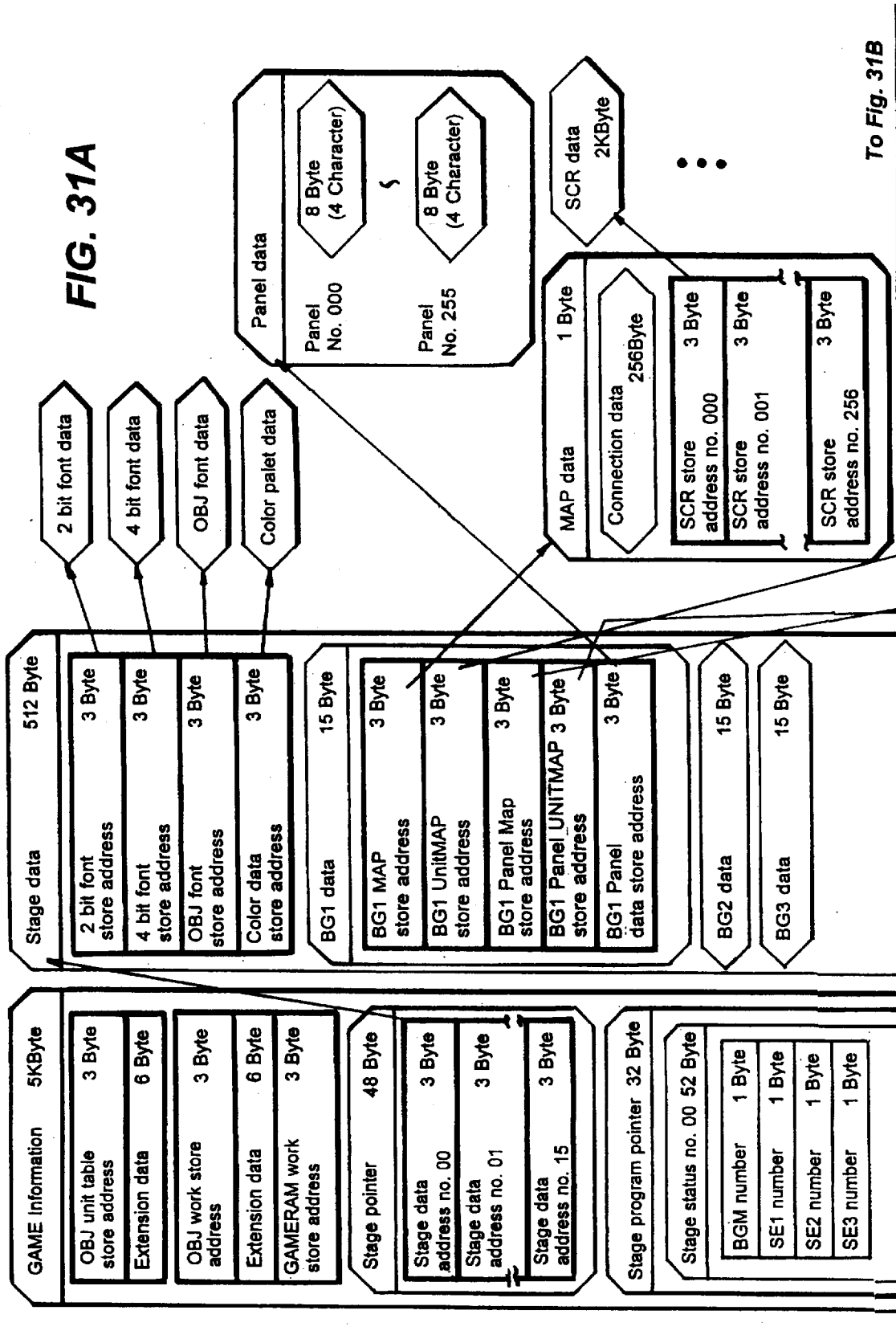

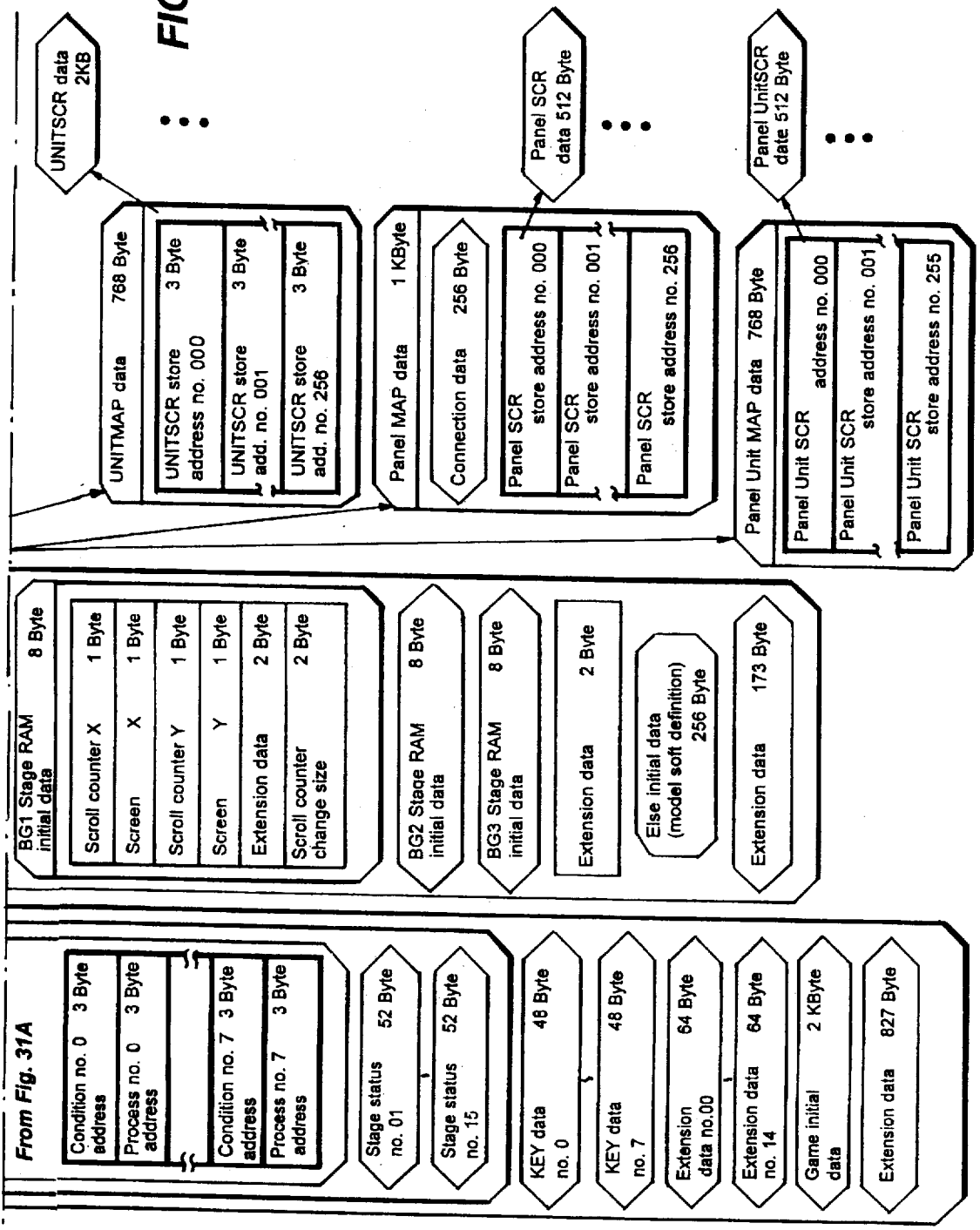

| GAMERAM | 3 K Byte |
|---|---|
| Extention | 1 Byte |
| Stage number | 1 Byte |
| Status register | 1 Byte |
| Status register backup | 1 Byte |

| BG1 | | 12 Byte |
|---|---|---|
| | X point | 3 Byte |
| | Y point | 3 Byte |
| | X speed | 2 Byte |
| | Y speed | 2 Byte |
| | Extention | 2 Byte |

| BG2 | 12 Byte |
|---|---|
| BG3 | 12 Byte |
| Extention | 3 Byte |
| STAGE data | 3 Byte |
| GAME data | 2 KByte |
| Extention | 980 Byte |

| OBJ unit RAM | | 128 Byte |
|---|---|---|
| Unit ID | | 1 Byte |
| Unit ID (backup) | | 1 Byte |
| Status register | | 1 Byte |
| Status register backup | | 1 Byte |
| Point X | | 3 Byte |
| Y | | 3 Byte |
| Extention | | 3 Byte |
| OBJ format | | 1 Byte |
| Character size | | 1 Byte |
| pose MAX | | 1 Byte |
| pose MAX after number | | 1 Byte |
| OBJSIZE | | 1 Byte |
| Hit size | X | 1 Byte |
| | Y | 1 Byte |
| Tempo | Low | 1 Byte |
| | High | 1 Byte |
| Attribute | | 1 Byte |
| Character store address | | 3 Byte |
| frame counter | Low | 1 Byte |
| | High | 1 Byte |
| Display anime number | | 1 Byte |
| Display anime number (backup) | | 1 Byte |
| Display pose number | | 1 Byte |
| Display pose number (backup) | | 1 Byte |
| user aria | flag | 1 Byte |
| | FLIP | 1 Byte |
| | priority | 1 Byte |
| | attribute | 1 Byte |
| anime counter | | 1 Byte |
| Auto program aria | counter | 1 Byte |
| | tempo | 1 Byte |
| | work | 1 Byte |
| | store address | 3 Byte |
| Initial data | | 64 Byte |
| Extention | | 21 Byte |

FIG. 33

| MAIN-TABLE (=M.T.) ||
|---|---|
| CONDITION | PROCESS |
| Routine Address (R.A.) "MUST" | R.A. "Unit Action" |
| R.A. "Enemies Wipe-Out" | R.A. "Go Next Stage" |
| R.A. "Friends Wipe-Out" | R.A. "Go Ending" |
| End Mark | no process |

*FIG. 39*

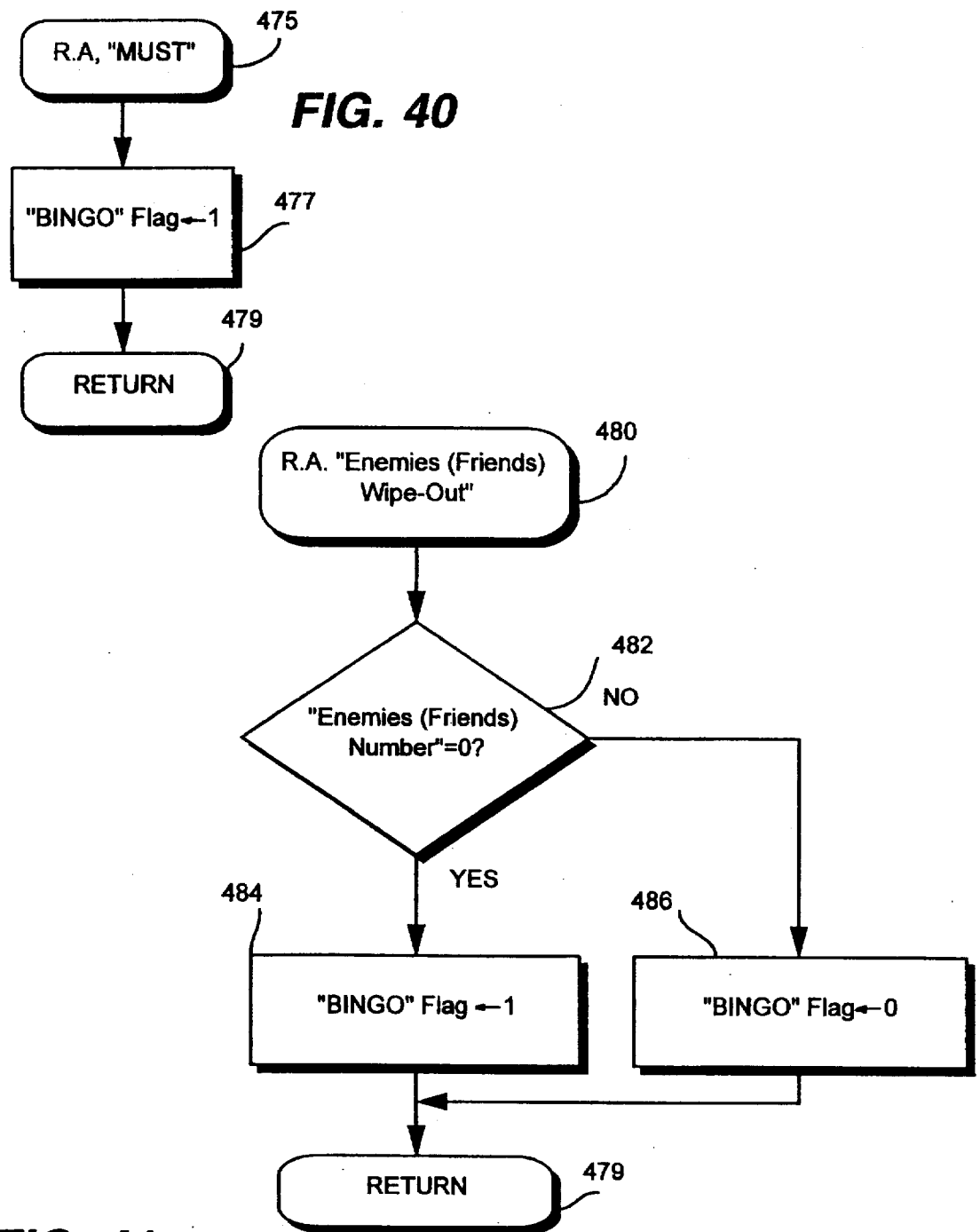

| UNIT ACTION TABLE (= U.A.T.) (ABOUT TURTLE) ||
|---|---|
| condition | process |
| R.A. "MUST" | R.A. "MOVE TO RIGHT" |
| R.A. "TOUCH LINE of RIGHT" | R.A. "WARP TO LEFT" |
| R.A. "BE TREADED" | R.A. "BE TREADED" |
| END MARK | no process |

*Fig. 42*

VIDEOGRAPHICS PROGRAM/VIDEO GAME FABRICATING SYSTEM AND METHOD

FIELD OF THE INVENTION

This invention relates generally to a method and apparatus for generating unique videographic computer programs. More particularly, the present invention relates to a video game fabricating system designed primarily for users who are unfamiliar with computer program or video game creating methodology. Such users may conveniently create a unique video game through an icon driven, interactive computing system that permits a video game to be executed, stopped, edited and resumed from the point where the editing began with the editorial changes persisting throughout the remainder of game play.

CROSS REFERENCE TO RELATED APPLICATIONS

This application is related to the following applications which are being filed concurrently herewith. "VIDEO GAME/VIDEOGRAPHICS PROGRAM FABRICATING SYSTEM AND METHOD WITH SUPERIMPOSE CONTROL", Ser. No. 08/332,813, filed Oct. 31, 1994; "VIDEO GAME/VIDEOGRAPHICS PROGRAM FABRICATING SYSTEM AND METHOD WITH UNIT BASED PROGRAM PROCESSING", Ser. No. 08/332,551, filed Oct. 31, 1994, now U.S. Pat. No. 5,592,609; "VIDEO GAME/VIDEOGRAPHICS PROGRAM EDITING APPARATUS WITH PROGRAM HALT AND DATA TRANSFER FEATURES", Ser. No. 08/332,555, filed Oct. 31, 1994; and "SECURITY SYSTEMS AND METHODS FOR A VIDEOGRAPHICS AND AUTHENTICATION GAME/PROGRAM FABRICATING DEVICE", Ser. No. 08/332,812, filed Oct. 31, 1994, now U.S. Pat. No. 5,599,231. Each of these related applications is hereby incorporated by reference herein.

BACKGROUND AND SUMMARY OF THE INVENTION

Commercially available video game systems permit a user to select, at various points in a game, a wide range of game playing options which control the remainder of game play. For example, a user may control the movement of a display character to exit a display screen in various alternative ways. Depending upon the user's exit choice, the display character enters a different world. Such user selected game playing options are part of the original game program, which is not altered in any way.

In the prior art, a rudimentary attempt has been made to permit a user to modify, in limited respects, the intended manner in which a video game program operates. In this product, a game changing device is physically inserted into a conventional video game cartridge which in turn is coupled to a microprocessor based video game console. The game changing device includes a read-only memory (ROM) storing codes likely to be changed during the course of a game. The device monitors the video game microprocessor's address and data bus and transmits to the microprocessor a replacement code if there is a match with expected values. The replacement code modifies game play characteristics such as the number of lives of a character, the number of missiles which may be fired, etc. The user has no control over a game editing process with this product and has no ability to radically change game play in the manner that is practically realizable in accordance with the present invention. Moreover, game play can only be changed to permit operations and graphic displays originally contemplated within the realm of possible operations by the game programmer.

Professional video game designers have heretofore had access to game program authoring tools to aid in designing an original games. In such programming authoring systems, considerable program designer activity is often required to modify a game under development in even very simple respects. For example, changes that are made to characters in a game are typically first made in an original character array, specified by the artist who formulated the character images. Any change made to characters must then be saved as a new file and transferred to, for example, a program debugging module which introduces the change into the game program under development. Changing the graphics of a game under development even with respect to relatively simple modifications typically involves a complex process of recompiling, reloading and displaying the modification. While a wide variety of sophisticated changes may be made to a game program being authored under the control of conventional authoring programs, such modifications require a high degree of programming sophistication and knowledge of game programming techniques.

In accordance with the present invention, unique video games may be simply created by users ranging from a relatively unsophisticated elementary school students to sophisticated game developers. A unique hardware and software platform enables users to create original games by selecting icons which access more detailed editor screens permitting the user to directly change a wide variety of game display characteristics concerning moving objects and game backgrounds.

Model software containing a model game from a desired genre of games is loaded into a video game RAM cassette and operating system software is loaded into a system RAM via a floppy disk. The present invention permits the user to initiate model game play, stop the game at any desired game screen to initiate a "system break" editing session during which a system window for enabling control over a wide variety of editing features is superimposed on the game screen. The user then selects a moving object or background scene for modification. If, for example, the user selects a moving object, then the moving object selected is identified by a unit number which is associated with a wide range of game play related characteristics. Once the moving object is selected, further icons are displayed permitting the user to completely change the object's character dot pattern for one or more of the poses associated with the object, animation features related to the object, the responses associated with detected game play conditions associated with the object, the collection of statuses associated with each object, the pattern of the object's movement, the sound associated with the pattern of the objects movement and a wide variety of additional game play related characteristics. The screen background may be likewise modified by accessing a stage window permitting the entire background map, the music associated with the background and a wide variety of additional background related features to be edited.

The exemplary embodiment of the present invention uses a multiprocessor based game processor console which includes a main central processing unit (CPU) controlling editing operations and operating system task execution and a game CPU for executing the model video game that is loaded into a pluggable RAM cartridge. The model video game provides a starting point from which a user can readily create an original video game using desired aspects of the model game. The model video game can be readily modified to such an extent it appears to be a completely new game. The system permits a user to modify any of the game's moving objects, background screens, music or sound effects.

The main CPU and game CPU cooperate in the game execution and editorial process such that an editing screen generated by the main CPU is superimposed on a game screen generated by the program executing CPU. The game processing console includes ports connected to a wide variety of peripheral devices including a standard television set, keyboard, game hand controllers, mouse, modem board, an interface board for coupling the game processor to a personal computer system, floppy disk drive, an external RAM game cartridge and a user's ID card.

The system utilizes unique "unit" based data structures in which moving objects are processed on a unit basis and where each object is assigned a unit ID which is associated with a wide range of object, game characteristics, game processing and location data including status information, present screen display location, object format, character size, pose information, collision threshold information, tempo information, attribute data, animation data together with address pointers identifying other processing related information associated with the identified object. A wide range of information is likewise stored in data structures associated with background screens referred to herein as "stage" data. Programming is structured for ease of user editing using condition and process related operation tables and unit pointers that identify object unit data structures which are to be processed. Unit operation tables are utilized for processing the units and identify both a predetermined condition and the processing operation to be performed upon detection of the predetermined condition for each unit. Both condition and process operation may be changed by the user by modifying these tables.

These and other objects, features, aspects and advantages of the present invention will become more apparent from the following detailed description of the illustrative embodiment of the present invention, when taken in conjunction with the accompanying drawings.

BRIEF DESCRIPTION OF THE DRAWINGS

FIG. 15 is an illustrative music editor screen which permits music attributes to be changed for each sound course;

FIGS. 30A through 30D are a flowchart delineating the sequence of operations involved in processing unit data and outputting picture and sound signals to a user's display screen;

FIGS. 31 and 32 depict illustrative first and second model software formats;

FIG. 33 depicts an illustrative memory map of RAM information contents including an object unit RAM information area and a game background related RAM area;

FIG. 39 is an exemplary main table;

FIG. 40 is an exemplary "must" condition processing subroutine;

FIG. 41 shows an exemplary "Enemies Wipe-Out" condition subroutine;

FIG. 42 is an exemplary "unit action" table;

DETAILED DESCRIPTION OF THE DRAWINGS

Figure 1A:
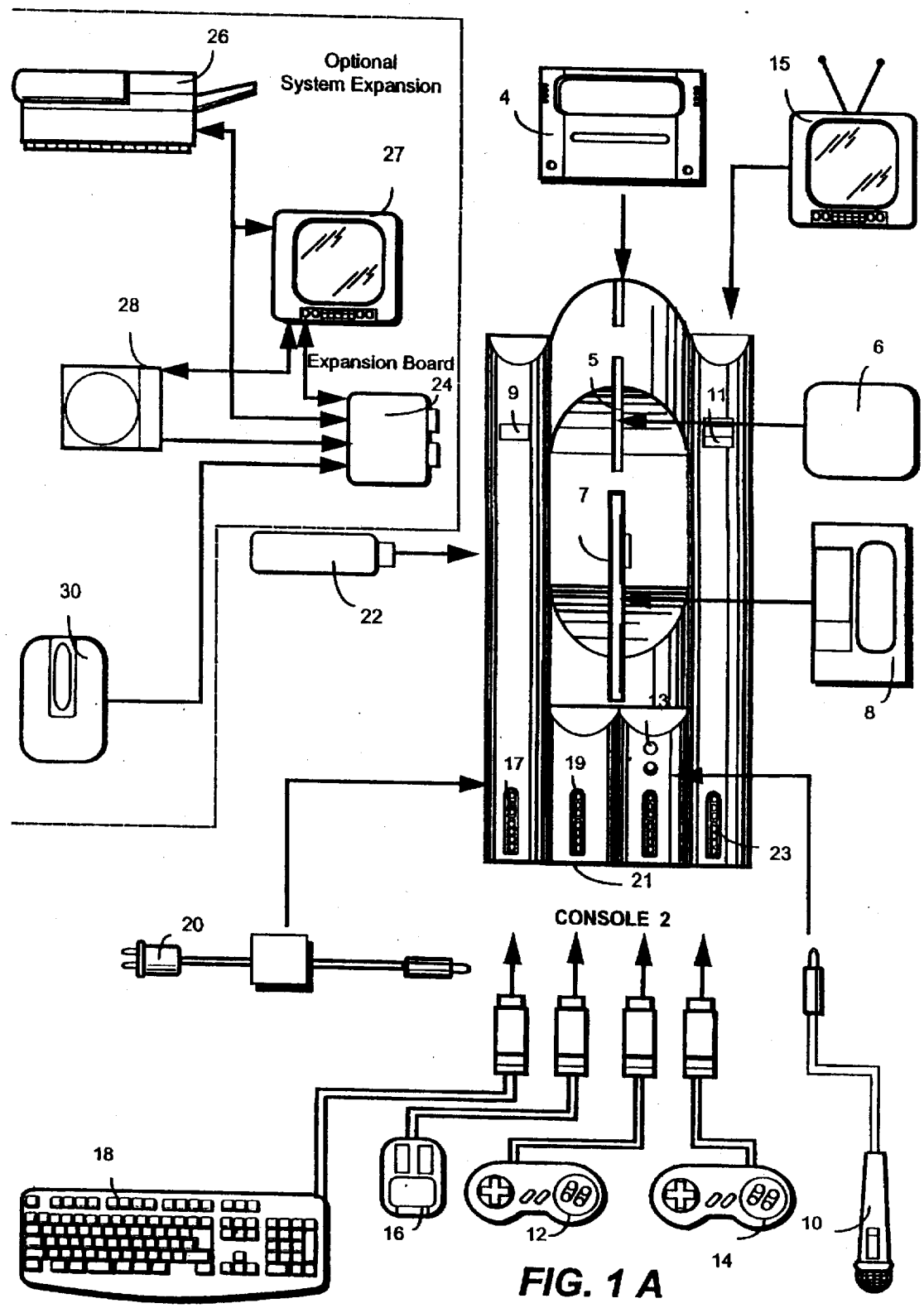
FIG. 1A is a block diagram of a videographics game fabricating system and FIG. 1B is a perspective view of the game processor system console unit 2 shown in FIG. 1A.

FIG. 1A is a general block diagram of a videographics/video game program fabricating system in accordance with an exemplary embodiment of the present invention showing the game processor system unit console 2 and many of the associated input/output devices. The game processor system unit console 2 includes a floppy disk connection port 7 (which is shown in more detail in FIG. 1B) for receiving, for example, a 3.5 inch floppy disk 8. Floppy disk 8 stores "model software" including model game and operating system software. The operating system software, which is described in more detail below, controls the overall operation of the game processor system including controlling the transfer of game program related information to a memory in RAM cassette 4 out of which a game program is executed. The model software embodied on the floppy disk 8 includes basic game program software which assists the user in game making and which the user modifies in fabricating his or her own video game design. It defines the fundamental genre of video games which may be generated, e.g., "shoot-em-up games", "role-playing games", "educational games", "simulation games", etc.. The floppy disk 8 may additionally contain system configuration data which is checked at boot-up to determine whether the system is in the proper configuration.

At any time after the initial transfer of program information from floppy disk 8 to a program RAM in RAM cassette 4, RAM cassette 4 may be removed from the game processor system unit console 2 and utilized in conjunction with a conventional video game system such as, by way of example only, the video game system commercially sold by the applicants' assignee as the Super Nintendo Entertainment System. As will be explained further below in conjunction with FIG. 24, the RAM cassette 4 also includes a security processor of the type shown in applicants' assignee's U.S. Pat. No. 4,799,635. An exemplary security system which may be used in the present invention is described in further detail in the above identified application entitled "SECURITY SYSTEMS AND METHODS FOR A VIDEOGRAPHICS AND AUTHENTICATION GAME/PROGRAM FABRICATING DEVICE", Ser. No. 08/332,812, filed Oct. 31, 1994, now U.S. Pat. No. 5,599,231, which application has been incorporated herein by reference.

The game processor system console unit 2 includes an insertion port 5 for a game processor ID card 6. In an exemplary embodiment of the present invention, the ID card includes a security code which is compared against data stored at a predetermined location on floppy disk 8. If the comparison results in a determination of authenticity, then data from floppy disk 8 may be successfully transferred to RAM cassette 4. Although floppy disk 8 contents may be copied, the user is only issued one ID card 6 to thereby provide a measure of security against counterfeiters. The ID card 6 may also contain the user's photograph and/or other identification data.

The game processor system console unit 2 shown in FIG. 1A is designed to be coupled to a wide variety of input/output devices. It includes a jack for microphone 10 connection to enable the input of sound signals that may be used during game play. Additionally, the game processor system console 2 includes at least two player controllers 12 and 14, which may be of the type described in U.S. Pat. No. 5,207,426. These controllers are utilized to control video game play on a user's television screen by controlling moving object character movement and associated special effects in, for example, the manner typically utilized in commercial available SNES controllers described in the above-identified patent.

The game processor system console 2 additionally includes ports for connecting a conventional mouse 16 and PC compatible keyboard 18. The mouse 16 and keyboard 18 are utilized in a manner which will be described in detail below by the user as graphic/user interfaces during the video game design process. The mouse 16 permits a user such as an elementary school child who is totally unfamiliar with game programming techniques to create a unique video game through the use of the icon driven system described herein. The keyboard 18 permits game modification through input, for example, of game software instructions by more sophisticated users such as game programmers.

The game processor system unit console 2 also includes a connection port for a modem board 22. By way of example only modem 22 is a 9600 baud, half-duplex modem. The modem 22 permits the game processor system to be used in an on-line network described below. The system also includes an A/C adaptor 20 for providing power to the system.

The game processor system unit console 2, as will be described further below, includes two central processing units. One is primarily responsible for video game play control and a second is primarily responsible for game editing related tasks and for executing the operating system program for controlling the transfer of information from the game processor disk 8 to RAM cassette 4.

The system components shown in FIG. 1A and described above permit a user who is totally unfamiliar with video game program development to create a wide range of video games using model software stored on floppy disk 8. Through the use of the optional components identified in FIG. 1A, the system may be expanded to more readily permit professional game program designers to create video games in a unique emulation system. In this alternative embodiment, the game processor system includes an expansion board 24 which couples further I/O and other components to, for example, the operating system CPU within console 2. As shown in FIG. 1A, various additional I/O components may be coupled to the system such as a scanner 30, hard disk drive 28 or printer 26. Scanner 30 may be a conventional optical scanner and is utilized to scan a graphical image, digitize the image for storage in the game processor system unit's console memory system for use in a video game being designed. A user would then be able to access the stored image, add colors and modify the image. An SCSI interface may be embodied on expansion board 24 to permit coupling to an IBM compatible PC 27.

Figure 1B:
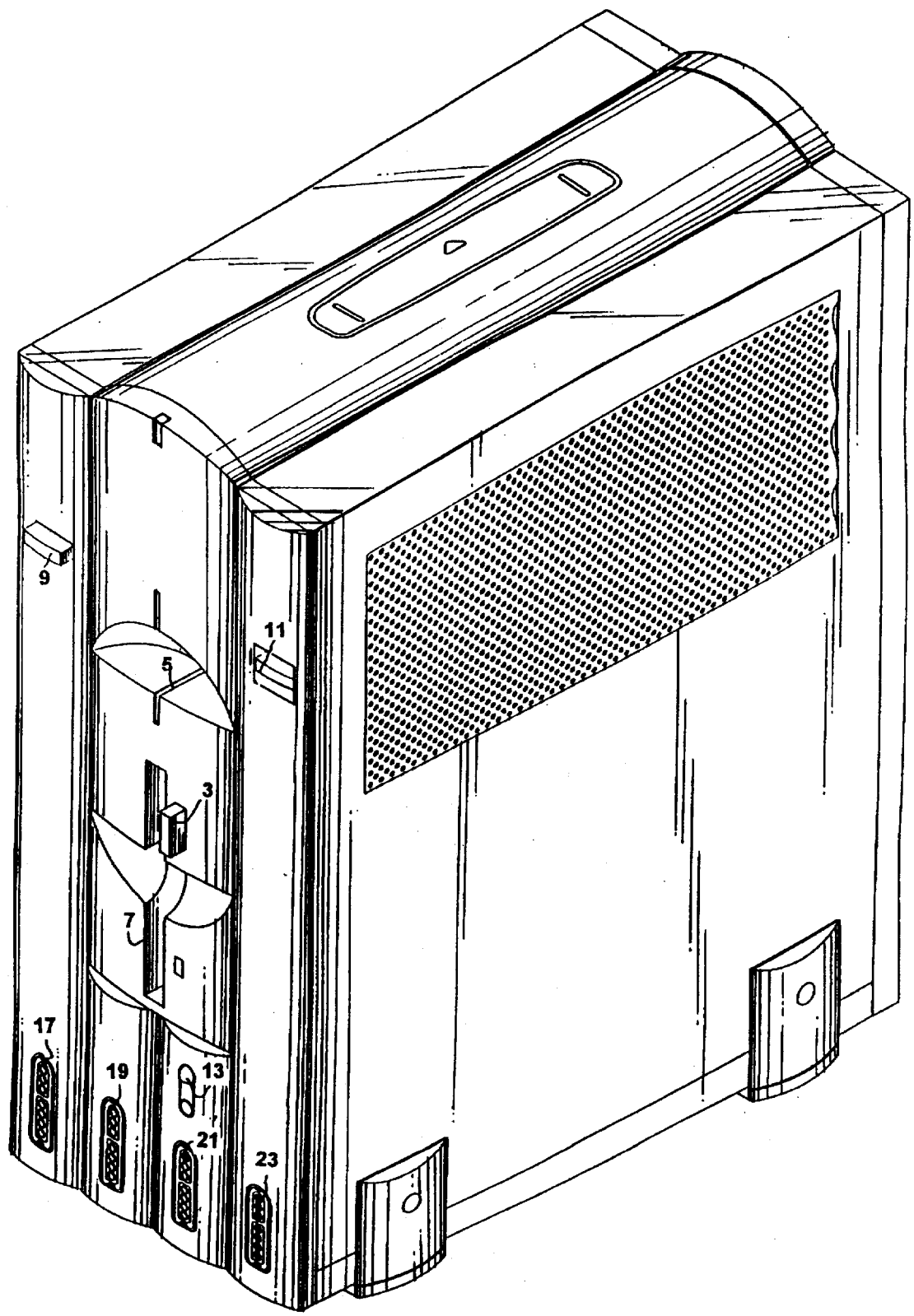

FIG. 1B is a perspective view of the game processor system console unit 2. The console 2 includes a power ON/OFF switch 11 and a reset button 9. The reset switch 9 permits resetting the entire system including the operating system executing CPU and the game CPU. The reset button 9 in addition to placing the game program executing CPU at a known initial state also serves to interrupt the operating system CPU to permit, for example, testing operations to be performed. As shown in FIGS. 1A and 1B receptacles 5 and 7 are slots for receiving the game processor ID card 6 and the floppy disk 8, respectively. Both receptacles 5 and 7 have associated recessed areas to permit a user to easily grab and extract the respective ID card 6 or floppy disk 8. The floppy disk receiving mechanism is further described in the above identified copending application (Attorney Docket No. 723-312), which application has been incorporated herein by reference. As shown in FIG. 1B, the console unit also includes a floppy disk eject button 3. Additionally, as shown in FIGS. 1A and 1B, connectors 13, 17, 19, 21 and 23 are exposed to permit ready connection of microphone 10, keyboard 18, mouse 16, controller 12 and controller 14, respectively.

Figure 2A:
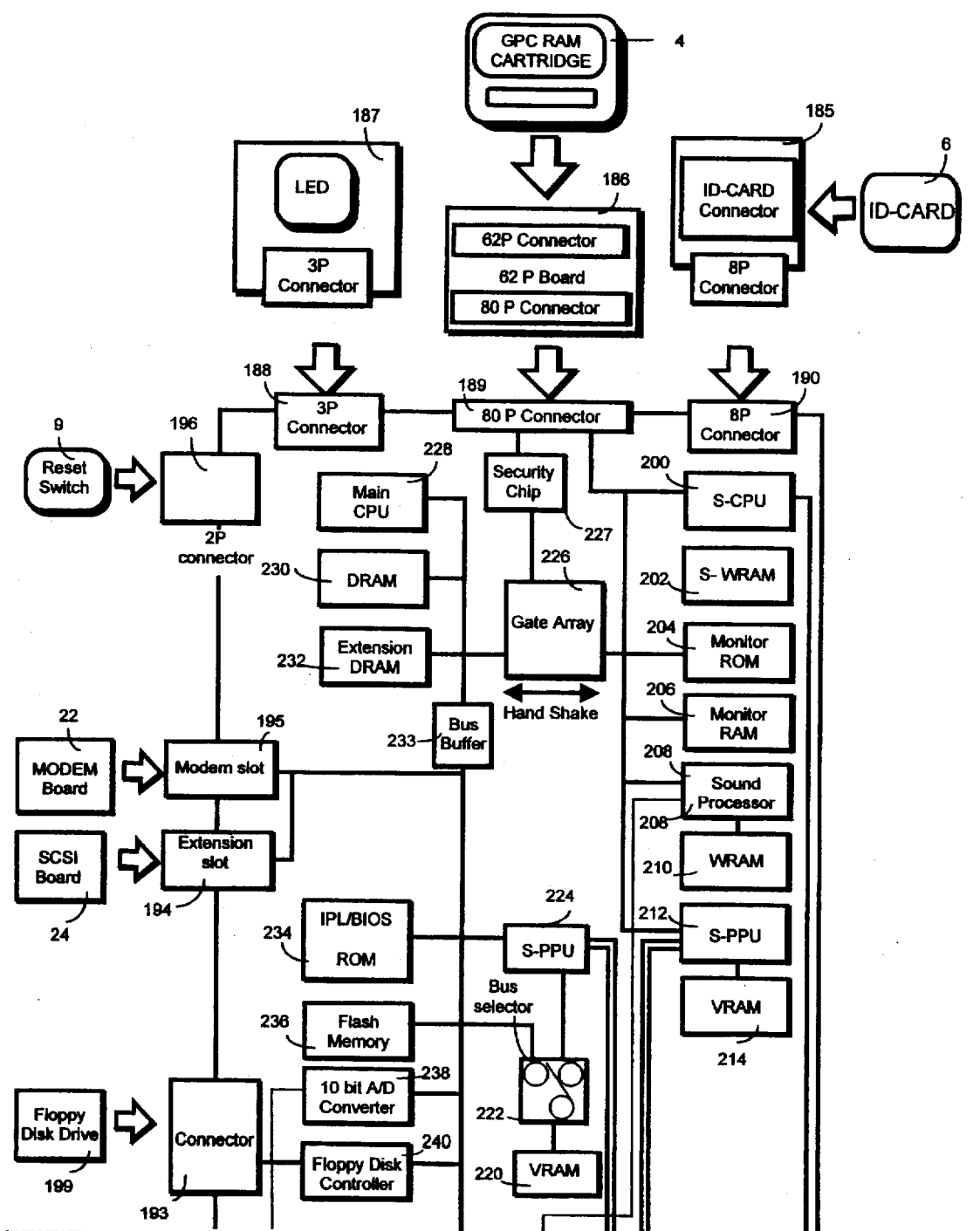
FIGS. 2A and 2B are a more detailed block diagram of an illustrative embodiment of the game processor system shown in FIG. 1A.
Figure 2B:
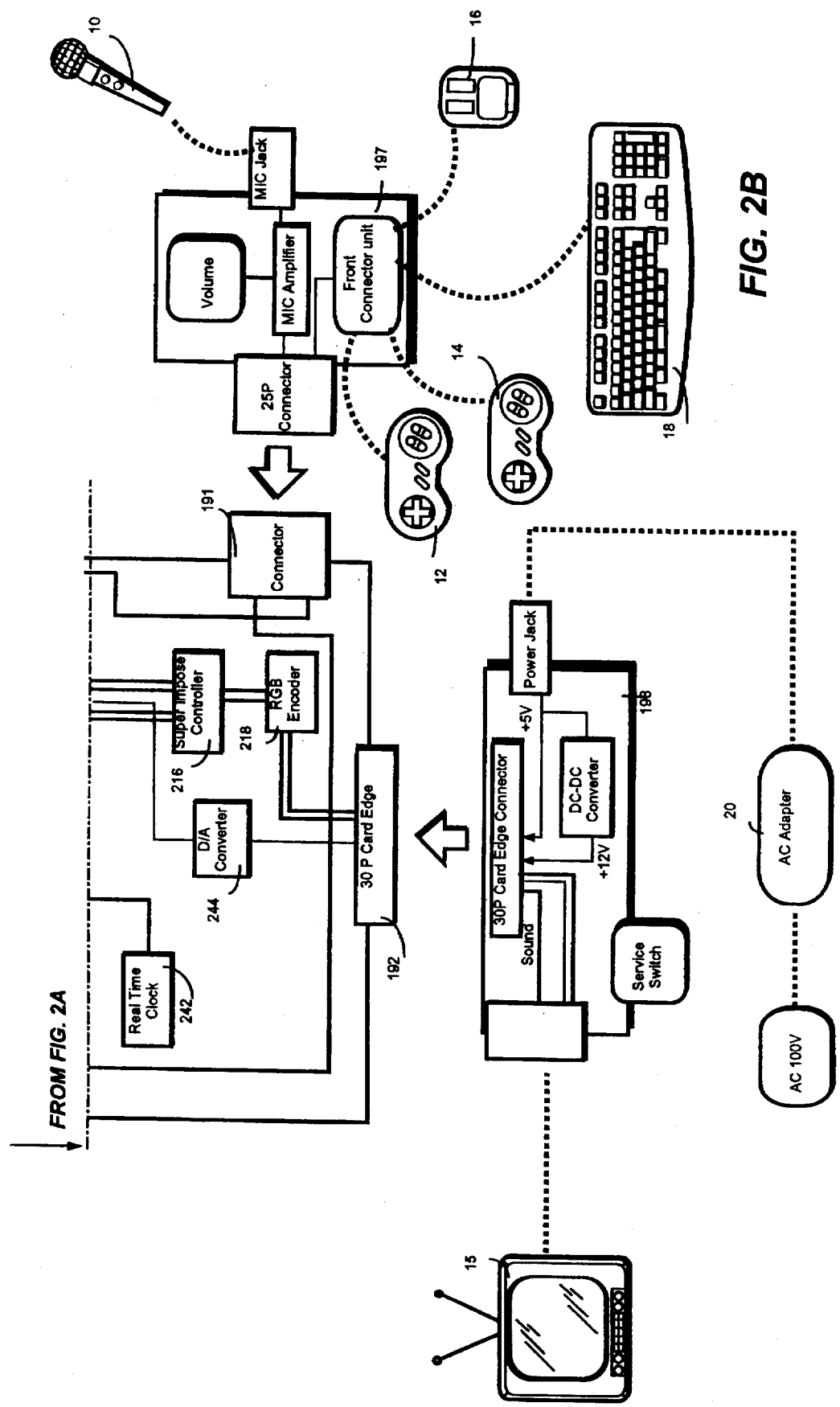

FIGS. 2A and 2B are a more detailed block diagram of the game processor system shown in FIG. 1A and are an illustrative embodiment which specifies details such as the number of connector pins, particular types of memory devices, etc. These and other implementation details are set forth only as an illustrative arrangement of one of many possible alternative arrangements for implementing the invention and should not be construed as limiting the scope of the present invention.

FIGS. 2A and 2B identically numerically label many of the same input/output devices shown in FIG. 1A and show connections between the I/O devices and game processor system console 2 in greater detail than FIG. 1A. The controllers 12, 14, keyboard 18 and mouse 16 are coupled to the game processor system console 2 via a front board connector unit embodied on front board 197 of FIG. 2B. The connector, in turn, is coupled to 25 pin connector 191 on console 2. Microphone 10 is likewise coupled to the console's 25 pin connector 191 via a microphone jack and a microphone amplifier which is likewise coupled to the front board 25 pin connector. The microphone amplifier is controlled by a volume control on front board 197.

ID card 6 is coupled to console 2 via ID card circuit board 185 having an ID card connector and an 8 pin connector which, in turn, is connected to the console at 8 pin connector 190. RAM cartridge 4 is coupled to the console at 80 pin connector 189 via a 62 pin connector board 186 which includes a 62 pin connector for connection with game cartridge 4 and an 80 pin connector for connection to connector 189. The game processor I/O system also includes an LED board 187 having an LED display and a 3 pin connector which, in turn, is connected to 3 pin connector 188 on console unit 2. Reset switch 9 is coupled to permit resetting game CPU 200. Modem board 22 is coupled to console unit 2 via modem slot 195. An SCSI board 24 is coupled to a console unit 2 via extension slot 194. Floppy disk drive 199 which receives floppy disk 8 shown in FIG. 1A is coupled to console unit 2 via 34 pin connector 193 which, in turn, is coupled to floppy disk controller 240.

FIG. 2B includes interface board 198 which receives AC power via an AC adapter 20 and a power jack that is coupled to the 30 pin card edge connector on board 198 which, in turn, is coupled to the console's 30 pin card edge connector 192. Interface board 198 also includes a DC to DC converter coupled to the power jack and to the 30 pin card edge connector. The 30 pin card edge connector of board 198 receives video, sync, and sound signals from console unit 2 and couples such signals to standard television unit 15.

Turning next to the internal two CPU architecture of the game processor system console 2, as can be seen from FIGS. 2A and 2B, the hardware includes a game program executing CPU 200 (SCPU) and associated system components and an operating system and editing system main CPU 228 and associated system components to be described below. Additionally, console unit 2 includes gate array circuitry 226 through which a large part of inter-processor communication takes place and an associated superposition controller 216 for superimposing the editing and operating system video output onto the game program executing subsystem output.

Turning first to the game program executing subsystem, the game program executing hardware in the presently preferred embodiment may be implemented by hardware currently being sold by Nintendo of America as the Super Nintendo Entertainment System (SNES). The present invention, however, is not limited to Super NES related game program executing systems but rather may be used with alternative game hardware implementations. The game program executing game CPU 200 may, for example, be a 65816 compatible microprocessor. The game CPU 200 is coupled to working RAM 202 which, for example, includes 1 mega bit of storage. The game CPU 200 is coupled via system data, address and control busses to picture processing unit (SPPU) 212 which, in turn, is coupled to video RAM 214 which may, for example, include 512k bits of storage.

The exemplary embodiment uses two picture processing units 212 and 224. PPU 212 includes circuitry for generating video game displays under the control of game CPU 200 and PPU 224 generates editing related video displays under the control of operating system CPU 228. Game CPU 200 has access to video RAM 214 via PPU 212 during vertical and horizontal blanking intervals. Thus, game CPU 200 can only access video RAM 214 through PPU 212 at times other than during active line scanning when PPU 212 is accessing video RAM 214. PPU 224 generates a video display from video RAM 220. As shown in FIG. 2B, the output of PPU 212 and the output of operating system PPU 224, are coupled to a user's television 15 via superimpose controller 216 which, in turn, is coupled to an RGB encoder 218 through the previously identified connectors to television 15.

Game CPU 200 is also coupled to sound processor 208 which is coupled to its associated work RAM 210. The sound processor 208 may comprise a commercially available sound chip to generate sounds associated with the video game program being executed. Game CPU 200 can only access work RAM 210 through sound processor 208.

In addition to components founds within an SNES system, the exemplary embodiment additionally includes a one mega bit monitor ROM 204 and a 256 bit monitor RAM 206. The monitor ROM contains program instructions which are executed by game CPU 200 to result in a transfer of control to the operating system CPU 228 for the performance of editing and information transfer functions. The monitor RAM 206 stores data associated with such processing.

The Super NES video game machine, which is represented in part in block diagram form in FIGS. 2A and 2B, has only been generally described herein. Further details regarding the Super NES including PPU 212 and PPU 224 (utilized by the operating system processor) may be found in U.S. Pat. No. 5,327,158 issued Jul. 5, 1994 entitled "Video Processing Apparatus" which application is expressly incorporated herein by reference. Still further details regarding the Super NES may be found in U.S. Pat. No. 5,291,189 issued Mar. 1, 1994, entitled "Direct Memory Access Apparatus and Image Processing System and External Storage Device Used Therein" and in U.S. application Ser. No. 08/138,448 filed Oct. 20, 1993, which is a continuation of U.S. application Ser. No. 07/793,735 filed Nov. 19, 1991, entitled "Mosaic Picture Display Apparatus and External Storage Unit Used Therefor" which applications are herein incorporated by reference.

The game processor system console 2 also includes an operating system or main CPU 228 which may be, for example, a NEC V810 processor which is a 32 bit RISC processor. Alternatively, for example, a Motorola 68000 Series Processor or other processors having similar processing power may be utilized. The main CPU 228 processes operating system related routines in parallel with the game CPU 200 which executes a video game program, as will be described further below. Main CPU 228 and game CPU 200 communicate through gate array 226 which is described in detail in conjunction with FIG. 23. As indicated above, processor 228 (like game processor 200) includes an associated picture processing unit 224 for performing graphic processing operations to reduce the graphics processing burden on CPU 228. The operating system CPU 228 is coupled directly to video RAM 220 or indirectly via picture processing unit 224 depending upon the control setting of bus selector 222. As noted above, PPU's 212 and 224 are of the type described in the above identified SNES related patents and patent applications which have been incorporated herein by reference.

In accordance with the presently preferred embodiment of the present invention, main CPU 228 is a processor having a 32 bit bus width and operates at a 21.477 MHz clock rate. The CPU 228 is coupled to, for example, a 4 megabyte DRAM 230. The work DRAM 230 is expandable, if desired, to up to 24 megabytes via an extension DRAM 232. Main CPU 224 is additionally coupled to, for example, an 8 mega bit ROM 234 which stores an initial program loader (IPL) subroutine a BIOS operating system program, and character fonts to be accessed by CPU 228. CPU 228 also has access via its system bus to an 8 mega bit flash memory 236 which is utilized, for example, for software backup for data from floppy disk drive 199. The main CPU 228 system bus is also coupled to, for example, a 10 bit A/D converter 238 (which is utilized to digitize sounds coming from, for example, microphone 10 via board 197), a floppy disk controller 240 and real time clock 242.

The main CPU 228 and the game CPU 200 boot up independently. After power is turned on, the game CPU 200 is initially placed in a reset state and then restarted. Initially, the game CPU 200 executes program instructions out of monitor ROM 204. The main CPU 228 controls the areas of memory which are accessed by game CPU 200. The main CPU 228 loads a register in gate array 226 which identifies whether CPU 200 is to execute out of monitor ROM 204 or RAM cartridge 4. The main CPU 228 executes the initial program loading and operating system instructions in ROM 234 to read out the contents of floppy disk 8 including the model game software via floppy disk drive 199 and floppy disk controller 240. Operating system program instructions for controlling operations associated with the model game software are transferred to DRAM 230 for execution by main CPU 228. After system power has been turned off and thereafter turned on, main CPU 228 checks flash memory 236. Upon being first turned on, operating system programs are read out from floppy disk 8 and stored in flash memory 236 and transferred to DRAM 230. Upon being turned on for the second time, operating system programs are transferred from flash memory 236 to DRAM 230 without use of the floppy disk 8. In general, the flash memory's access speed is faster than the floppy disk's access speed. Therefore, the system can be quickly started at the second turn on.

Model software information from floppy disk controller 240 is initially buffered in DRAM 230 for transfer to the RAM cartridge 4. Main CPU 228 then generates a communication ready signal and transmits the signal to a handshake port in gate array 226. Game CPU 200, through instructions stored in monitor ROM 204, monitors the handshake port and prepares for reception of data and/or instructions from the communication RAM in gate array 226. The handshake port may be illustratively implemented by a pair of one way handshake ports. A one way handshake port communicates information from the Main CPU 228 to Game CPU 200. Another one way handshake port communicates the information from the Game CPU 200 to Main CPU 228.

The handshake port includes a buffer register which is addressable by game CPU 200 which indicates whether information is to be transferred between main CPU 228 and game CPU 200. When game CPU 200 has determined that a communication RAM embodied within gate array 226 has received information from main CPU 228, game CPU 200 accesses the information from the communication RAM and transfers such information to RAM cartridge 4 via 80 pin connector 189 and connector board 186. The main CPU 228, after the communication RAM information has been transferred to RAM cartridge 4, sets a register embodied within gate array 226 which initiates switching of control of game CPU 200 from monitor ROM 204 to RAM cartridge 4. After the game CPU control has been switched to RAM cartridge 4, game CPU 200 no longer monitors the handshake port or has any further interaction with the communication RAM within the gate array. At this point, game CPU 200 operates to execute game related instructions out of RAM cartridge 4 in a manner substantially the same as the applicants' assignee's game machine described in the above identified SNES related patents and patent applications.

The main CPU 228 constantly monitors information transmitted via the CPU 200 system bus by accessing a register copy RAM embodied within gate array 226. The information written into the register copy RAM from the game CPU 200 bus is formatted such that it's compatible with the main CPU 228 format. Information from PPU 212 and sound processor 208 flows into the register copy RAM for monitoring by main CPU 228 such that main CPU 228 is continuously aware of the game state. The use of a 32 bit RISC processor provides main CPU 228 with the processing power necessary to monitor such a large volume of information. As is described below, both the images generated by main CPU 228 via its PPU 224 and VRAM 220 and game CPU 200 via its PPU 212 and VRAM 214 are simultaneously displayed on the user's television 15 through the use of a superimpose controller 216 which is in part resident in gate array 226 and is described in detail below.

The main CPU 228 is continuously aware of game CPU 200 operations so that it will not initiate a user commanded "system break" to modify game play until all required information is written into VRAM 214 for display operations. A system break logic circuit regulates the timing for generating a game break control signal to game CPU 200 when the system break command is executed. Thus, main CPU 228 monitors data on the game CPU bus, particularly information relating to generation of video display or sound to determine an appropriate point in time to execute a system break to thereby avoid distorted picture and sound information.

Figure 3A:
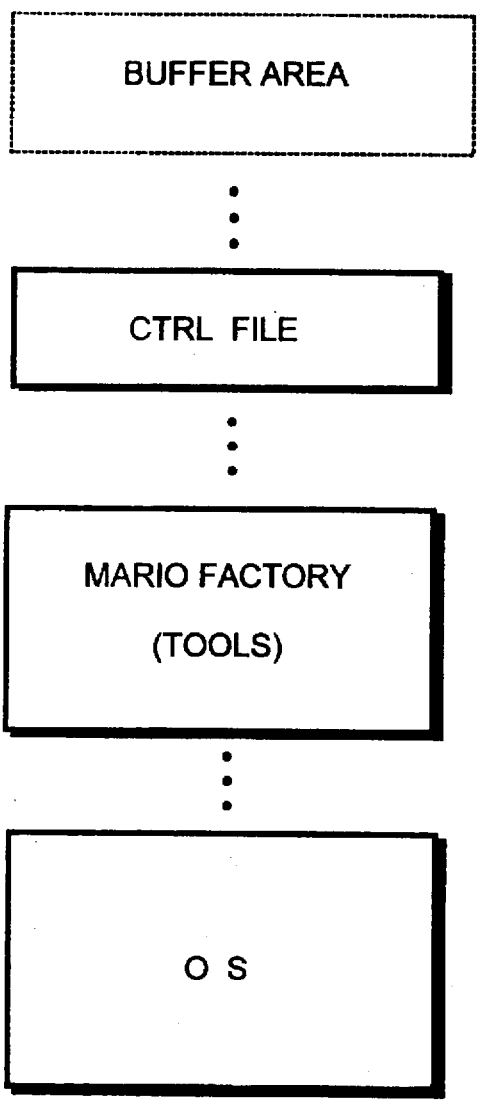
FIGS. 3A and 3B are memory maps of a part of the system memory space.
Figure 3B:
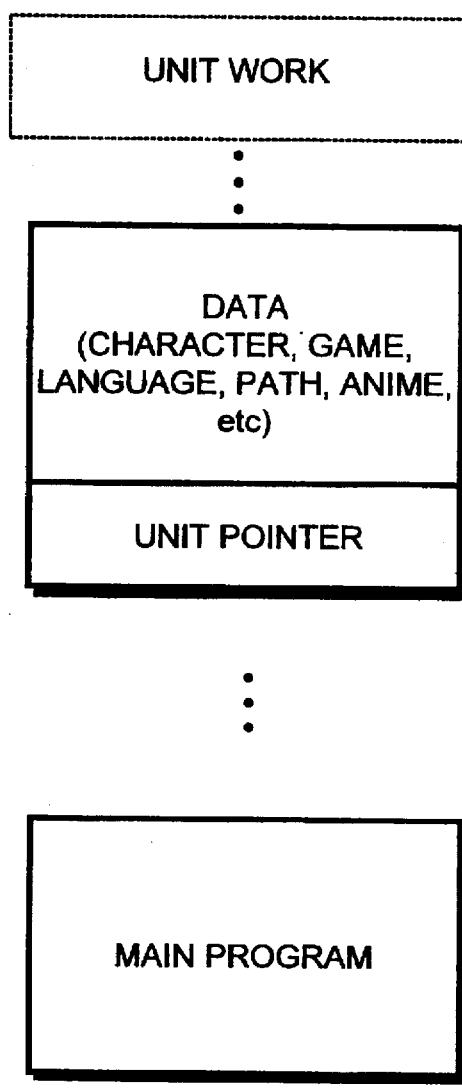

FIGS. 3A and 3B are partial memory maps of certain of the memory devices shown in FIG. 2A and 2B after the transfer of information from the floppy disk 8 to the RAM cartridge 4. The model software stored on floppy disk 8 includes a control file, model game related data, unit pointer, address data and a main game program (as well as sound data, not shown, which is coupled to sound processor 208). As can be seen from FIG. 3A, not all such model software is transferred to RAM cartridge 4, rather, DRAM 230 maintains a control file which stores data relating to the changing game conditions as selected by the user as well as editing (e.g., Mario Factory) and operating system software. When the model software is executed, the Unit Work data is generated by the main program of the model software. After a "system break" is initiated by the user to stop game play to modify a model game, unit work data, unit pointer and DATA for editing are transferred to a buffer area. When the editor using the control file is finished, the modified information (DATA and Unit Pointer information to be described below) is stored in the buffer area data and then transferred to RAM cartridge 4 which also stores the game main program.

The game processing system of the present invention is designed for use in various network configurations. The present invention contemplates "friend networking", i.e., an exchange of RAM cassettes 4 storing newly generated video games among users. Similarly, an ID card 6 and a floppy disk 8 may be carried to the house of a friend for use with a RAM cassette 4 in an identical game processing processor system.

Figure 4:
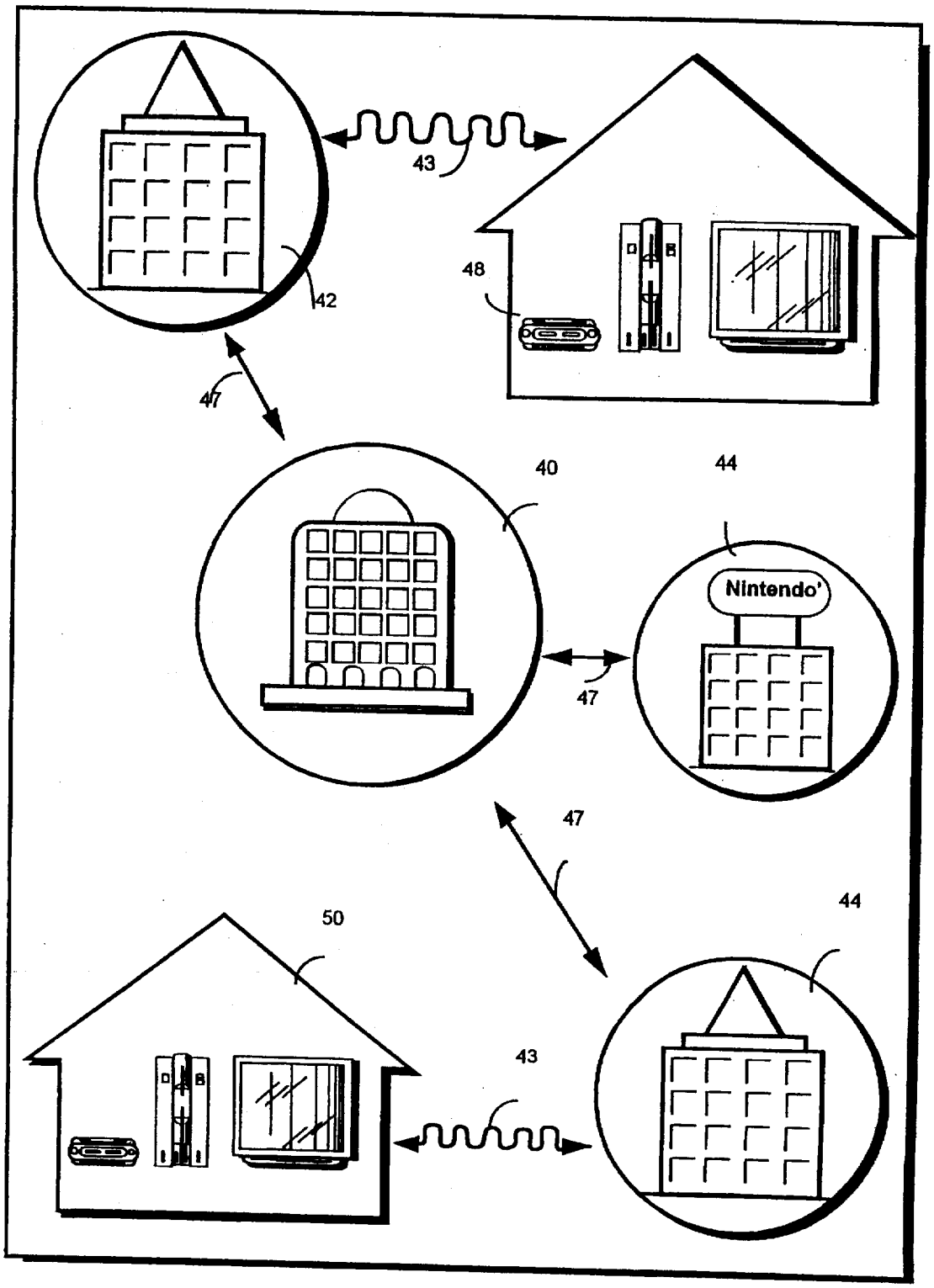
FIG. 4 is an exemplary on-line networking system in which the illustrative embodiment of FIGS. 2A and 2B may be used.

Additionally, as shown in FIG. 4, an on-line networking system is also contemplated. As shown in FIG. 4, game information may be transmitted via modem 22 shown in FIG. 1A over telephone lines 43 from a user's house 48 through an access point 42 to a game processor center 40 via a digital link 47. Similarly, game information may be transmitted from the house 50 of a friend via a telephone line 43 to an access point 44 and then to game processor center 40 via digital link 47. Game information may also be transmitted from the game manufacturer (such as, for example, Nintendo) 46. In the on-line networking system shown in FIG. 4, it is possible to readily supplement the model software embodied on a user's floppy disk 8 to add to the model video game software to be modified.

In accordance with one exemplary embodiment of the present invention, the model software stored on the floppy disk 8 includes a portion of the video game designed by a manufacturer which a user cannot change. This portion of the model software is referred to as the "base file". The "user file" is the portion of the video game that a user can change. In the system shown in FIG. 4, the user file may be transmitted via the network to the house of a friend having a game processor system to permit interactive game play between users or to permit a friend to play a modified version of a newly designed game. The access points 42 and 44 are provided to, for example, minimize the telephone charges associated with transmitting a game over extremely long distances. The game data would then be relayed to the game processor center 40 via direct digital links 47. The game data after being received at the game processor center 40 is thereafter retransmitted to the appropriate destination.

Figure 5:
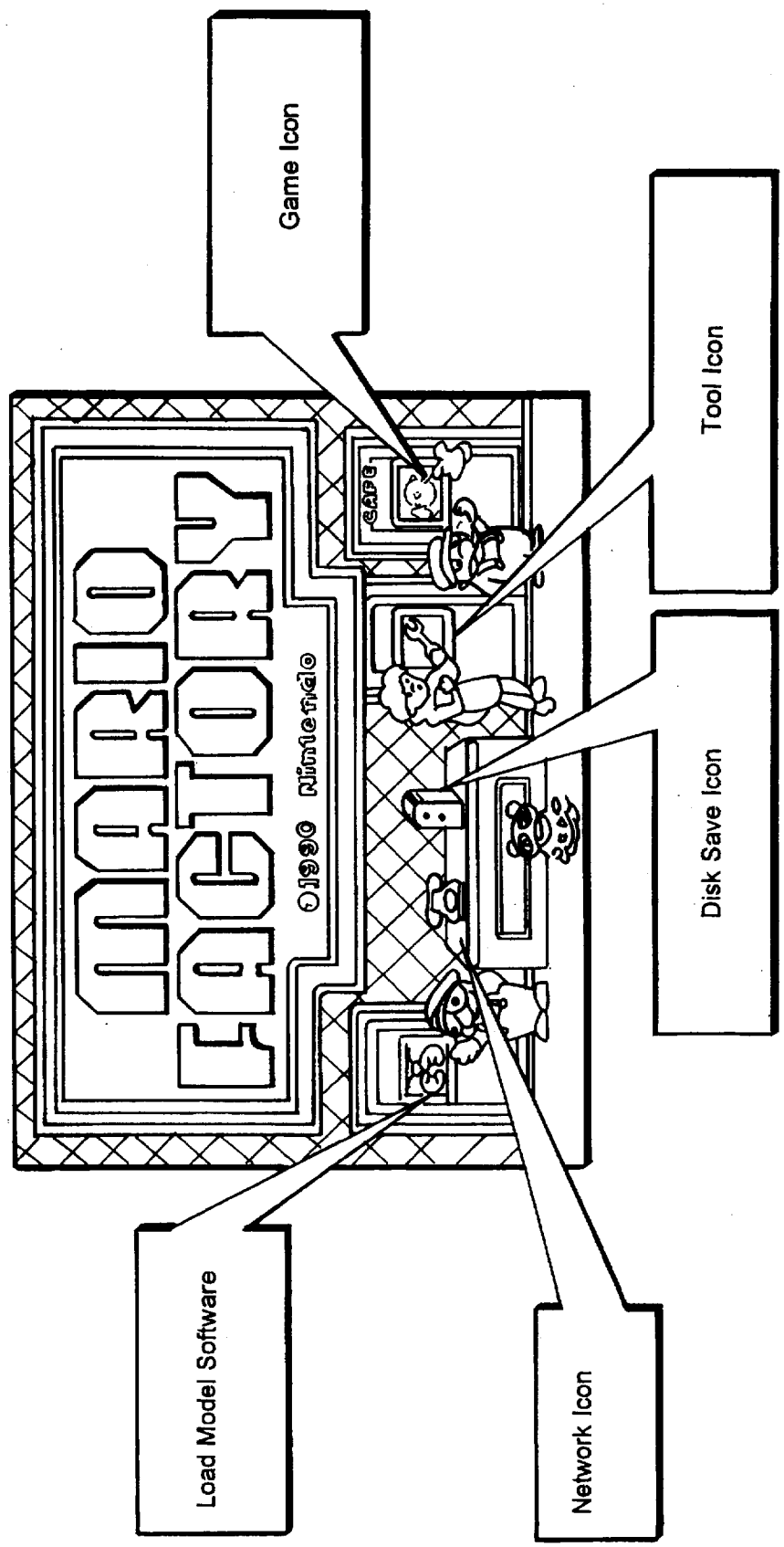
FIG. 5 is an exemplary title screen for accessing the exemplary program authoring tools of the illustrative embodiment.

Prior to describing the game processor unit system hardware and software in further detail, the game fabricating and editing operations embodied in the illustrative embodiment will next be described. After floppy disk 8 is inserted into console receptacle 7 and game processor ID card 6 is inserted into receptacle 5, a title screen is displayed such as the exemplary screen shown in FIG. 5 entitled "Mario Factory". The title screen shown in FIG. 5 shows five icons which may be selected by a user via mouse 16. Icons are selected by "clicking", i.e., lightly pressing, the left mouse button. Although five icons are shown in FIG. 5, it should be appreciated that the following description is an illustrative embodiment which exemplifies one of many possible implementations. For example, more or less than five icons may be displayed on the title screen and different functions may be selected in addition to, or in place of, those shown in the illustrative embodiment.

The title screen shows a "load model software" icon which, if selected by mouse 16, results in the model software stored on floppy disk 8 being loaded into console unit 2 memory in a manner described in more detail below. FIG. 5 also includes a "game icon" in which the game embodied in the model software may be selected for execution and modification to create a new and radically different game from that embodied in the model software. The title screen shown in FIG. 5 also includes a network icon which enables selection of modem 22 for transmission of data to a destination via telephone lines. Additionally, disk save and editing tool icons may be selected.

If the game icon shown in FIG. 5 is clicked, a game program initiation screen will typically be displayed. After a user selects whether the game is to be played by one or two players, a user depresses the start button of controller 12 or 14 shown in FIG. 1A. The game specified by the model software, e.g., a version of the well known "Mario Bros." game, then begins play.

Figure 6:
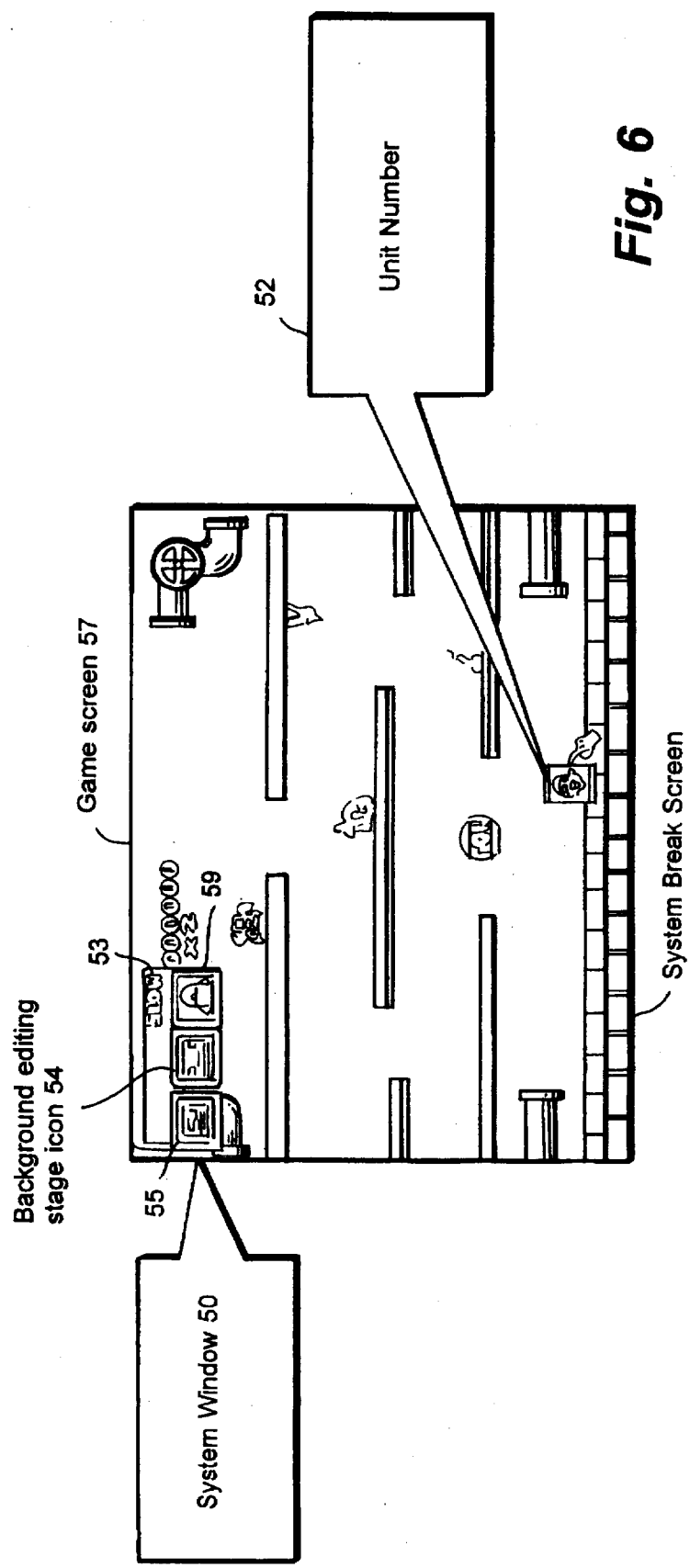
FIG. 6 is an illustrative system break screen.

At any point in the game in which the user desires to change any displayed moving object character or any portion of the display screen background, the user stops the game to initiate what is referred to herein as a "system break". When a system break is initiated, as shown in FIG. 6, the system break screen is displayed in which a system window screen 50 is superimposed over a user selected game screen 57. A moving object character, such as the well known "Mario" prominent in video games manufactured by the applicants' assignee, or any portion of the background may be modified by clicking on the area where a change is to be made.

The present invention permits wide ranging changes to the model software such that the model software game background and moving objects are modified to the extent that the original model software game is unrecognizable. By way of example only, FIG. 6 illustrates that a change is to be made to the moving object character recognizable as "Mario" by the user "clicking" the mouse when the cursor (e.g., the hand) overlays the character to be modified. If desired, a completely new character may be substituted for Mario.

For the purposes of this example, presume that a user playing the game wishes to remove Mario's moustache. As noted above, a user stops the game by initiating a system break upon clicking the mouse. Thereafter, the user clicks on Mario. Main CPU 228 generates, for example, a rectangular block circumscribing the character to be changed together with an indication 52 of the character's "unit number". Each of the moving objects and background portions of the game which may be modified are identified by unique unit numbers. Associated with each unit number and its object, as will be described in detail below, are a wide range of characteristics such as, for example, size, poses, animation paths, etc. The system window 50 includes a series of icons which permit the user to select a wide range of editorial functions.

Figure 18:
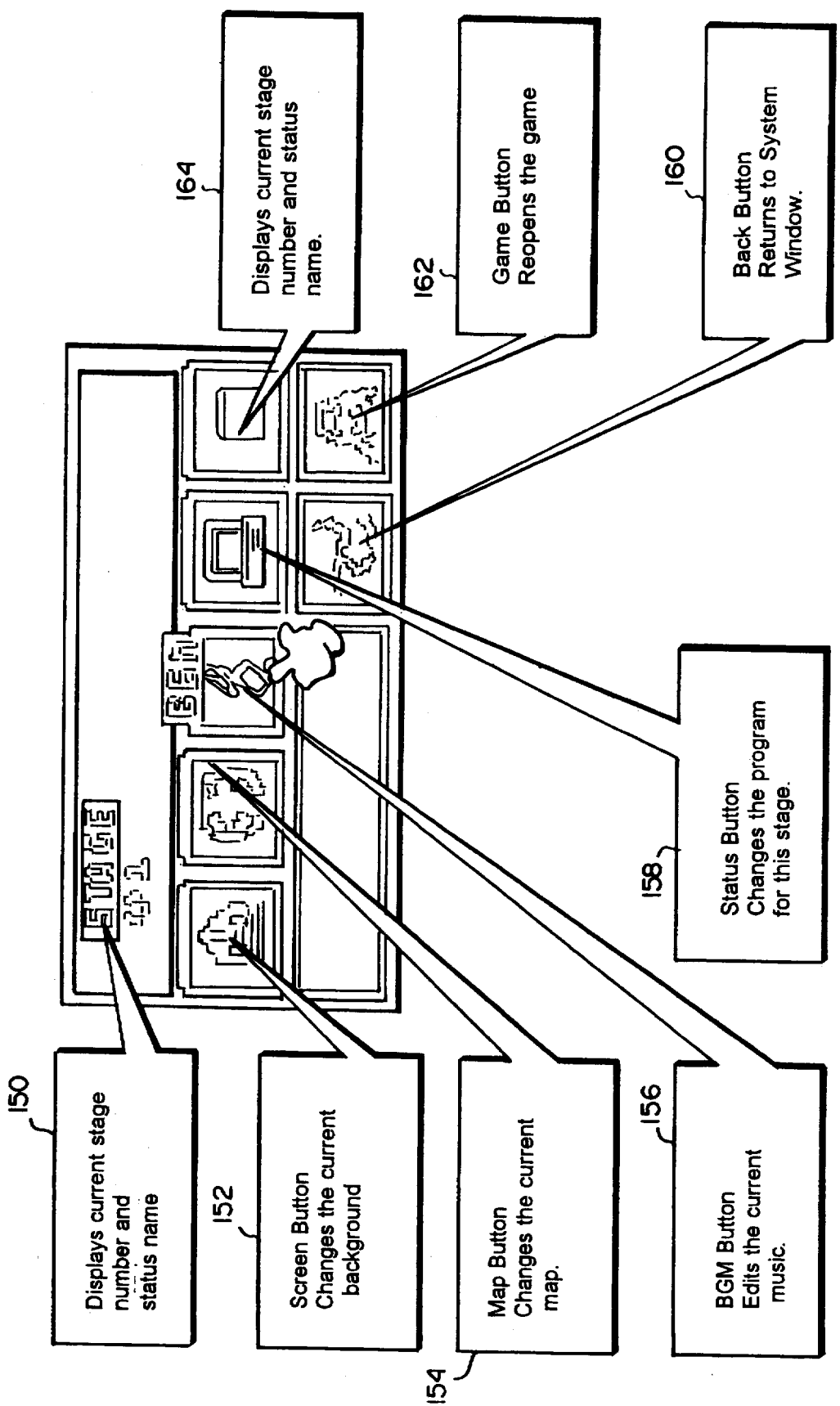
FIG. 18 is an exemplary "stage" window display screen which permits a vast range of background character editing.

The system window "stage" icon 54 enables access of the "stage" window shown in FIG. 18 which permits a vast range of background character editing. The system window also includes a return to the title screen icon 55, a reopen game icon 59, and a switchable control 53 which permits the user to switch between a game stop and slow play mode. Numerous additional or alternative editing functions could be included in the system window 50, if desired in the system window 50 to identify particular game fabrication/ editing tools which may be selected.

As can be seen in FIG. 6, system window 50 and its editing tool indicating icons as well as unit number indication 52 are superimposed on game screen 57. The selection of the Mario character for editing results in the display of a sequence of Mario editing screens/windows. Other moving objects may be selected for editing in a similar manner.

Figure 7:
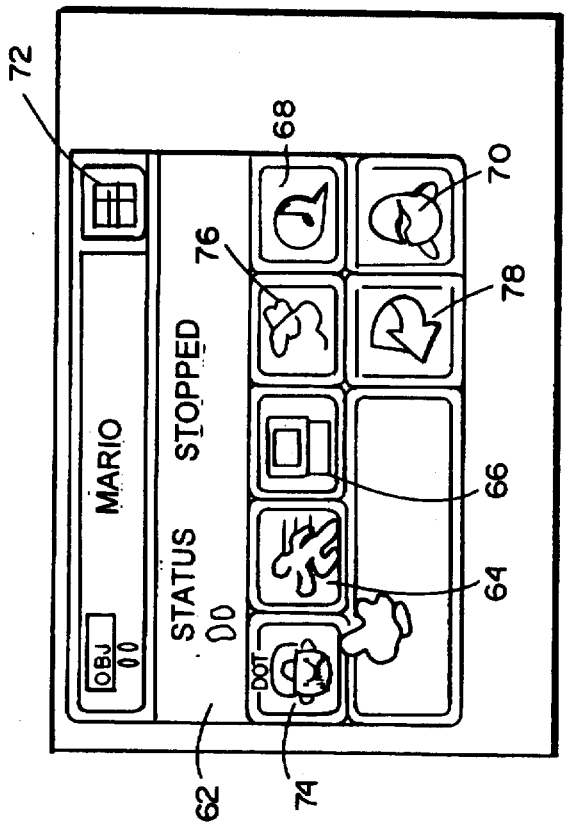
FIG. 7 depicts an exemplary character editing screen.

FIG. 7 depicts an exemplary character editing screen. It shows a Mario character editing related window which visually indicates that it is the Mario character being modified (60). Below the indication of Mario, the current status of Mario is identified (62). The status of "Mario" is indicated as being "stopped". Other exemplary status indications which could have been identified are Mario "moving left", a Mario "moving right", a Mario "jump" indication or a Mario appearing from the top or bottom. By changing the status of Mario, which may be done using the status editors described below, the game is changed accordingly.

Below the status block, a sequence of icons are shown indicating exemplary Mario related editorial modifications which may be made and editing screens which may be accessed by clicking on the related icon. Icon 64 enables changes to be made with respect to the Mario animation patterns as described below in conjunction with FIG. 10. Icon 66 permits editing of character "status" conditions as described below in conjunction with FIG. 17. Icon 68 permits changes to be made to the special sound effects associated with the video game when Mario is moved. Icon 70 resumes game play. Icon 72 permits changes to be made to the "all status" conditions as described below in conjunction with FIG. 9. Icon 74 enables changes to be made with respect to the Mario character dot pattern as described below in conjunction with FIG. 8. Icon 76 permits editing of character movement as described below in conjunction with FIG. 16. Icon 78 causes the system to return to the system window.

Figure 8:
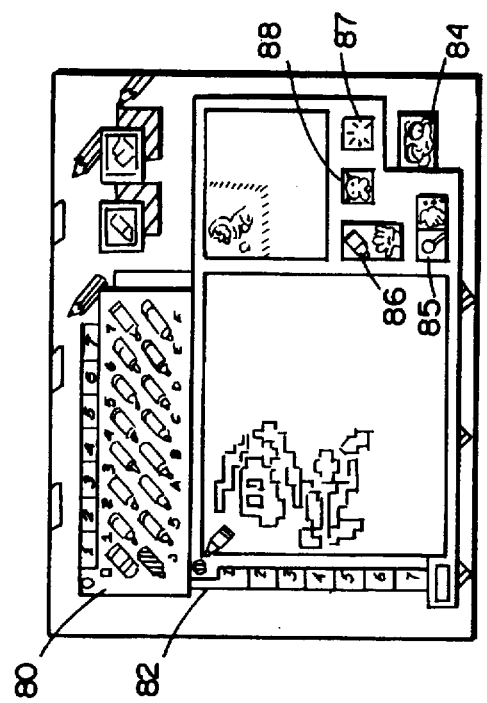
FIG. 8 is an exemplary screen accessed when a user clicks on the character icon.

For example, to remove Mario's mustache, a user clicks on character icon 74 to generate the display screen shown in FIG. 8. By clicking on the character icon, control is transferred to the character design tool shown in FIG. 8. A zoom tool may be selected by clicking on icon 85 which results in an expanded view of the character to be modified. A pencil tool may be selected by clicking on icon 86 which switches to pencil mode/box mode. Pencil mode permits changes of the graphic data on a dot by dot basis. Box mode permits the graphic data to be painted by any square area. Icon 84 controls resuming game play or returning to the system break screen. An erase tool may be selected by clicking on icon 87 which erases all graphic data on a pattern of, for example, Mario. An undo tool may be selected by clicking on icon 88 which cancels the immediately preceding command. As shown in FIG. 8, a color palette 80 is displayed to permit a user to select any of a number of colors to change the color of any portion of Mario by clicking on a selected color and drawing on Mario with a coloring tool (e.g., crayon shaped cursor) in accordance with conventional painting programs. This color palette function enables a user to select colors within a given color palette, select between various palettes of color and create new colors with a color spectrum function.

Each of the moving objects associated with the model software has a predetermined number of different poses. By way of example only, the Mario pattern is structured with a total of thirteen pose patterns. The pattern number is indicated in the left hand portion of the screen shown in FIG. 8 (82). The pattern number zero, for example, is selected by clicking on the "0". When the pencil mode is selected by clicking icon 86, a crayon shaped cursor can be used to erase Mario's moustache in pattern number zero and replace it with Mado's skin color on color palette 80. Similar operations are performed with each of the remaining Mario patterns 1 through 12.

Once all of the moustaches have been eliminated, for example, robot icon 84 is clicked to generate a return to the system window, where the game icon may be selected to resume game play. When game play is resumed, Mario will be displayed throughout the game with no moustache. Using the display screen shown in FIG. 8, each individual pixel of the Mario pattern may be modified by the user. Using the various editors available in the system a user can create an original Mario and control a wide range of animation and other operations performed on this or any other character.

Figure 9:
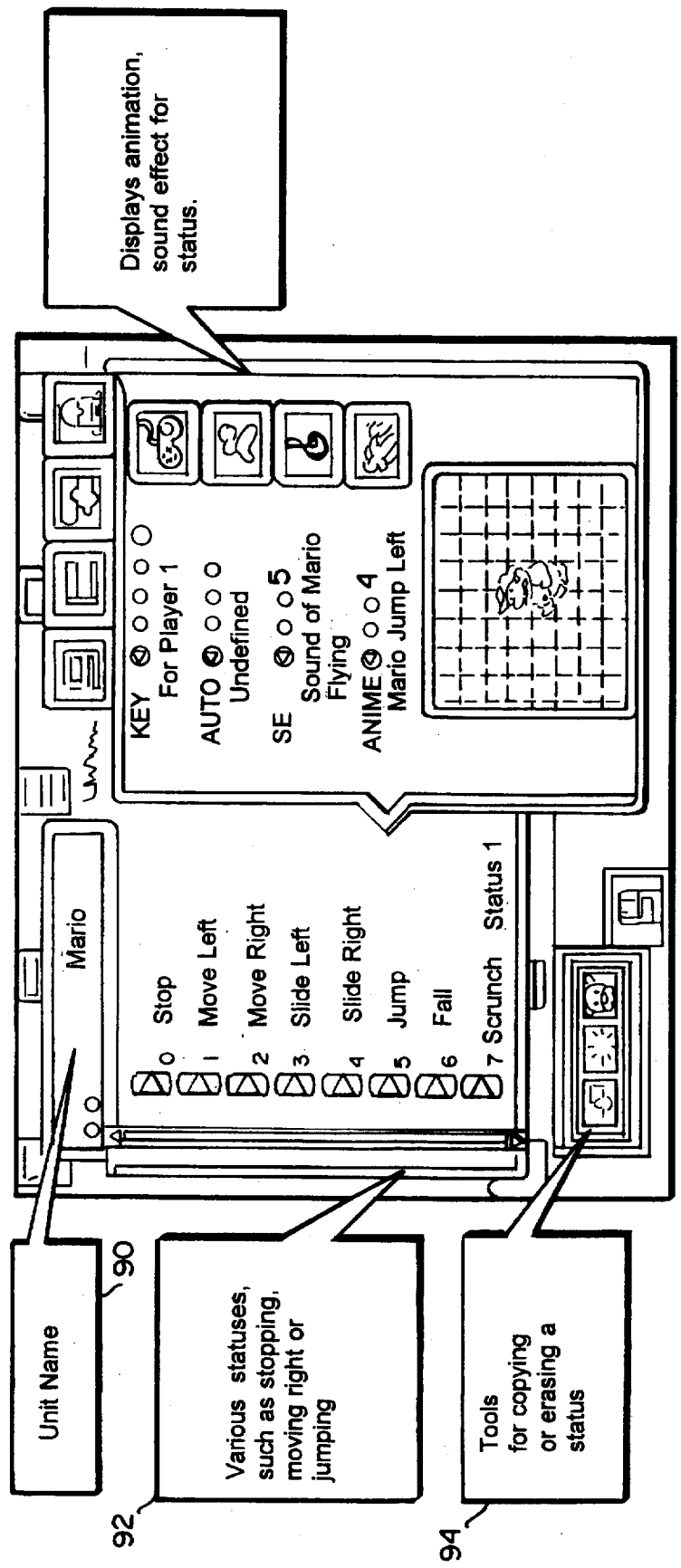
FIG. 9 shows an illustrative "all" status screen display for the unit named "Mario"

FIG. 9 shows an illustrative "all" status screen editor display for the unit named "Mario". As noted above, each moving object or other modifiable character is identified by a unit name. Each unit name, in turn, has an associated collection of statuses. The present invention utilizes an "all status" editor which identifies the status of a character and permits operations to be selected by a user to result in a status modification. Thus, as shown in FIG. 9, for the unit name 90, i.e., Mario, there are various identified statuses such as "stop", "move left", "move right", "slide left", "slide right", "jump", "fall", "scrunch", etc. (92). Additionally, there are tools 94 for copying or erasing a status. The identified statuses 92 inform the operating system CPU 228 of the condition of an object as it is manipulated by the game executing CPU 200. For each status, the system CPU 228 is informed of the operations associated therewith via a control file data structure shown in FIG. 3A. Thus, for each status, a sequence of associated operations are identified and stored. For example, for status 5 which is "jumping", the data structure stores an indication of the sound generated during the jumping (e.g., "boing"), the movement during jumping (e.g., an animation path identified by the animation program) and the programming during the jumping operation (if Mario hits the floor, then the character will die).

The status index on the left hand portion of FIG. 9 permits accessing a more detailed sequence of operations associated with the status. For example, as shown in FIG. 9, if the status 1 entry is selected by a user in the right hand portion of FIG. 9, the animation for the status is displayed. Additionally, the sound effect associated with the status is generated and appropriate entries under the KEY, AUTO, SE, and ANIME entries are displayed. As indicated in FIG. 9 the "KEY" entry identifies whether, for the particular status, the active controller is for player 1 or player 2 and which button is the active button. If the "KEY" icon is selected, a key editor is utilized as described below in conjunction with FIG. 9A. The "AUTO" entry indicates the state of the autoprogrammer which is described in FIG. 16 for the identified status. SE and ANIME identify sound effects and animation, respectively. Also, background music BGM can be selected with an SE entry.

If the game is stopped and the user clicks on Mario, the system CPU 228 accesses the control file corresponding to the status indication in FIG. 9 and thereby knows which selected sequence is to be associated with the identified status. In this fashion, the information associated with the particular screen at the identified game stage is transferred to the system CPU 228.

Figure 9A:
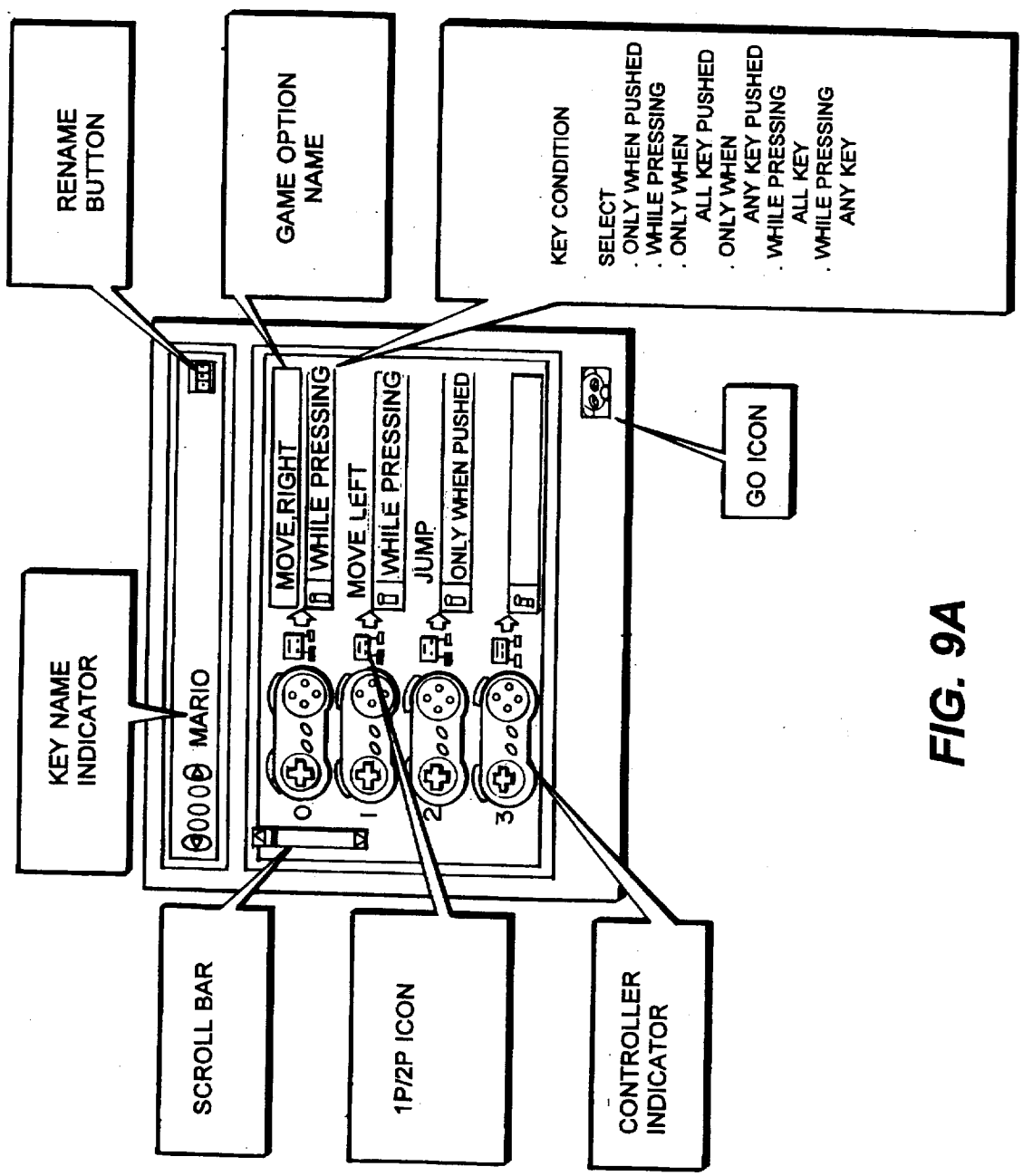
FIG. 9A is an illustrative key editing screen.

Any key function status may be controlled by a key editor described in FIG. 9A. A key editor defines the status related to controller 1 or 2, any button on the controller and/or the button condition such as when the button is pushed (one time) or while the button is pushed (continue). As shown in FIG. 9A, the key name indicator permits setting up major types of keys (e.g., 8) by key name. A rename button permits altering the key names. A game option name permits choosing an option from a menu like the status editor. A Key condition indicator causes game options to be executed only when these key conditions are matched. A 1P/2P icon permits selecting 1P or 2P controller when you click this icon. A controller indicator permits selecting the "KEY" or "KEYS" when you click the button.

Figure 10:
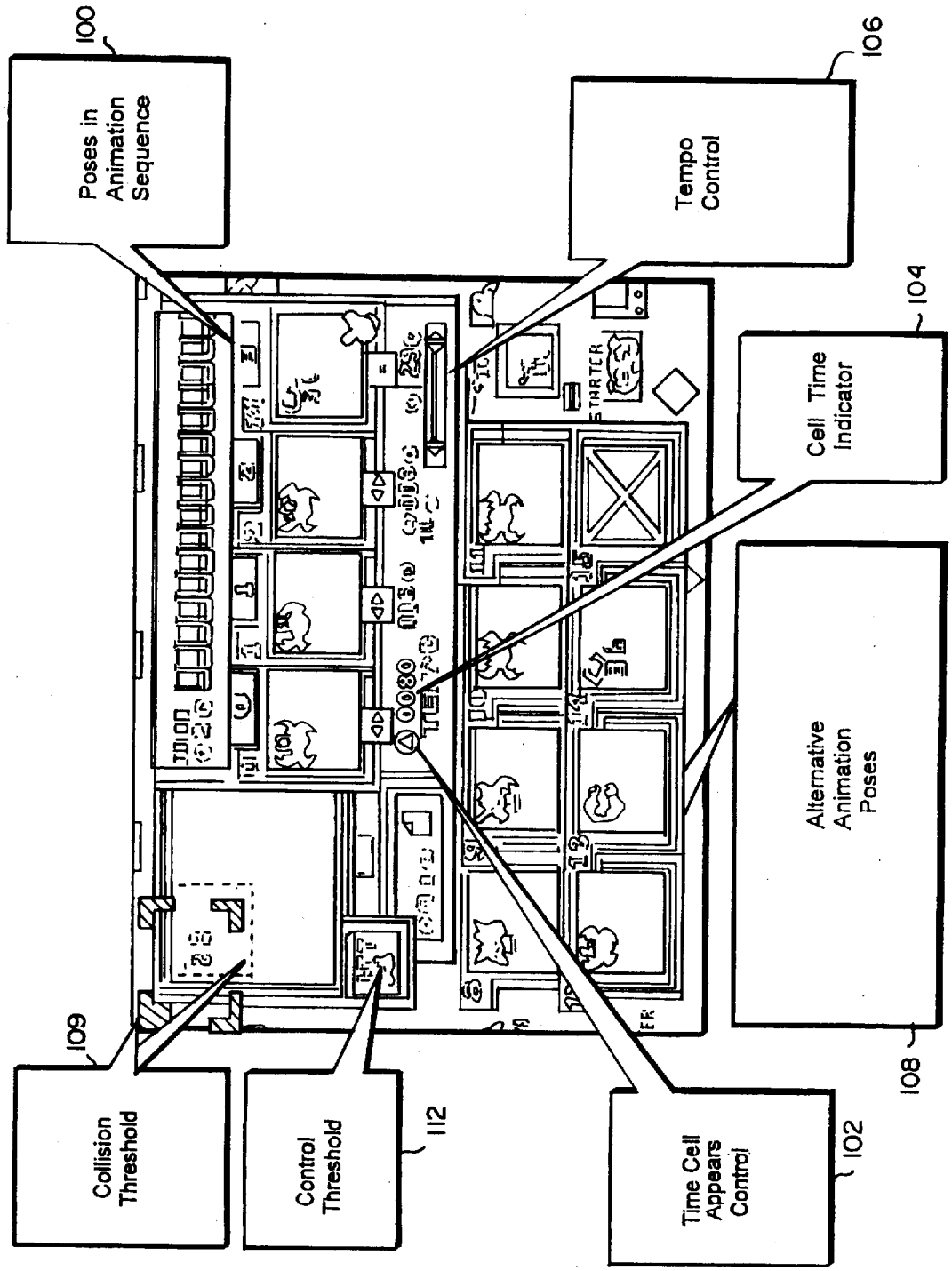
FIG. 10 is an illustrative unit animation editing screen.

If animate icon 76 is selected in FIG. 7, an animation editor is selected so as to result in the display of an animation screen such as, for example, shown in FIG. 10. FIG. 10 shows a moving object in the form of a crab in various poses creating an animation sequence, where each pose is assigned a pose number. As will be explained further below in conjunction with FIG. 16, an "autoprogrammer" tool is utilized to define a path over which movement occurs.

The animation tool shown in FIG. 10 defines a sequences of poses. In the present illustrative embodiment, eight poses may be defined in an animation sequence. FIG. 10 shows areas for four of the eight poses (labelled pose numbers 0 through 3) in the animation sequence to be displayed on a screen. The user may also define the time for which each cell is to appear by using the controls 102. If the cell time indicator 104 is set at 60, then the individual cell is displayed for one second. The overall tempo of the sequence can be controlled by modifying the tempo control 106. In the present illustrative embodiment, the standard speed for the tempo is set at zero. The tempo can be controlled by setting a negative number to create a slower tempo or to a positive number to create a faster tempo. If game play is renewed, the individual cell display frequency and the animation sequence tempo are controlled based on the settings of FIG. 10.

Poses 8 through 15 shown in FIG. 10 (collectively 108) identify alternative poses which may be inserted in the animation sequence. A user need only click on a particular pose, e.g., 10, drag the pose and place it over, for example, animation sequence pose 2. This will result in pose 10 being displayed in place of pose 2.

The area defined by four corner marks shown in the upper lefthand corner of FIG. 10 represents the collision threshold 109 for the particular character, i.e., during game play a collision will be detected if the identified character appears within the distance indicated by the corner mark area to another object. The corner mark area size may be controlled by the "HIT" indicator control threshold control 112.

Figure 11:
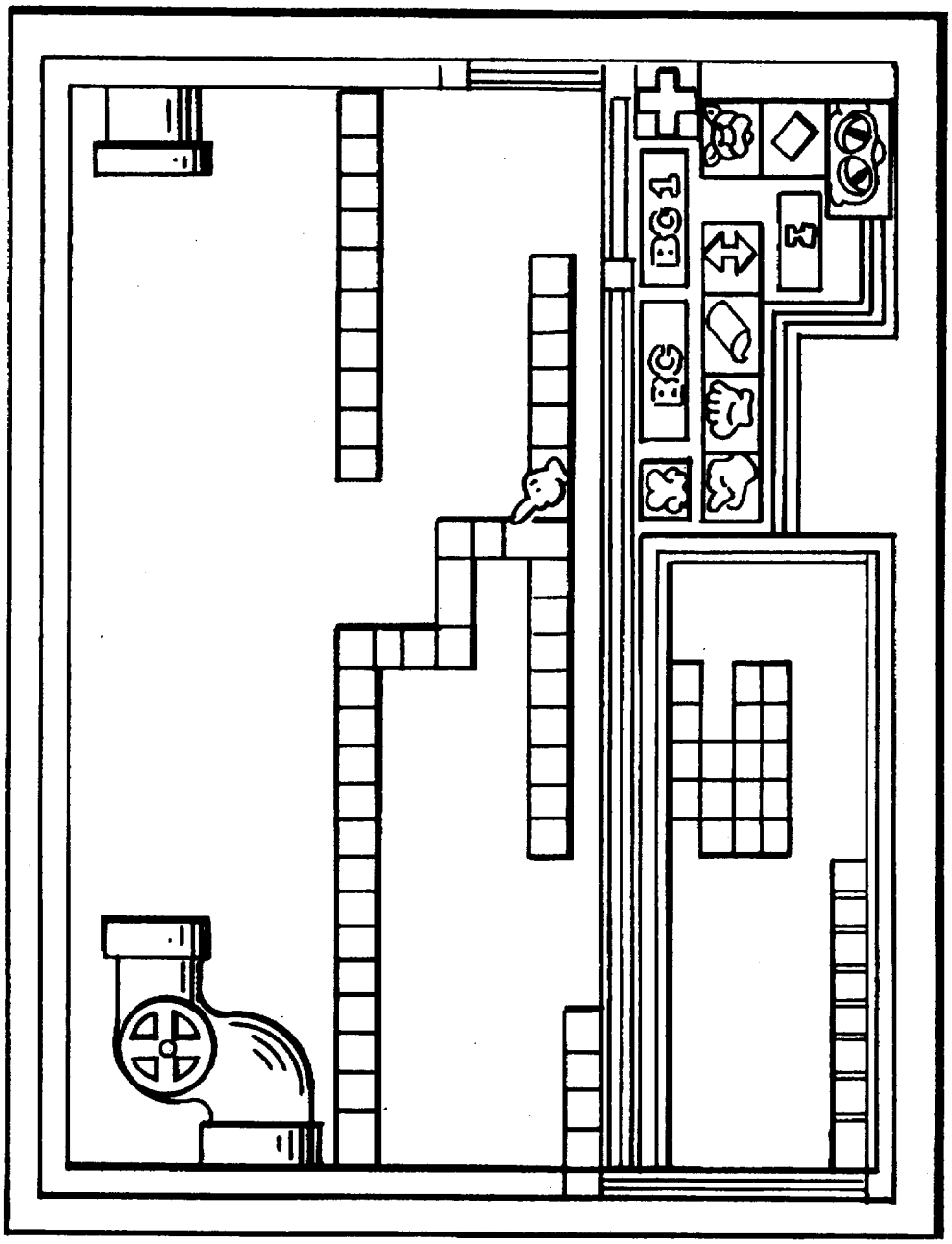
FIG. 11 is an illustrative background screen editor.

Turning back to FIG. 6, if, after a system break has been initiated, the user clicks on the stage icon 54 on system window 50, the stage window shown in FIG. 18 is displayed on the screen. A "screen editor" is accessed such as shown in FIG. 11 by clicking on the screen icon 152 on the stage window. Using the screen editor, if desired, a background element from the bottom portion of FIG. 11 may be dragged up to the background screen portion to modify the actual display background. The screen editor permits the user to review and modify any one of a number of different background layers associated with the game at the point in time of the system break. The screen editor includes controls for horizontally and vertically scrolling the background to permit the user to view the entire background through a user accessible "view" mode which permits selection of, for example, a first, second or third background screen. Through the screen editor each of the different background layers are accessible and scrolling may be controlled to view the entirety of each of the background layers as well as to modify each layer.

Figure 12:
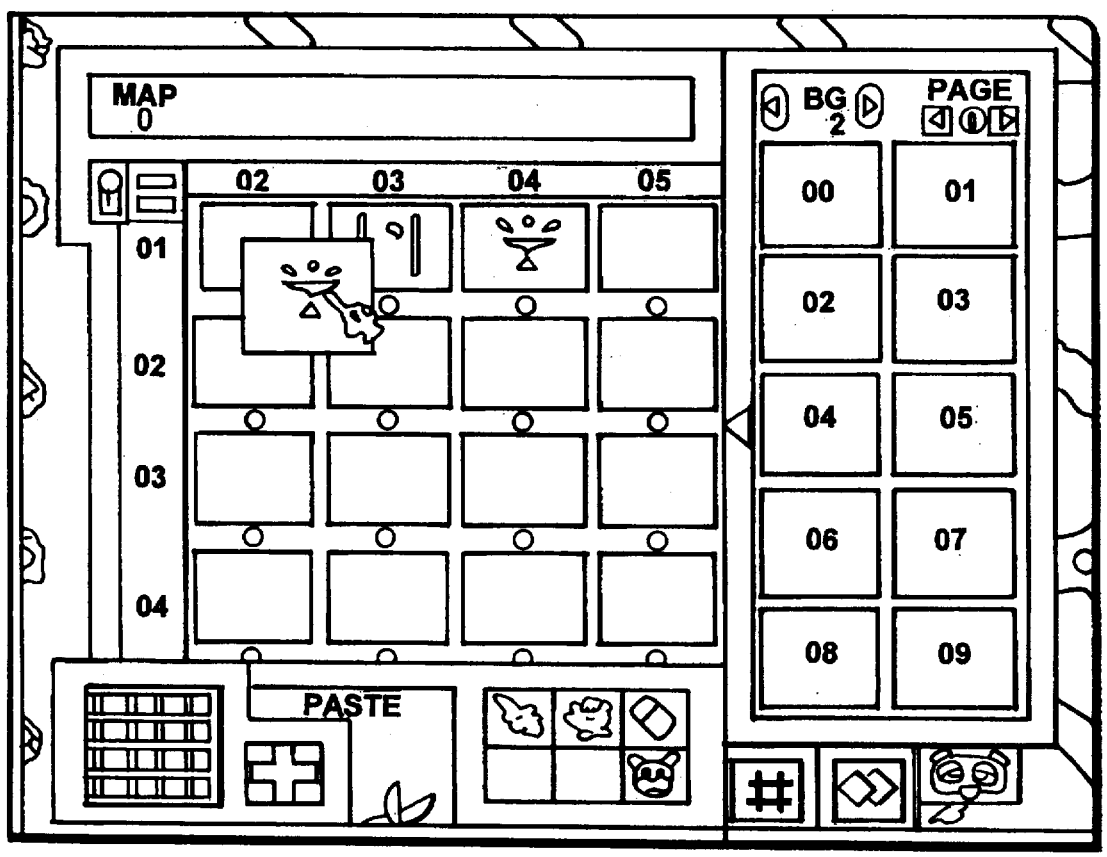
FIG. 12 shows an illustrative "map editor"
Figure 13:
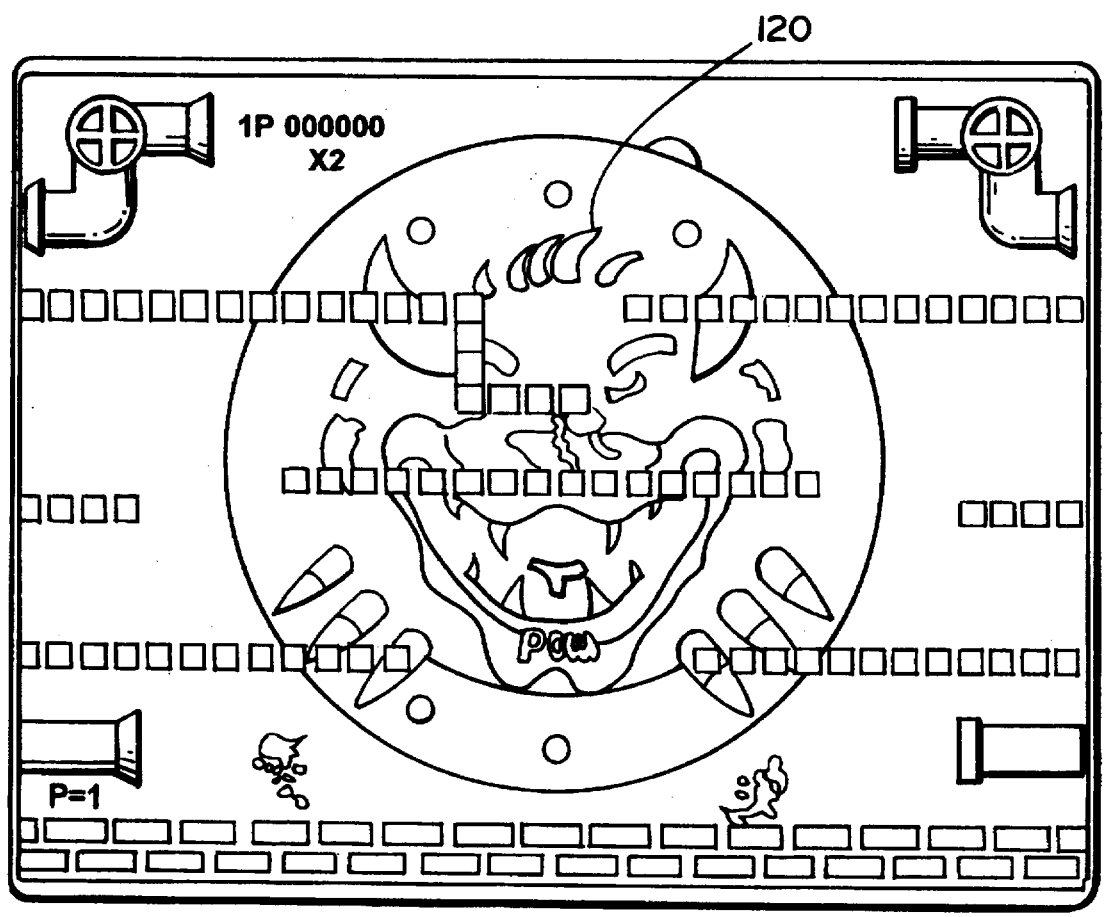
FIG. 13 illustrates how the background of the game display screen may be modified by dragging a background screen and pasting it onto an active background screen.

The screen editor also has an associated "map editor" which may be opened such as that shown in FIG. 12. The map editor is available to relocate available background screens which are shown in a reduced form in the map editor. Using the map editor "pasting" function, the background of the game display screen may be modified by, for example, dragging a background screen drawing a character such as indicated at 120 in FIG. 13 and pasting it onto an active background.

Figure 14:
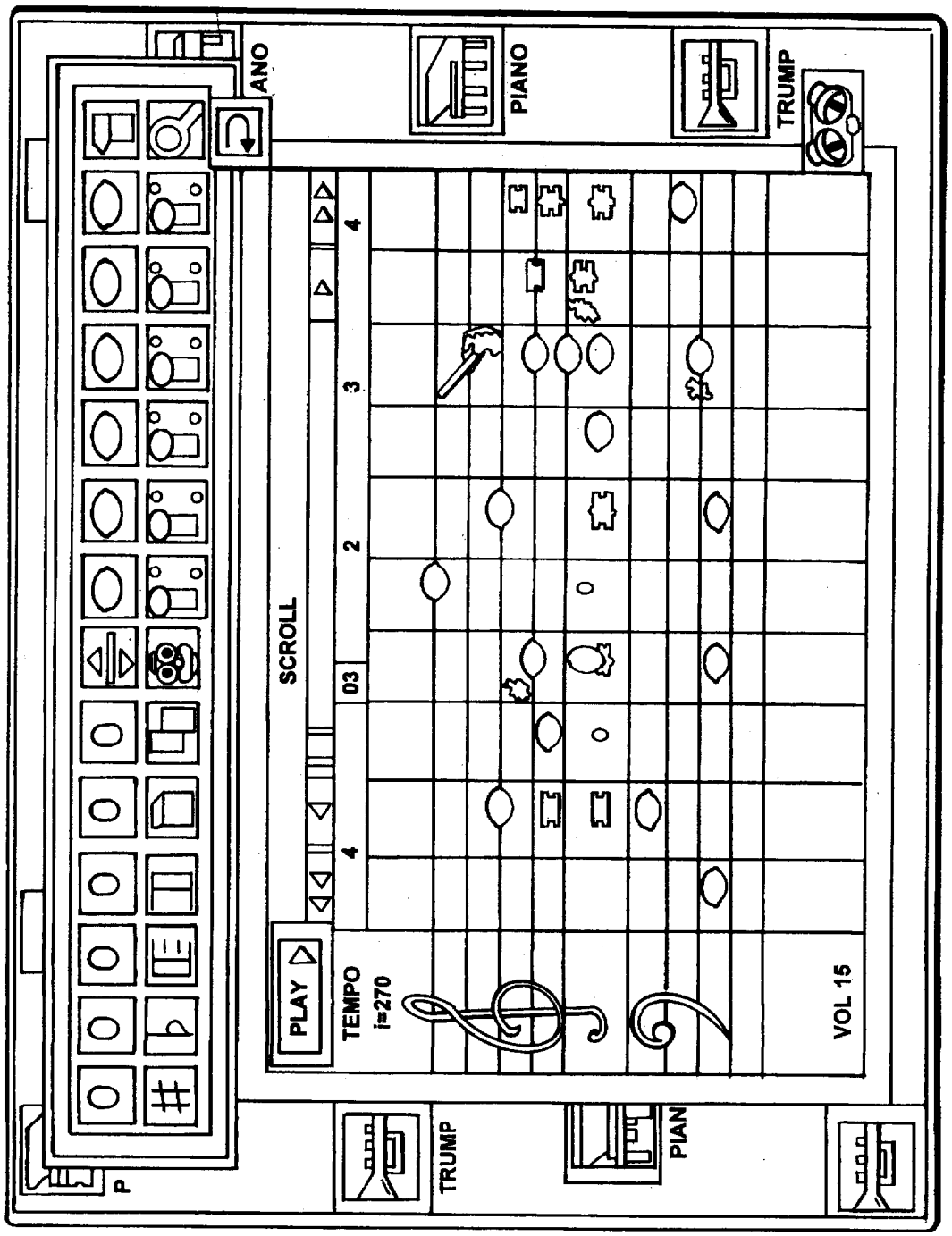
FIG. 14 shows an illustrative music editing screen.

The music associated with the video game background may be modified by accessing the music editor by clicking on a musical symbol icon associated with a "STAGE" window, which will be described further below, to result in a screen display such as shown in FIG. 14. As indicated in FIG. 14, the music editor displays a game music sheet. The "switches" (which, during music edit, are displayed in color) correspond to similarly colored figures on the game music sheet display. By selecting, via the mouse, one of the displayed switches shown in FIG. 14, it is possible to playback only the bass portion of the music, the piano portion of the music or any other instrument that is selected. By selectively layering the bass, piano and other musical sounds, the background music is formulated.

If a colored symbol is clicked in FIG. 14 identifying a selected musical segment, the window shown in FIG. 15 is generated and overlayed on the musical editor screen of FIG. 14 to thereby permit individual control over musical tone, sound volume, etc. for each selected numerical segment. For example, if the "KEY" control shown in FIG. 15 is manipulated, the background music key will change as the mouse is moved to drag the key control to a different setting. Similar control may be exercised over "echo", "tempo", "pan" and any other desired aspect of the background music. The "pan" control permits manipulation of the left/right stereo balance.

Figure 15A:
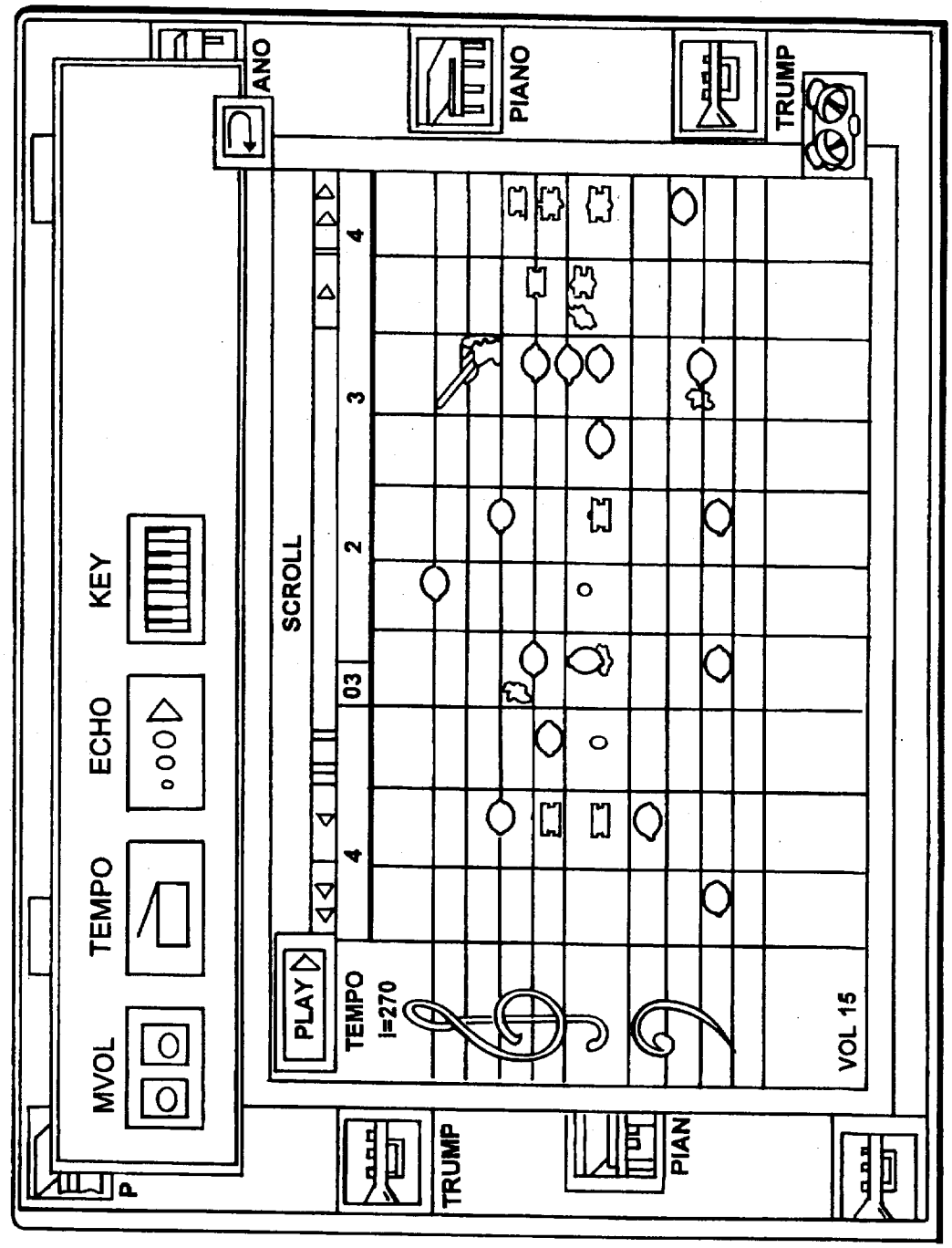
FIG. 15A is an illustrative music editor screen which permits music to be changed in real time while the music is being played back.

In addition, the music editor of the present invention permits the music to be changed in real time while the music is being played back. If a play symbol is clicked in FIG. 14, the background music is played and the window shown in FIG. 15A is generated. The window is used to change "music volume", "tempo", "echo" and "key" in real time with playing music. For example, if the "key" icon is clicked, a control bar, such as a key bar in FIG. 15, is generated and real time control may be exercised.

The original model software includes a predetermined number of original sound waveforms associated with the game, e.g., 32. The user is able to assign the original sound waveform to eight sound courses and selectively modify any aspect of the sound courses using the musical editor. A figure identifying each sound course on the sound sheet may be displayed by a unique mark associated with each original sound waveform. The musical editor software continually checks the state of each of the icons shown in FIG. 15A and modifies the output music accordingly. In addition, the sampling waveform recorded from microphone 10 can be added to the original sound waveform list.

Figure 16:
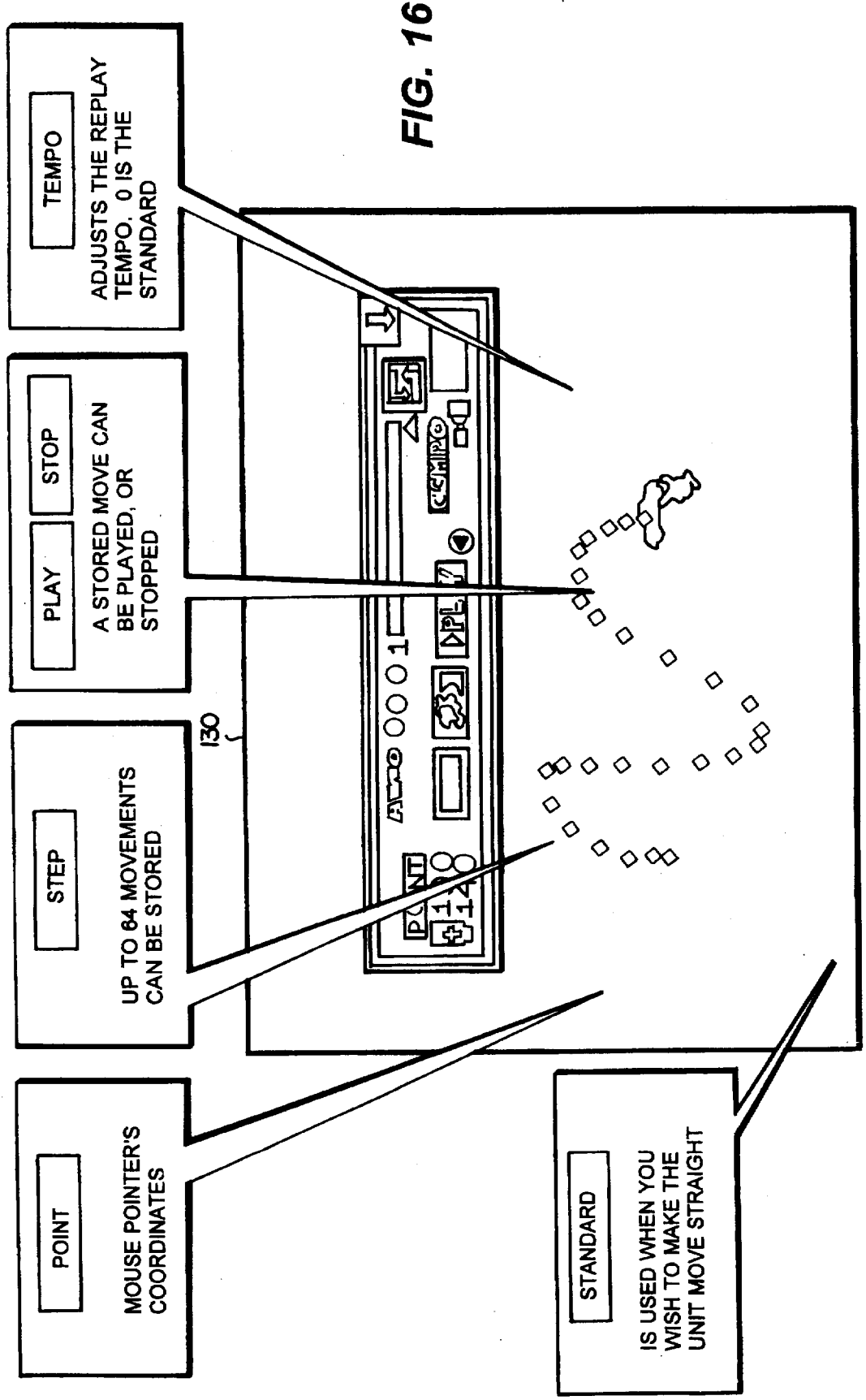
FIG. 16 is an illustrative screen display depicting the operation of the auto programmer.

The game processor system additionally includes an "auto programmer" feature by which movement of an object may be modified by the user. An exemplary display explaining the operation of the auto programmer is shown in FIG. 16. The auto programmer is accessed by clicking on the auto programmer icon 76 in FIG. 7 or via the auto programmer icon associated with the "all status" editor of FIG. 9. Initially, a unit such as the character shown in FIG. 16 is selected by pressing the left mouse button. Using the mouse, a path containing up to 64 movements indicated by dots can be stored. If the left mouse button is depressed while the mouse is still moving along a path the entire path is stored. If the dots are disposed such that they are close together, the movement is slow. If the dots are further apart, the movement is faster. The speed of movement, however, can be further adjusted by the use of a tempo control shown in FIG. 16. FIG. 16 has an associated play or stop control in which a path can be played back or, if desired by the user, stopped and the path thereafter altered. By using a "sound effect" button 130 and the step control bar shown in FIG. 16, sounds may be associated with an object's movement. For example, a "banging" sound can be associated with an object reaching a peak in a path. By holding the step button the object may be moved to the point where sounds are to be added. The clicking of the "sound effect" button associates the selected sound with a point in the path to which the object has been stepped.

Figure 17:
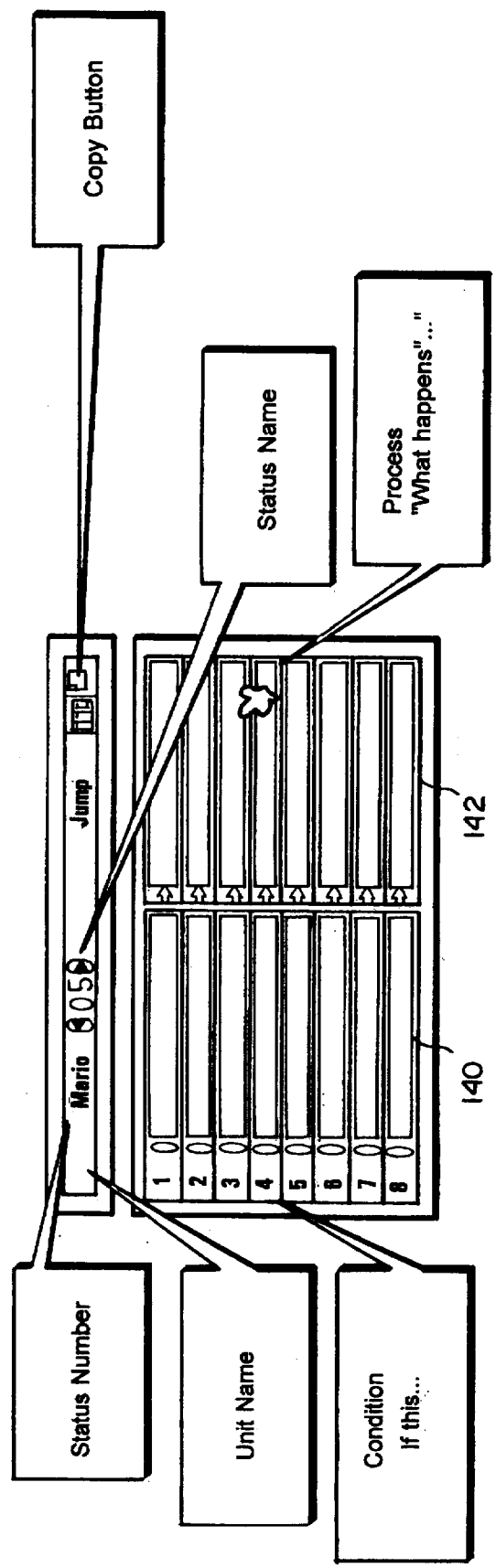
FIG. 17 is an exemplary status editor display screen.

The game processor system also includes a "status" editor. If during game play, a system break is initiated when, for example, the character Mario is jumping, the Mario window shown in FIG. 7 is accessed. If "status editor" icon 66 is selected at this point and time, then a display screen such as shown in FIG. 17 results. In FIG. 17, for the character Mario having a status of "jumping", a status screen is shown having a first column 140 and a second column 142. The column 140 includes rows which define a sequence of conditions. The conditions specify, for example, whether Mario reaches a particular height in a jump. Column 142 identifies for each condition a result related process that occurs if the condition is detected. For example, if Mario reaches a certain height in a jump, then Mario may, for example, disappear. The status editor permits the user to change the conditions and/or the results. For example, the user may change the result which flows from Mario reaching a certain height in a jump from "Mario disappears" to, for example, "nothing happens". Then when the game is resumed, the modified process will be performed when the condition is detected. The status editor shown in FIG. 17 also permits creation of a new process by those familiar with video game programming language instructions via keyboard 18 shown in FIG. 1. If a process on the column 142 is clicked, a process list is generated on the screen. Any listed process can be selected to be modified. if a process on the process list is clicked, the process program of the process can be modified with video game program language. The video game program language instructions are compiled automatically and stored as a new process on the process list.

This direct input of game program language instructions, which are similar to BASIC instructions, is expected to be utilized by advanced, sophisticated game designers. Such game programming language instructions may alternatively be used by an advanced game designer who does not chose to begin game design starting with model software based on a known genre of games. Such a sophisticated user may use the keyboard to, in effect, create his or her own original model software and use the features described herein to modify the user's created original game.

Turning back to FIG. 6, as noted above, the system window 50 includes a stage icon 54. The stage icon opens the stage window shown in FIG. 18 below. Stage window Indicator 150 displays the current stage number and the status name such as for example, "during game". Icon 152 is the screen button which, as previously described, permits editing of the current background. The map icon 154 as previously described, permits changing the current background map. Selection of icon 156 labelled "BGM" results in editing the current background music. The status icon 158 accesses the status editor to change the programming as described above of the current stage. Icon 160 returns back to the system window shown in FIG. 6. Icon 162 resumes game play and icon 164 displays the current stage number and a current status name.

Figure 19:
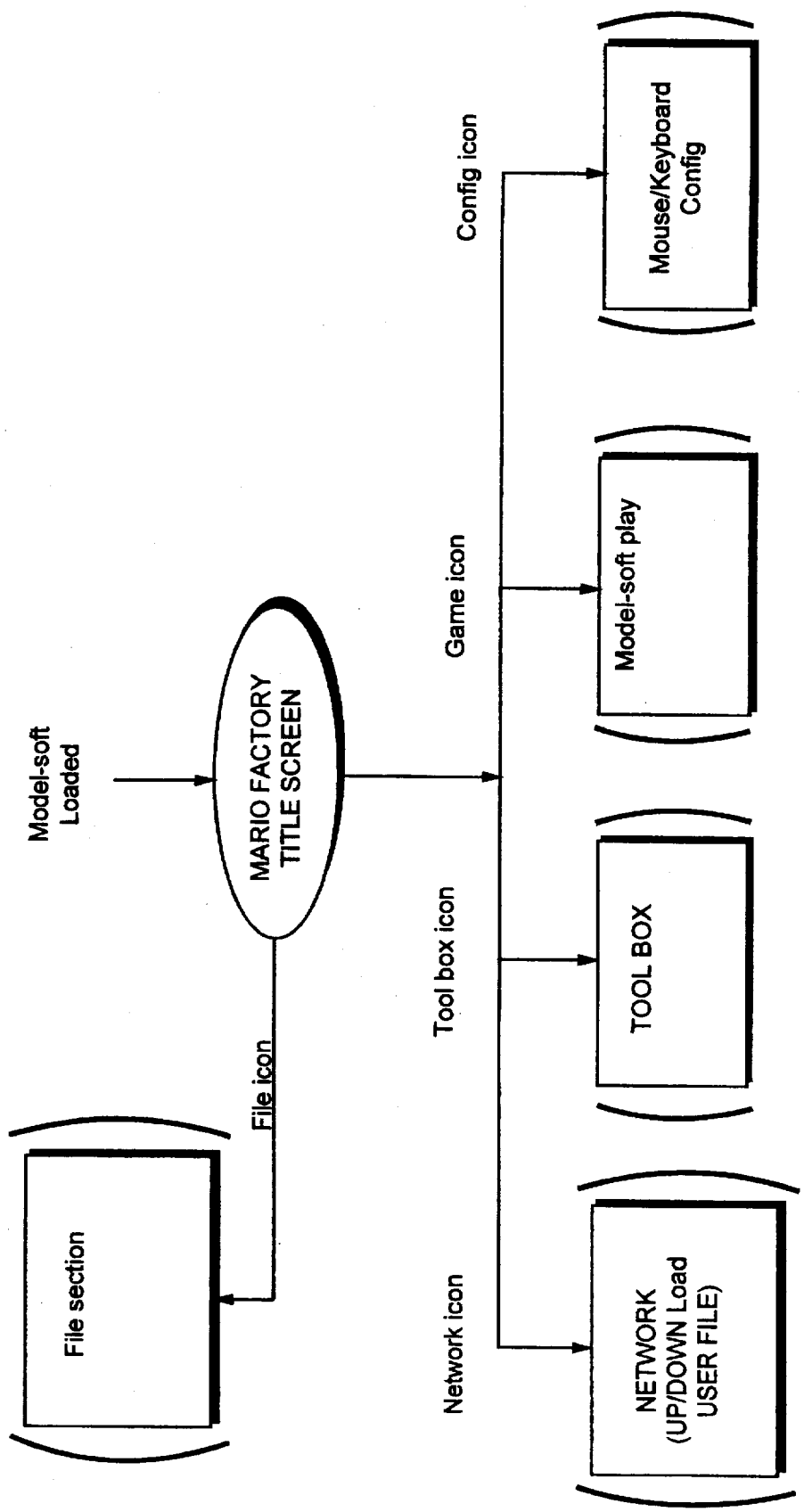
FIG. 19 is a functional representation of the Mario Factory title screen shown in FIG. 5.
Figure 20:
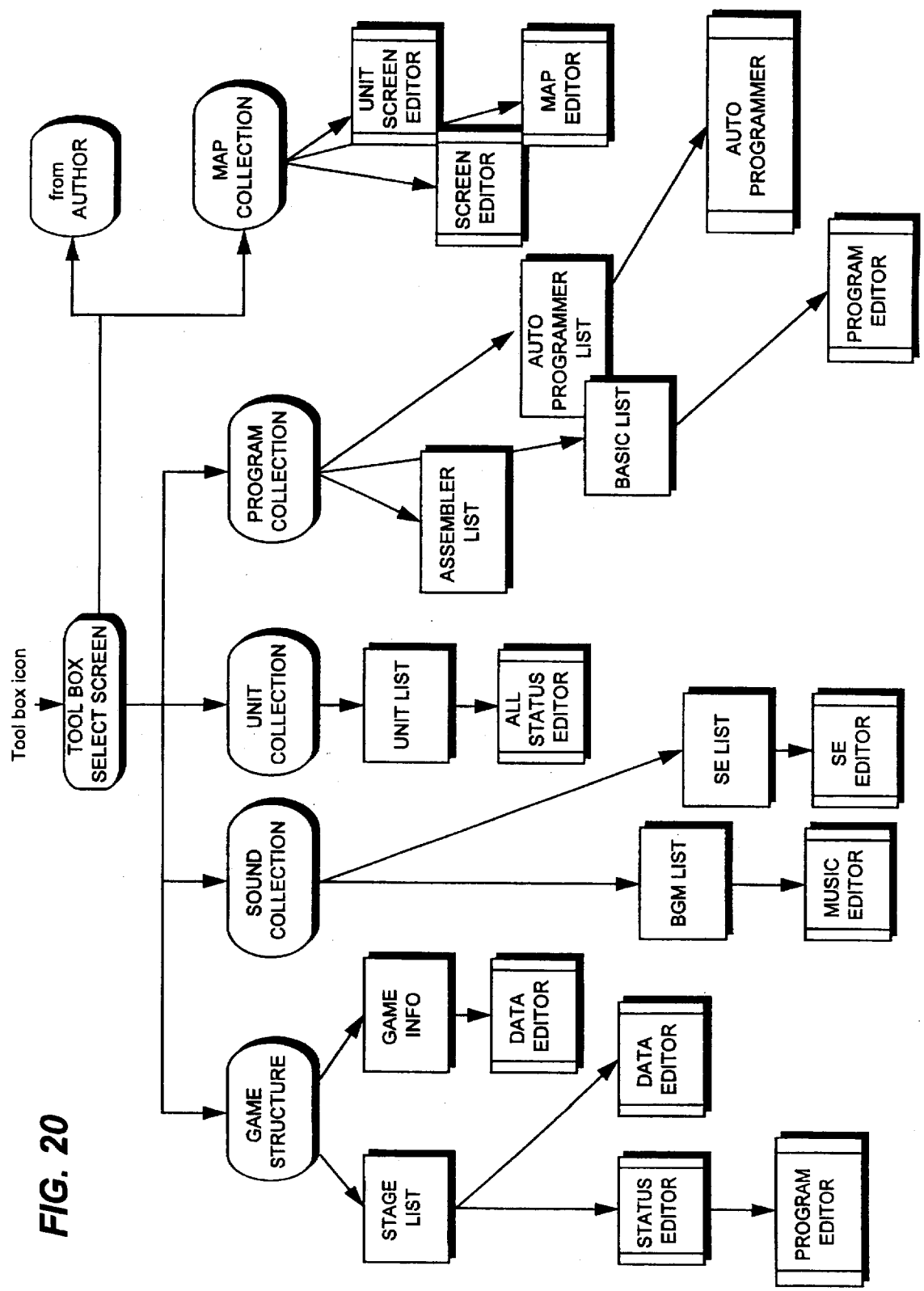
FIG. 20 is a functional diagram identifying the editing related tools accessible through the "tool box" selection screen.
Figure 21:
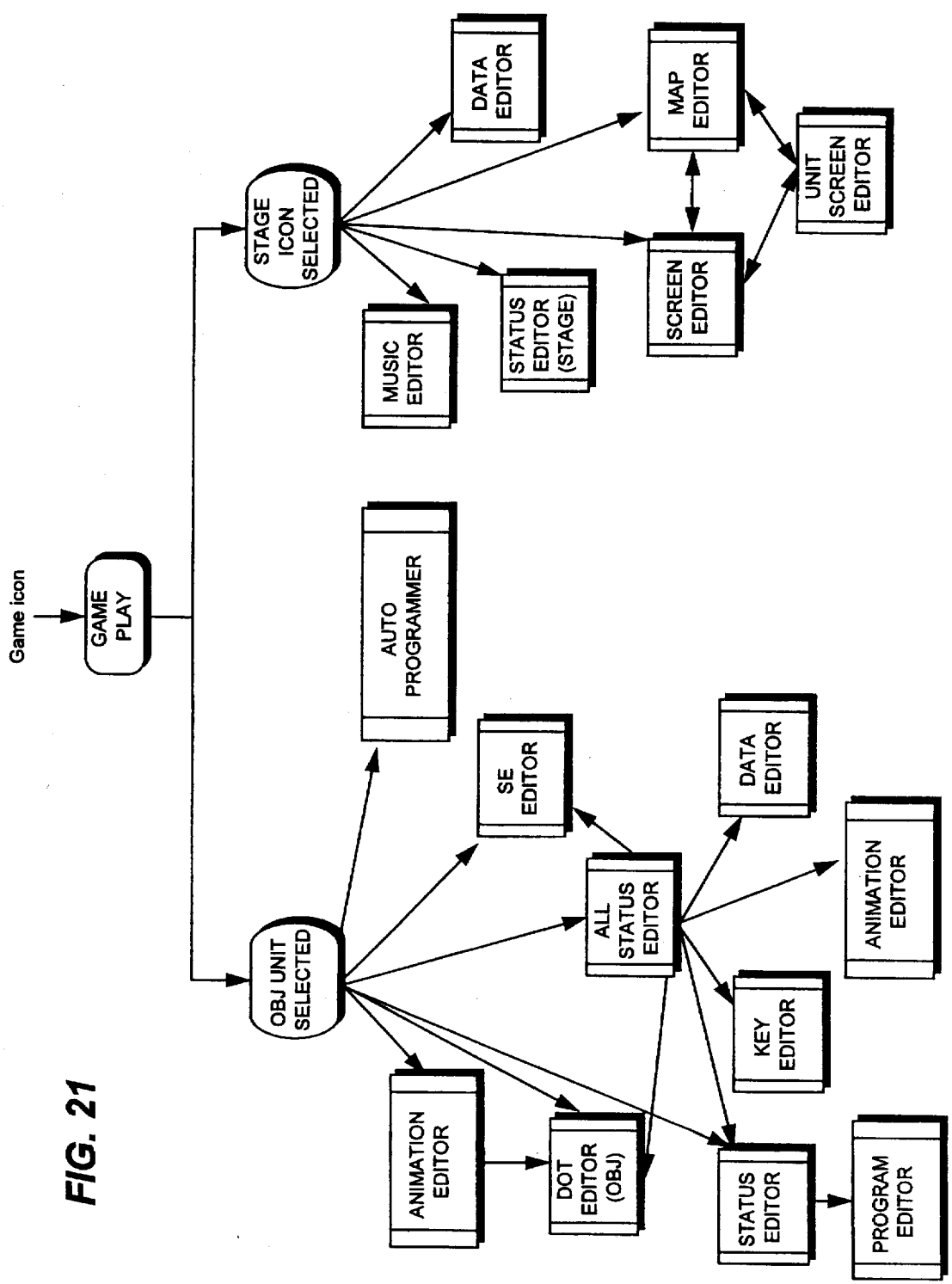
FIG. 21 is a functional diagram identifying the model software related editorial features accessible during game break.

FIGS. 19 through 21 summarize the manner in which the game modifying/editor display screens, described above in conjunction with FIGS. 5 through 18, may be accessed beginning with the "Mario Factory" screen. FIG. 19 is a functional representation of the Mario Factory title screen shown in FIG. 5. The file icon, shown in FIG. 19, indicates the selection of a file. If the user clicks on the "tool box" icon, the tool box select screen and its editorial features functionally represented in FIG. 20, may be accessed. By clicking on the "game" icon, the model software related editorial features shown in FIG. 21, may be accessed. If the "configuration" icon is clicked, the user may change either the mouse or keyboard configuration. By clicking on the network icon, model software and/or user files (indicative of modifiable portions of the game) may be transmitted to or received from other users via modem 22.

FIG. 20 identifies the editing related tools accessible through the "tool box" selection screen. By accessing the tool box screen, game play may be changed outside of the context of the game. In this fashion, a user may not need to play the entire game to change any particular character or any aspect of the game desired. Instead, the user may go directly to the data and change it. Through the use of the tool box which is accessed from the FIG. 5 Mario Factory title screen by clicking on the tool box icon, an advanced user may make many detailed changes to the game without making the changes from the context of the game itself. The "From Author" block indicates that the author may transmit a message via the network, for example, describing the details of a transmitted game program. The "map collection" block indicates the ability to collect various background maps and to edit those maps with the screen editor, unit screen editor and map editor. The unit screen editor is accessed to dispose the units to the position indicated on the map. Usually, the unit screen editor is accessed by clicking on the "unit" icon on the map editor as shown in FIG. 21. At the tool box selection screen, the unit screen editor is accessed directly from the map collection menu.

Through the "tool box" select screen, a "program collection" feature may be accessed to receive an assembler listing, a basic listing and an auto programmer listing. The basic listing and the auto programmer listing may be edited by the program editor and the auto programmer respectively.

A "unit collection" feature may be utilized to access a unit list identifying the various units that exist throughout the game. The unit list may be edited by the all-status editor. The list compiles all units which are registered within the game program. The tool box screen additionally permits access of a sound collection feature which provides access to a background music list which may be edited by the music editor and a special effects (SE) list which may be edited by the special effects editor.

The tool box select screen also permits access to a "game structure" collection feature. These features typically apply to the entire game and go beyond individual unit applicability. For example, a "game structure" feature may identify how many times a particular character may die before the game ends. This characteristic is set during game structure editing. In regard to the "game info" feature, game structure in this category may identify how many green turtles may appear in the game or what the first screen level may be. Such information may be edited via the data editor. The stage list game structure information relates to various game sequences which are available. Stage list information may be modified via the status editor, the program editor or the data editor.

FIG. 21 identifies editorial/game fabricating changes that can be made during game play. After a system break is initiated, as described in detail above, a user may access editors by selecting, for editing, a moving object unit or by selecting a stage icon for changing the background. The various editors which are shown correspond to the icons associated with the various screen displays. For example, the animation editor, dot editor, auto programmer, special effects editor, all-status editor, key editor, status editor, program editor and data editor are accessible using the icons shown, for example, in FIG. 7. Similarly, the stage or background related editors such as the music editor, status editor, screen editor, unit screen editor, map editor and data editor are associated with the stage window related icon shown in FIG. 18. As shown in FIG. 21 in the exemplary embodiment, the unit screen editor may be reached by accessing first either the screen editor or the map editor. The editors which are accessed via other editors are typically those which are utilized less frequently by, for example, more advanced game developers who may use a program editor to actually change game program language instructions.

The editors identified in FIGS. 20 and 21 operate in the manner described in conjunction with FIGS. 5 through 18. For example, the auto programmer editor shown in FIGS. 20 and 21 provide the ability to edit object movement as indicated on the display screen shown in FIG. 16. The status editor identified in FIGS. 20 and 21 operates in the manner described in conjunction with the screen display of FIG. 17. The animation editor identified in FIGS. 20 and 21 operates as described in conjunction with FIG. 10. The all-status editor identified in FIG. 21 operates as previously described in conjunction with the display screen of FIG. 9.

Figure 22:
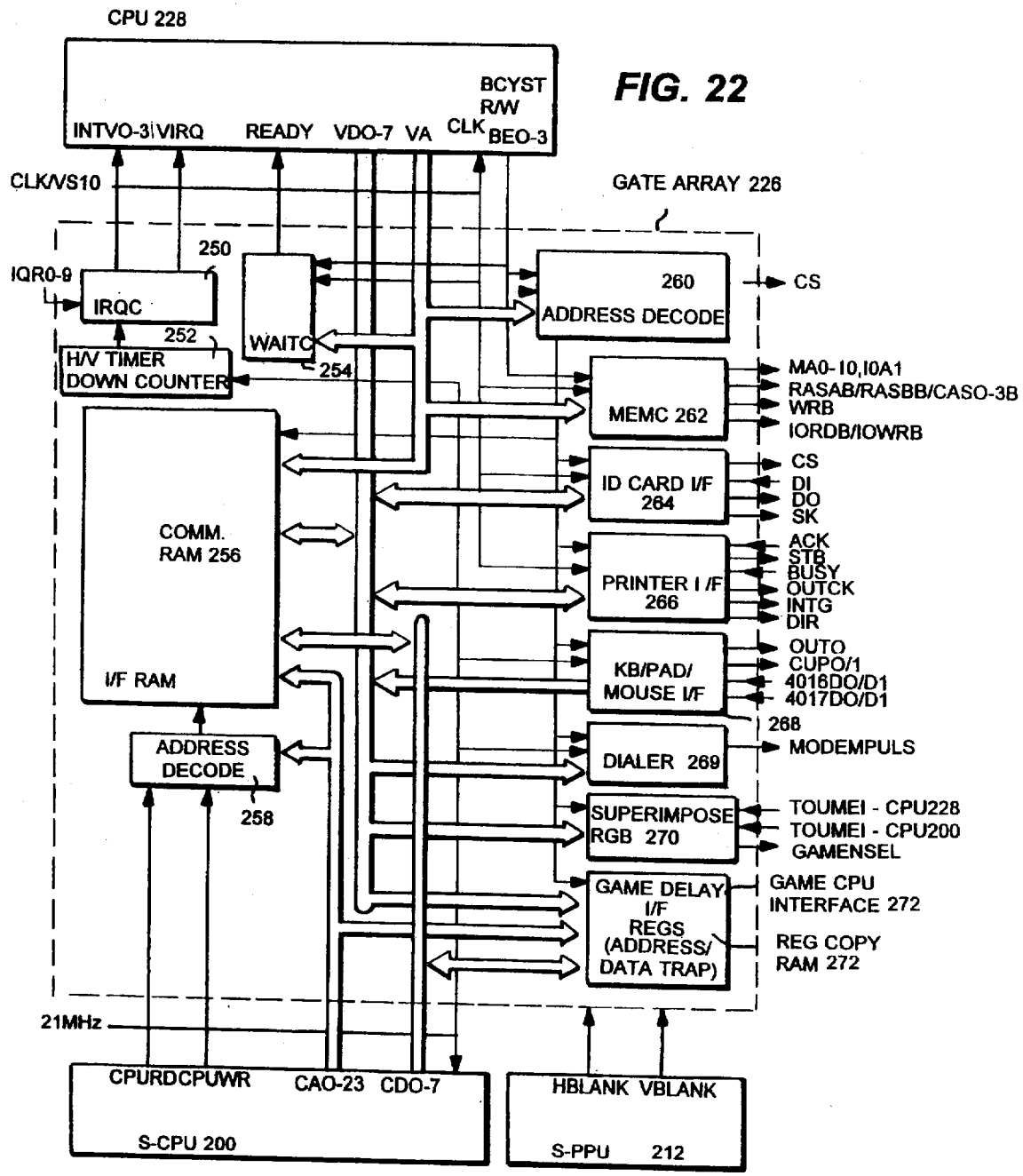
FIG. 22 is a detailed block diagram of the gate array 226 shown in FIG. 2A.

Turning back to the hardware associated with the illustrative embodiment of the present invention, FIG. 22 shows a more detailed block diagram of the gate array 226 shown in FIG. 2A. The gate array 226 is responsible for controlling a variety of functions including superimposing the video signals output from CPU 228 and game CPU 200, game processor debugging related functions (hardware and software breaks, address, data traps, etc.) as well as a variety of interface functions (such as game CPU 200/main CPU 228 interface control; game hand controller interface and mouse, keyboard and ID card interface). The gate array 226 also is involved in CPU 228 bus access control, interrupt control, CPU 228 ready control; DRAM control including control of the control bus, address multiplexing, refresh control and peripheral LSI access control including control of the ROM 234, flash memory 236, floppy disk control 240, etc.

As shown in FIG. 22, the gate army interacts with various components shown in FIGS. 2A and 2B including CPU 228, CPU 200, PPU 212, etc. Address decoder 260 is coupled to the address bus of CPU 228 and generates chip select signals to other devices associated with CPU 228. As can seen in FIG. 22, address decoder 260 receives various clock (CLK), control signals (R/W), timing signals (BCYST) and generates the chip select signals for selecting the A/D converter 238, flash memory 236 and other components on the main CPU 228 as well as other gate array components.

Gate array 226 additionally includes memory controller 262 which is coupled to the CPU 228 address bus for generating address and other controls signals for controlling DRAM 230 and for generating various read/write signals associated with CPU 228. The memory controller 262 is responsive to clock, timing and control signals from CPU 228 to generate DRAM addresses MA01 through MA10, row and column address signals for the DRAM 230, a write signal for the DRAM 230 and I/O read and I/O write control signals.

Gate array 226 additionally includes a wait controller 254 which generates a delay for compensating for CPU 228's very high access speed. The wait controller 254 is responsive to a timing signal (such as the bus cycle start signal (BCYST)) and clock and address signals from CPU 228, and, after the appropriate delay interval, couples a ready control signal to CPU 228.

Gate array 226 additionally includes an ID card interface 264, a printer interface 266, and a keyboard, pad, and mouse interface 268. The ID card includes an EPROM from which data is read. The ID card interface 264 interfaces communications between CPU 228 and ID card 6. The printer interface 266 is an interface provided for interfacing with a printer and includes input/output registers and other conventional printer interface circuitry. In the preferred exemplary embodiment, the printer interface 266 interfaces with a Centronics printer. Keyboard, pad and mouse interface 268 controls the exchange of data and control signals between the keyboard 18, controllers 12, 14, mouse 16 and CPU 228. Dialer 269 is coupled to CPU 228's data bus and sends a dial pulse directly to modem board 22 shown in FIG. 2B. Dialer 269 receives a digital signal indicative of a desired destination phone number and converts the digital signal to a pulse format for controlling modem 22.

Figure 23:
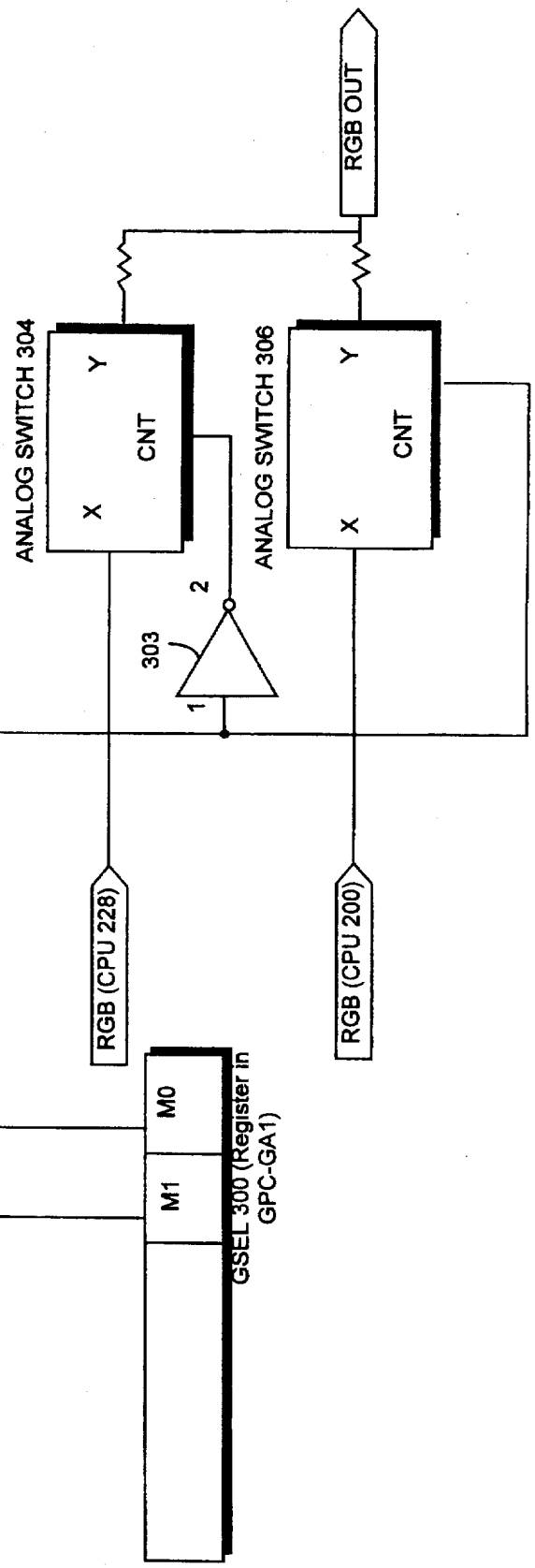
FIG. 23 shows the superimpose controller circuitry.

The gate array 226 additionally includes RGB interface 270 which, in the illustrative embodiment, includes a portion of the superimpose control circuitry of the superimpose controller 216, which is shown in FIG. 2B and is described in detail in FIG. 23. The RGB analog output of signals accessed by main CPU 228 and PPU 224 is superimposed on the analog output of signals processed by game CPU 200 and PPU 212. RGB 270 includes circuitry for generating editing related image cell displays for controlling the modification of game play superimposed on game play related screens. The circuit receives superimpose related control signals (TOUMEI) from the CPU 228 and CPU 200. These control signals are output via a respective CPU 228 and 200 when an associated RGB signal is all zeros, i.e., transparent.

The superimpose controller 216 is shown in further detail in FIG. 23. In the exemplary embodiment, RGB 270 includes the register GSEL 300, 4-1MPX 302 and inverter 301 in FIG. 23. Inverter 303 and analog switches 304 and 306 are not part of the gate array 226 in one exemplary embodiment of the present invention but rather are disposed in the superimpose controller 216 shown in FIG. 2B. The GSEL register 300 as shown in FIG. 23 is settable under program control by CPU 228. The GSEL register 300 bits M0, M1 are coupled as control inputs to multiplexer 302 to select which one of the four input signals to output from multiplexer 302. The previously mentioned TOUMEI signals are input to multiplexer 302 by CPU 200 and CPU 228 whenever there is a blank or empty space associated with the respective program execution. The TOUMEI signal from CPU 228 is coupled to multiplexer 302 via an inverting amplifier 301.

Multiplexer 302 also receives "0" and "1" input signals. If, for example, the "0" input is selected by GSEL 300 as the signal to be output, due to inverter 303, the analog switch 304 will be turned on (due to a "1" at control input) and the analog switch 306 will be turned off (due to the "0" at its control input). Thus, under these conditions, the RGB signal from CPU 228 will be coupled as the RGB output as opposed to the RGB output from game CPU 200. The reverse situation will occur if "1" is the selected output of multiplexer 302. The visual effect from such a operation will be to switch back and forth from a game screen generated by a CPU 200 and a system screen generated by CPU 228.

The selection of CPU 228 and CPU 200 TOUMEI signals controls priority of transparency if, for example, a system screen generated by CPU 228 should be disposed on top of a game screen generated by CPU 200. If a TOUMEI signal for game CPU 200 is output that indicates that the game CPU signal should be transparent and the main CPU 228 screen should overlay it. Thus, when the system screen is overlayed on the game screen or vice versa, either input D2 or D3 shown in FIG. 23 is selected. The 0 or 1 input determines whether a game screen or system screen is shown at all. For example, when the TOUMEI signal for CPU 228 is a "0" and is selected, due to inverter 301, the output of multiplexer 302 will be a "1" to result in the selection of the game CPU 200. VVhen such a signal is output a game character can be seen through the clear dots of an icon associated with main CPU 228 execution. According to the setting of the GSEL register 300 by CPU 228, the screen display and associated superposition of a game screen display and game editing display is controlled.

Turning back to FIG. 22, gate array 226 also includes a game CPU interface 272. Game CPU interface 272 includes the previously identified register copy RAM for receiving a wide range of game related information from CPU 200 via its address and data busses for monitoring by CPU 228. In addition, game CPU interface 272 includes various buffers for supporting CPU 228 intercommunication in game debugging operations. The game CPU interface 272 also includes address and data trap related circuitry for performing conventional game debugging operations to permit the CPU 228 to debug game CPU 200 operation. Through game CPU interface 272, CPU 228 becomes aware whether it is an appropriate time period to initiate a system break operation.

The gate array 226 also includes horizontal/vertical (H/V) timer and down counter 252 which is loadable by CPU 228 with a predetermined count for generating an interrupt control signal to interrupt controller 250. The H/V timer 252 uses the horizontal blanking (HBLANK) and the vertical blanking (VBLANK) timing signals generated by PPU 212 as a timing base for counting. Through the use of the timing and counting circuitry 252, interrupts may be based on particular horizontal and vertical display positions for initiating certain operations such as, for example, a color change. The output of timing circuitry 252 is coupled to interrupt request controller (IRQC) 250 which, in turn, controls the generation of interrupt requests which are coupled to predetermined pins on CPU 228 as shown in FIG. 22.

As shown in FIG. 22, gate array 26 also includes a communication interface RAM 256. RAM 256 includes the communication RAM handshake port, and buffer registers described above for receiving information from main CPU 228 and for coupling such information to game CPU 200 for loading in RAM cartridge 4. RAM 256 is coupled to CPU 228 and CPU 200 address and data busses. An address decoder 258 receives CPU read, write and address signals from CPU 200 for controlling access to RAM 256 by CPU 200.

Figure 24A:
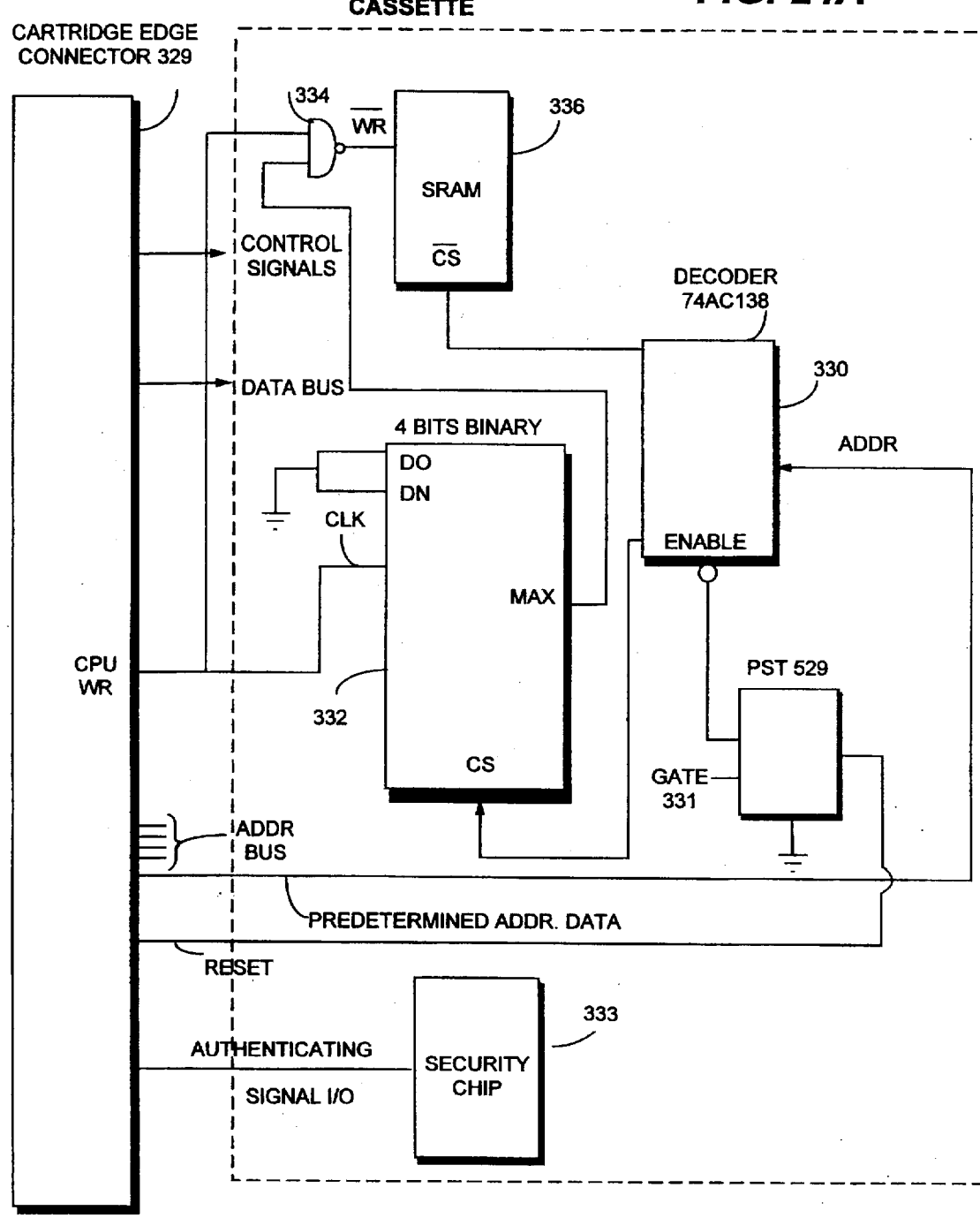
FIGS. 24A and 24C are simplified schematic diagrams of illustrative RAM cartridge embodiments and FIGS. 24B and 24D show illustrative ground, address, data, reset, and power connectors for the cartridge.
Figure 24B:
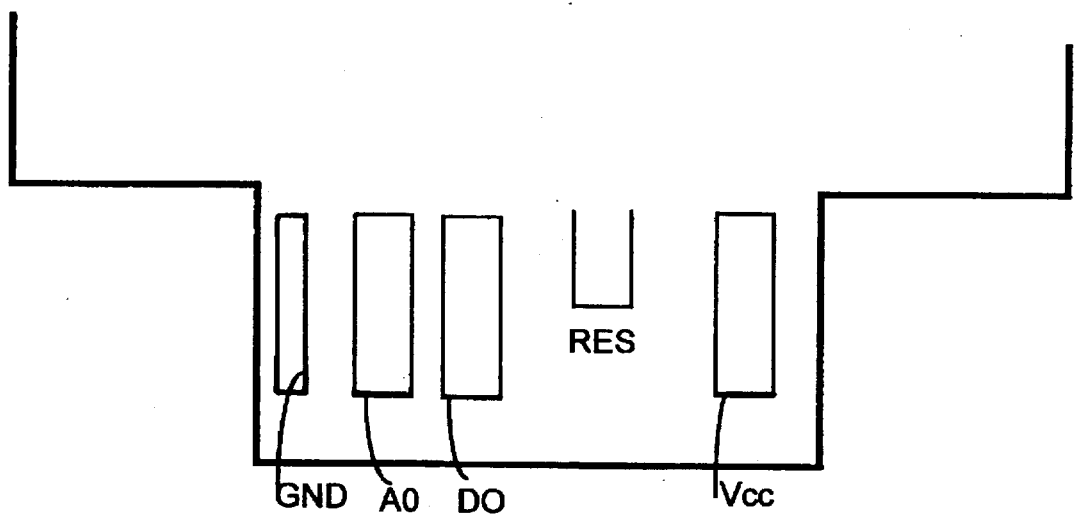

FIG. 24A is a simplified schematic diagram of RAM cartridge 4 which is used in the exemplary embodiment of the present invention to address potential problems which may develop under rare circumstances due to removal or insertion of a cartridge from the game processor system console 2 while the power is on. As shown in FIG. 24B, to preclude the unlikely possibility of cartridge components being damaged due to insertion or removal while the power is on, the pins in the cartridge edge connector are modified such that a pin which enables the cartridge RAM memory is shortened with respect to the power pin.

FIG. 24B shows the ground, address, data, reset, and power connectors for the cartridge 4. The reset pin from the game cartridge is shorter than the power line pin so that when the cartridge is pulled out even before the signal lines are disconnected, the enabling "reset" signal prevents the cartridge RAM from being written to prior to the power being disconnected. When the cartridge is inserted, the power and data lines are connected prior to the reset signal being placed in a high state to thereby enable writing to RAM 336 as a final operation. In this fashion, the information stored in the cartridge working RAM 336 is protected. When the cartridge is inserted into its connector, power is applied prior to enabling of the cartridge memory circuitry. When the cartridge is removed, the cartridge circuitry is disabled before the power is disconnected due to the shortened enable signal receiving pin.

Turning to FIG. 24A, when the cartridge is fully inserted with the power on, the reset signal (RES) is high. The reset signal is coupled to the enable input of a decoder 330 via a gating circuit 331. Decoder 330 includes one output coupled to a chip select pin of the game cartridge static RAM memory 336 (which is schematically shown in FIG. 24A). A further decoder 330 output is coupled to the chip select pin of four bit binary counter 332. The binary counter is initially set at 0. Decoder 330, which is coupled to the game cartridge address bus, detects a request to write to counter 332 and initiate the counter 332 to count up. When the writing pulse is given fifteen times, the counter 332 state is 1111 and counter 332 generates an output signal which is coupled to gating circuit 334. If an attempt is made to write into SRAM 336 when the output of counter 332 is at a high level, a write signal is coupled to (each of the RAM modules which constitute) RAM 336 to thereby permit data to be written into the cartridge RAM. Thus, the cartridge includes a write protect circuit to require writing to a predetermined address area fifteen times before permitting writing data into the RAM to preclude any possibility of component damage or loss of data when the cartridge is inserted or removed with the power on. When an attempt is made to write to a predetermined address fifteen times, the cartridge memory system is in effect unlocked. In the game processing system of the illustrative embodiment, the time spent writing into the RAM cartridge 4 is very small.

FIG. 24A also shows a cartridge edge connector 329. Among the signals coupled to the cartridge 4 are data signals and address signals carried on a data bus and address bus. Additionally, a reset signal is received, CPU read/write control signals and other control signal as received. The RAM cartridge shown in FIG. 24A additionally includes a security chip 333 which operates with a security chip 227 in FIG. 2A in a manner described in applicant's assignee's U.S. Pat. No. 4,799,635 which patent is hereby incorporated by reference. As indicated above, further details of an illustrative security system employed in conjunction with the present invention are described in the concurrently filed application entitled "SECURITY SYSTEMS AND METHODS FOR A VIDEOGRAPHICS AND AUTHENTICATION GAME/PROGRAM FABRICATING DEVICE", Ser. No. 08/332,812, filed Oct. 31, 1994, now U.S. Pat. No. 5,599,231. After RAM cartridge 4 is fully programmed for use in an SNES game system, the security chip 333 may be used as part of a security system to determine whether the cartridge is an authentic game cartridge in conjunction with the SNES game console that includes a corresponding security chip 333. Additionally, CPU 228 receives the output from security chip 227 and prevents game program execution and editing by CPU 200 unless there is a determination of authenticity in accordance with the teachings of '635 patent. In this regard both the security chip 333 and the main CPU 228 perform processing operations as generally disclosed in U.S. Pat. No. 4,799,635. Data indicative of the results of such processing are exchanged in a secure manner. If the main CPU 228 determines that the RAM cassette is not authentic based on data received via the gate array 226, the game CPU 200 is maintained in a reset state.

Figure 24C:
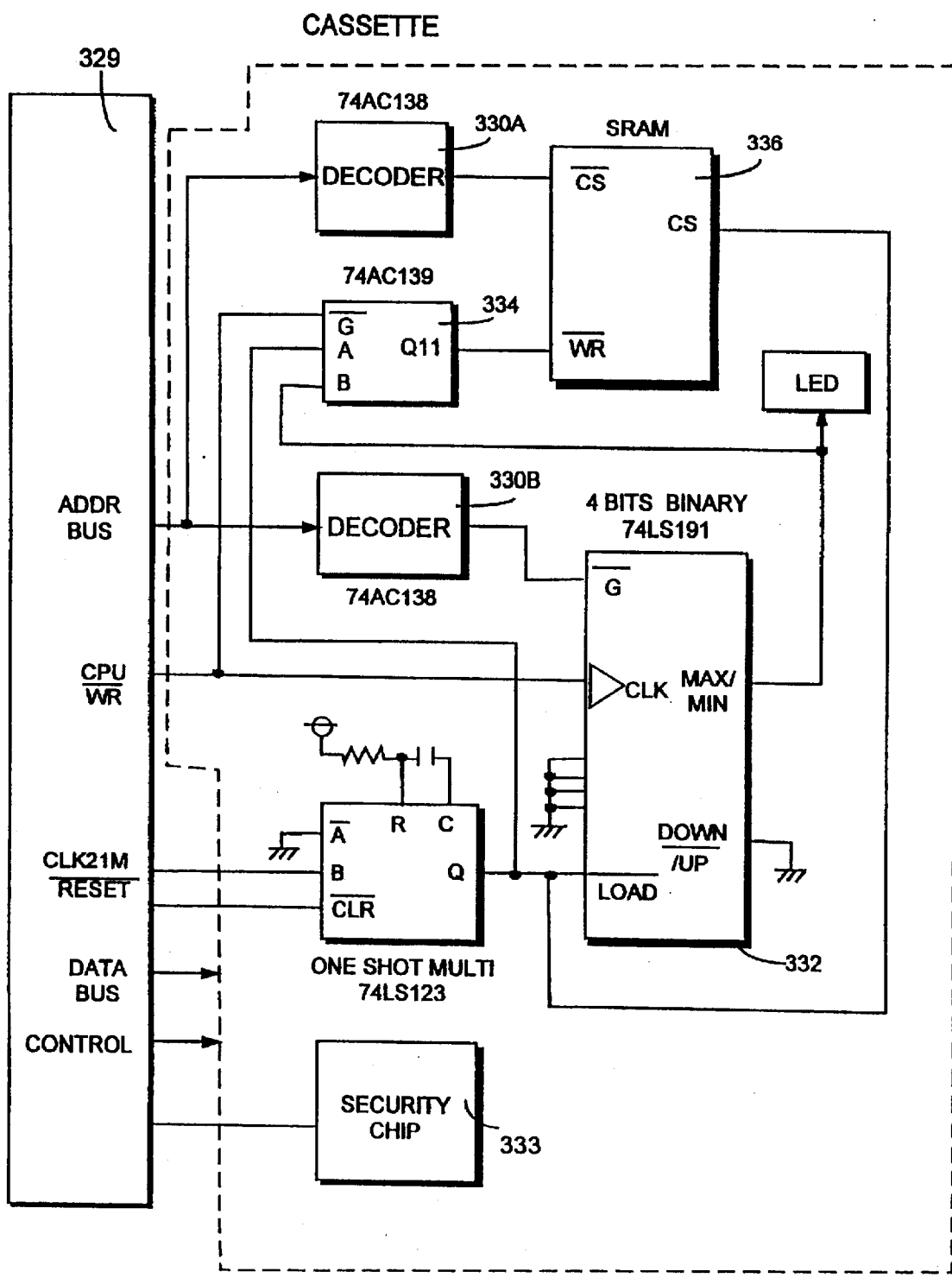

FIG. 24C is another illustrative way to implement cartridge circuitry corresponding to FIG. 24A. Circuits in FIG. 24C which correspond to like circuits in FIG. 24A are identically labeled and will not be further described. The one shot multivibrator generates the load signal to counter 332 when the CLK21M input carries no signal. The counter 332 is set to 0 by the load signal and writing into SRAM is disabled. In the normal operation, the CLK21M signal is continuously supplied from the console so the load signal is always disabled and the SRAM access can be accomplished in the same way as the circuitry of FIG. 24C.

Figure 24D:
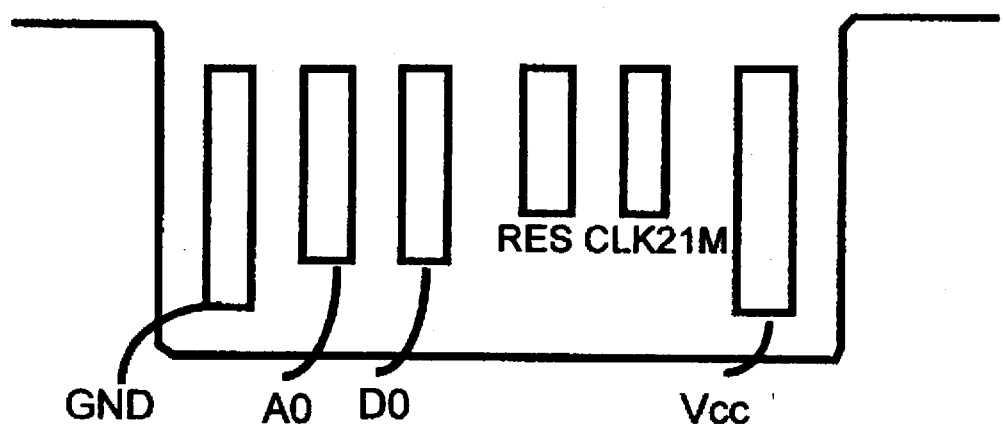

FIG. 24D shows an illustrative embodiment for cartridge connectors for use in conjunction with FIG. 24C. When the cartridge is pulled out, the CLK21M and reset signals are cut off before the other indicated signals are cut off. If the CLK21M input carries no signal, the load pulse is enabled. Thereafter, counter 332 loads 0 data and writing into the SRAM is disabled. In FIG. 24D, the address bus and data bus connectors are shorter than GND and VCC pins. Therefore, "LATCH UP" is prevented when the cartridge is pushed in while keeping power on.

Figure 25:
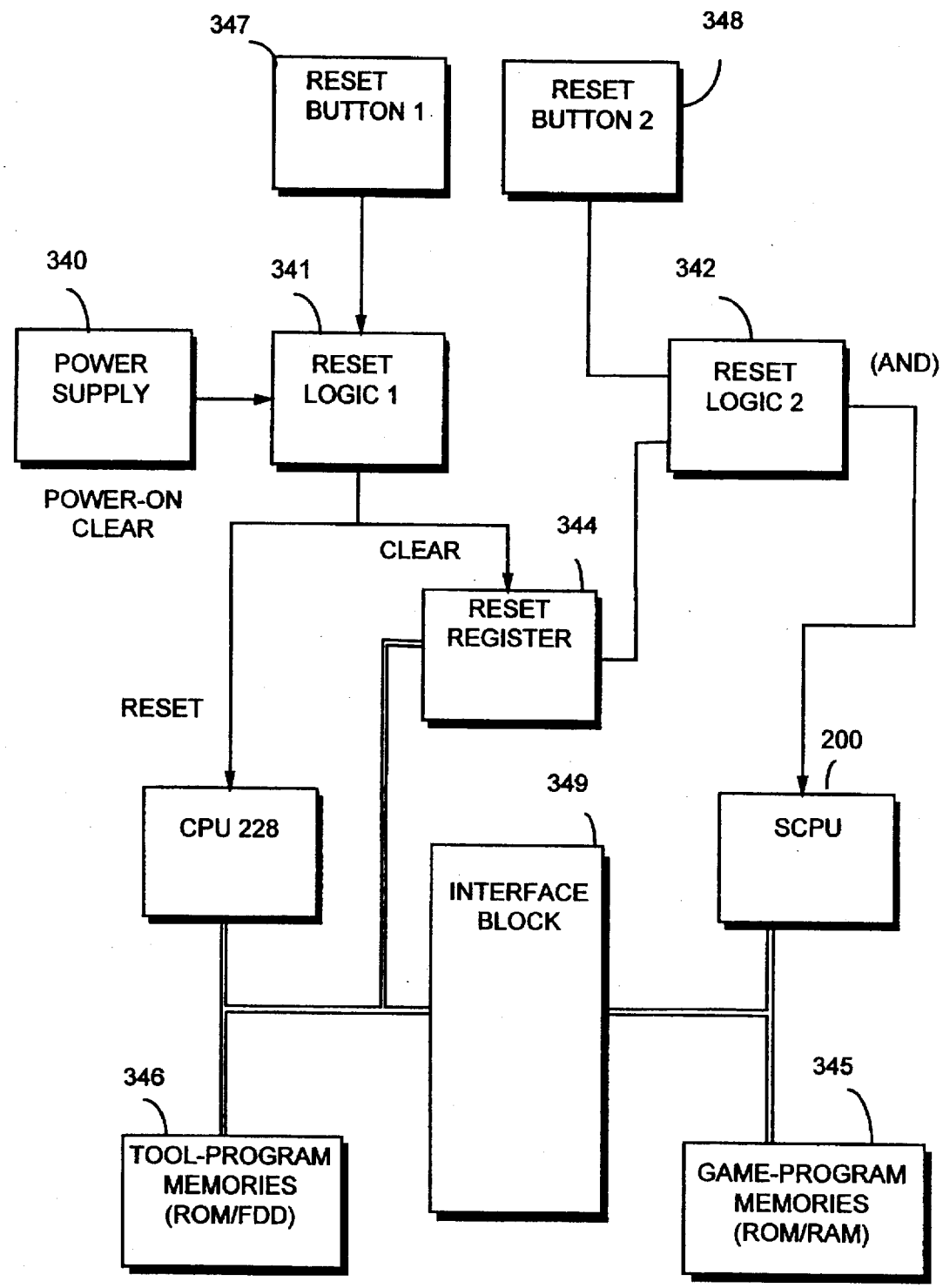
FIG. 25 is a block diagram of reset related circuitry in accordance with an exemplary embodiment of the present invention.

FIG. 25 is a block diagram of reset related circuitry in accordance with an exemplary embodiment of the present invention. The system includes a reset button 1 (347) and a reset button 2 (348), i.e., one reset button associated with main system CPU 228 and one associated with game CPU 200. Additionally, FIG. 25 includes a reset register 344 which enables main CPU 228 to reset game CPU 200 via software control and reset logic 2 (342). As indicated in FIG. 25, when the power supply 370 is turned on, reset logic 1 operates to reset main CPU 228 and clear reset register 344. Main CPU 228 may additionally be reset in response to depression of reset button 1 (347). Likewise game CPU 200 may be reset by depression of reset button 2 (348). Alternatively, main CPU 228, by accessing an instruction from its memory block 346, may set reset register 344 to initiate the resetting of game CPU 200, i.e., to cause game CPU 200 to be held in a predetermined known initialization state such as the beginning of a game program stored in memory 345. FIG. 25 also generally shows an interface block 349 through which communications between CPU 228 and CPU 200 occur. In another illustrative embodiment, the signal from reset button 348 may be given to the input port of CPU 228. CPU 228 couples the reset signal to SCPU 200 through reset register 344 when the reset button is pushed.

Figure 26:
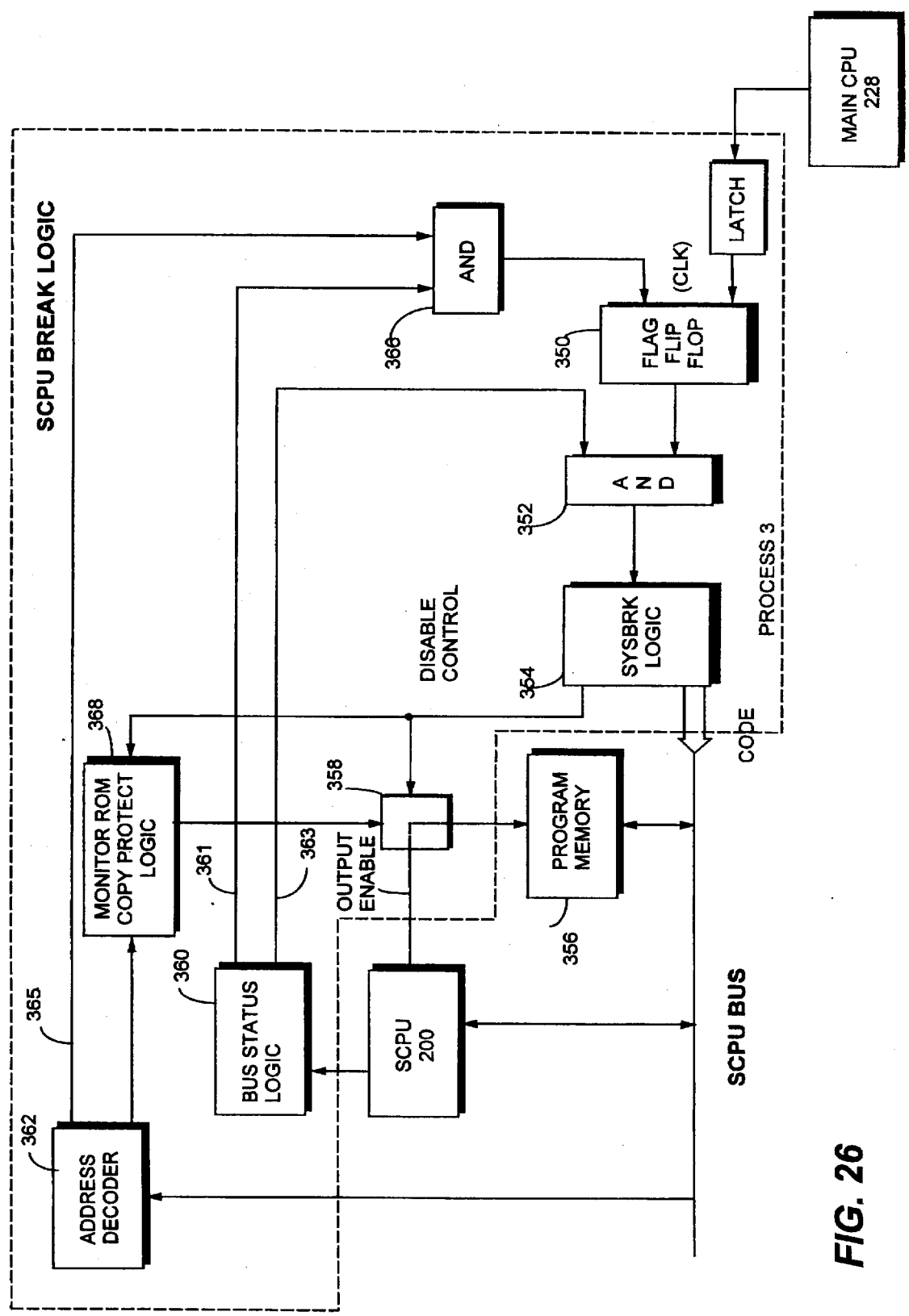
FIG. 26 is a block diagram of the system break hardware in accordance with an exemplary embodiment of the present invention.

FIG. 26 is a block diagram of logic circuitry associated with initiating a system break to permit a user to modify the foreground or background of model game software. When a system break is to be generated, main CPU 228 generates a system break flag signal which is stored in flag flip-flop 350 through the latch. Bus status logic 360, which includes conventional comparator circuitry and status indicating registers for identifying bus status, checks the game CPU 200 bus status to confirm that the CPU 200 is able to read out program commands. When bus status logic 360 determines that the CPU 200 is in a read/write cycle, the bus status logic 360 generates a signal on output 361. When the CPU 200 is in an instruction read cycle, bus status logic 360 generates a signal on output 363 to indicate that it is ready to receive a command.

As shown in FIG. 26, an address decoder 362 is coupled to game CPU 200 system bus. Address decoder 362 detects the time when game CPU 200 accesses a predetermined program address area identifying a specific portion of the RAM cassette data (for example, the end of NMI routine). At such time, address decoder 362 generates a signal on output 365 which is coupled to an AND gate 366. AND gate 366 additionally receives an input signal from bus status logic output 361. When both inputs of AND gate 366 are at a high level, the system break flag signal is set to flip-flop 350. Output 361 is not high when game CPU 200 is reading instructions from the RAM cassette 4 but rather is active when data is being read or written to RAM cassette 4.

When the system break flag flip-flop 350 is set and when bus status logic output 363 is at a high level, indicating that the CPU status is "instruction-read-cycle", an enabling signal is coupled to system break logic 354. A system break is thereby initiated at a point in time when game CPU 200 is about to read an instruction. At this point in time, CPU 200 is attempting to enable program memory 356 through generating an output enable signal via gating circuitry 358. System break logic 354 disables the coupling of output enable signal to program memory 356 to interrupt the instruction read cycle and prevent the program memory output from being coupled to the CPU bus.

The system break logic also outputs an instruction code referred to as a "COP" instruction. Then the COP command replaces an instruction to be read by CPU 200 from program memory 356. The Monitor ROM copy protect logic 368 outputs the enable signal to the gate 358 after the COP command in reply to the signal from system break logic 354. Thus, the monitor ROM program in the program memory 356 can be accessed by CPU 200 after the COP command is executed. When the COP command is received by CPU 200, the CPU executes its program instructions out of monitor ROM 204. Thus, the CPU 200 ceases executing the game program and begins execution of instructions out of monitor ROM 204 in response to the COP command to thereby initiate control being switched to main CPU 228 for performance of game editing and fabrication functions.

Monitor ROM copy protect logic 368 additionally prevents unwanted read out of monitor ROM programs stored in program memory 356 when a game program is running. Therefore, the accessing from a user's program purposefully made to copy the monitor ROM program is disabled. The circuit shown in FIG. 26 through the use of the monitor ROM copy protect logic is useful as a monitor ROM program copy protect mechanism.

DETAILED DESCRIPTION OF SYSTEM SOFTWARE

Turning next to a more detailed description of system software, such software includes a game program editing tool referred to in the illustrative embodiment as "Mario Factory". Mario Factory is designed primarily for assisting unsophisticated users to easily create video games using model software.

Figure 27:
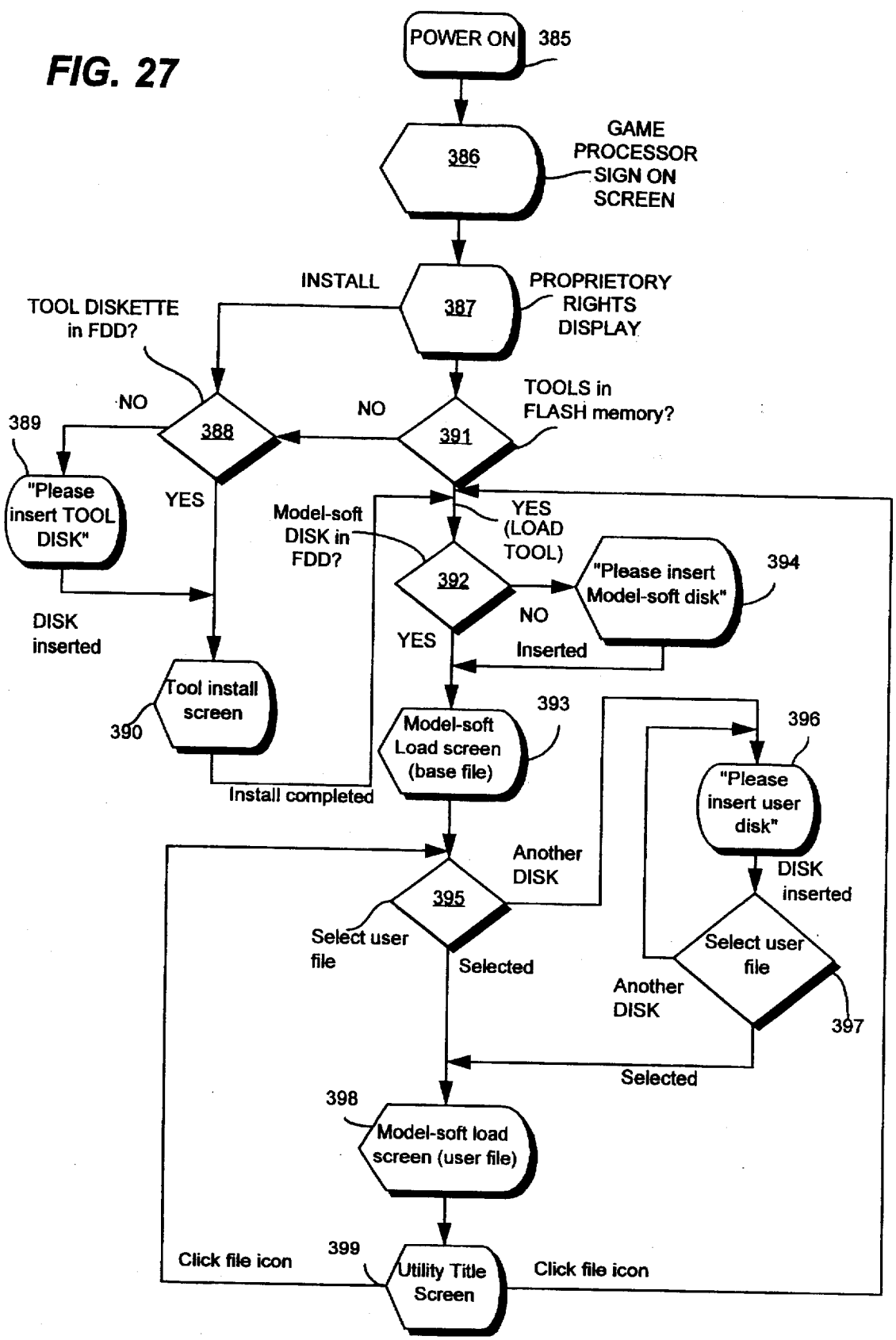
FIG. 27 is a flowchart which shows the sequence of operations in accordance with an exemplary embodiment of the present invention from power on through the appearance of the "Mario Factory" utility title screen.

FIG. 27 is a flowchart which shows the sequence of operations in accordance with an exemplary embodiment of the present invention from power on through the appearance of the "Mario Factory" utility title screen. After the power is turned on (385), an initial sign-on screen is displayed (386). Thereafter a copyright information display is generated (387). A check is then made to determine whether the game editing tools associated with the illustrative embodiment are already stored in flash memory 236 shown in FIG. 2B (391). If the check at block 391 indicates that the tools are in flash memory 236, then the tools are transferred to DRAM 230 associated with CPU 228 and the Mario Factory execution may begin. Thus, if the editing tools are already in the flash memory, Mario Factory is automatically loaded. If the check at block 391 indicates that the editing tools are not in flash memory 236, then a check is made at 388 to determine if the tool diskette is in the floppy disk drive. If the floppy disk diskette is not in floppy disk drive 199, then a message is displayed to the user indicating "please insert the tool disk" (389). Upon detection of the tool disk being inserted, a tool installation screen is generated (390) and the Mario Factory loading is completed.

In accordance with one exemplary embodiment of the present invention, the model software is loaded such that two distinct files are stored: a base file containing non-modifiable aspects of the game and a user file containing those elements of the game that a user may modify. Alternatively, only the base file need be initially loaded to provide the user with the fundamental aspects of game play from which to build upon and create new games within the genre of games associated with the base file.

The check at block 392 determines whether the model software is in the floppy disk drive. If the model software is not in the floppy disk drive 199, the user will be prompted to install the model software disk (394) and a model software load screen is generated (393). Thereafter a check is made if a user file has been selected by the user (395). The user file may be loaded on a different disk than the base file (which is why the selection of the user file in block 395 may require the insertion of another disk). The user file contains the changes made to the model software video game to date. Initially the user file is in a default stage where the model software defines the initial game play. As the user changes the game, the default information is changed to reflect the users editorial modifications. Both the game cartridge and the floppy disk include a base file and user file, however, the floppy disk will store the original default version of the game whereas the game cassette will not. The RAM cassette data is modified in real time such that default data is not resident on the cassette 4. Once the user file has been selected, a user file load screen is displayed (398). If a user file is not selected, the user will be prompted to insert a user disk (396) and the user will have an another opportunity to select a user file (397). Thereafter a utility title screen (399) is displayed such as shown in FIG. 5.

In block 392 the model software may be changed as desired by the user by inserting another disk. Once the utility title screen is displayed, a user may click a particular file icon which leads to branching back to block 395 in which the user can select another user file. Alternatively, the routine may branch back to block 392 in which the entire genre of games may changed by changing the model software. The Mario Factory program includes a large variety of editing tools such as "dot" for drawing particular characters "animation data" for controlling animation, etc.

The game processor system, in accordance with the exemplary embodiment described herein, includes software under the control of CPU 200 and software under the control of main CPU 228. The software operated by the CPU 200 includes the model game software described above and user fabricated game programs. The main CPU 228 executes various utility programs, operating system, peripheral driver programs, and BIOS and IPL software. The utility software operated by the main CPU 228 includes game editing tools, network software, word processing software, disk management software, etc. The operating system and peripheral driver software includes subroutines for supporting peripheral devices not fully supported by the BIOS software described below.

The BIOS software includes low level routines for direct interaction with the above described system hardware. More specifically, the exchange of information between the main CPU 228 portion of the system and the game CPU 200 subsystem is controlled from a software perspective by way of two BIOS operating system routines, one of which is resident in BIOS ROM 234 and the other which is resident in monitor ROM 204. The operations performed during such information transfer by these operating system routines are described below. The BIOS routines control the various I/O devices shown in FIG. 2A and 2B such as mouse 16, keyboard 18, controllers 12 and 14, display 15, modem 22, and control processor intercommunication, memory maintenance functions and PPU control functions. PPU 212 functions controlled by the CPU 200 BIOS software includes, for example, setting of the PPU's color generating RAM to define predetermined desired color maps, transferring data to the VRAM 214, setting superposition priorities, etc. Screen display related functions that are controlled include setting the cursor position. Keyboard functions that are controlled include keyboard initialization, obtaining keyboard buffer data and obtaining keyboard status information. Similarly, for the mouse, a variety of functions controlled by BIOS software including mouse initialization, obtaining the cursor position of the mouse, etc. BIOS software associated with controlling operations of the game CPU 200 include initialization of the game CPU, transferring data to the sound processor 208, working RAM 210, and functions associated with the exchange of data with the main CPU 228. The BIOS software associated with the main CPU 228 includes controls functions such as setting the real time clock, checking the time-out counter in gate array 226, and performing operating system housekeeping functions such as those which are typically performed in conventional operating systems such as MS DOS. The operating system software is capable of receiving some commands from other computers so that game programs received via the SCSI board 24 in FIG. 2B from an IBM compatible PC may be executed and edited.

The IPL software is responsible for initial program loading such that when the system is booted up it checks the game processor system status and boots up the BIOS in the operating system routines. The initial program loading (IPL)

routine is executed upon system start-up and initially results in the display of the start-up message, including a copyright notice as referenced above in conjunction with FIG. 27. Thereafter, the IPL performs an ID code check in which a cyclic redundancy code (CRC) in the membership ID card is checked. If a determination is made that the ID card is authorized, the system is booted up. If the ID check reveals that the ID is unauthorized, a display is generated indicating a lack of authorization. If the ID code check passes to permit the system to be booted up, a hardware status check is made. The hardware status check determines the size of the RAM of the current system configuration and checks to make sure the connected RAM is readable and writable. Thereafter, checks are made to confirm that the floppy disk driver, modem, printer, hard disk and other devices within the control unit and expansion unit are appropriately connected. If all hardware status checks do not confirm proper connection, an appropriate display is generated to indicate a system fault.

If all hardware status checks indicate proper connection, then a check is made of the operating system ID code. In this check an ID code within the operating system is checked and boot up proceeds if the check passes. If check fails, then a display indicating a system fault is generated. If the ID code check confirms the proper ID code then the operating system is booted up.

The security checks are designed such that at multiple levels throughout the system, there are security systems implemented. As noted above, in the initial program loader (IPL), an ID code check is made to detect an unauthorized ID card. An ID code check is also made to indicate the use of an unauthorized OS/BIOS. Additionally, as described above, a security chip is utilized in the RAM cassette 4 determines whether the system is connected to unauthorized hardware. Additionally, at the BIOS/OS level, an ID code check is made to determine whether there is inappropriate access to a base file. An ID code check also determines whether there is unauthorized network access as well as use of unauthorized utilities. If these ID code checks fail, the attempted file operation is disabled. The BIOS/OS also uses an associated, unique data formatting and/or file compression methodology that makes read-out by machine architectures, other than that described herein, difficult.

The operating system includes a kernel portion which interprets commands, manages memory, reads in transient operating system portions and starts up command routines. The kernel reads in a file called "configuration file" from the ID card, which records such things as the set up of peripheral drivers and unpacks the transient operating system, transient BIOS, peripheral drivers, etc. on to memory and manages them. A command routine portion of the operating system includes subroutines that perform actual operations based on instructions from the kernel and the peripheral driver section of the operating system includes subroutines that handle access to the various peripherals as described above.

Files are typically organized containing a 64-byte header file which includes such fields such as file name, date, file size, file attribute, code maker, ID code, password, etc. The file author is recorded only in the base file and the purchaser's ID code is recorded at the time of purchase. The file attribute field includes bits which enable a file only if an ID code matches an author code or, alternatively, enables a file only if there is a password match. Depending upon the state of the file attribute field or other bits, it is therefore possible to enable a file, disable a file or enable based on whether certain security checks are passed. The file attribute information may set various conditions for base file access such as if access is made by the purchaser, writing is disabled, if not made by the purchaser, reading and writing are disabled and the file name is not displayed. The operating system includes basic file access commands (such as load, save, verify, copy, etc.), file management commands, network commands, password commands and RAM cartridge commands. The system uses a password command which sets a password as a configuration variable. It is compared against the password in the header file. If the configuration variable has not been set, it is considered as having no password.

As set forth above, model game software is software which assists in game fabricating and which is executed by the game CPU 200. It is designed so that original games can be created through simple game authoring tool operations. In a preferred embodiment of the present invention, model software will be distributed according to various game genres such as "shoot-em-games", role playing games, etc. The description herein sets forth the details of an exemplary game authoring tool referred to herein as "Mario Factory" which is designed primarily for game fabrication by those uninitiated with video game program design and authoring. The present invention, however, contemplates the use of game authoring tools for intermediate and more advanced users which will be permit even more sophisticated creations than those described herein. However, the presently preferred embodiment is described in the Mario Factory. The model software includes a base file and a user file. The base file is a file which a user cannot change and includes a portion of the model software and its associated original game which is not changeable by the user. The user file is a file which may be changed by the user. The user file includes default programs and default data which a user may modify to create user original programs and user original data. The base file is copy protected so that the only way to obtain a copy of the base file is to purchase the model software. The user file is not copy protected and can be obtained freely by uploading it on a network, for example. Original games created by a user may be transmitted to other users by a transmission of the user file.

Figure 28:
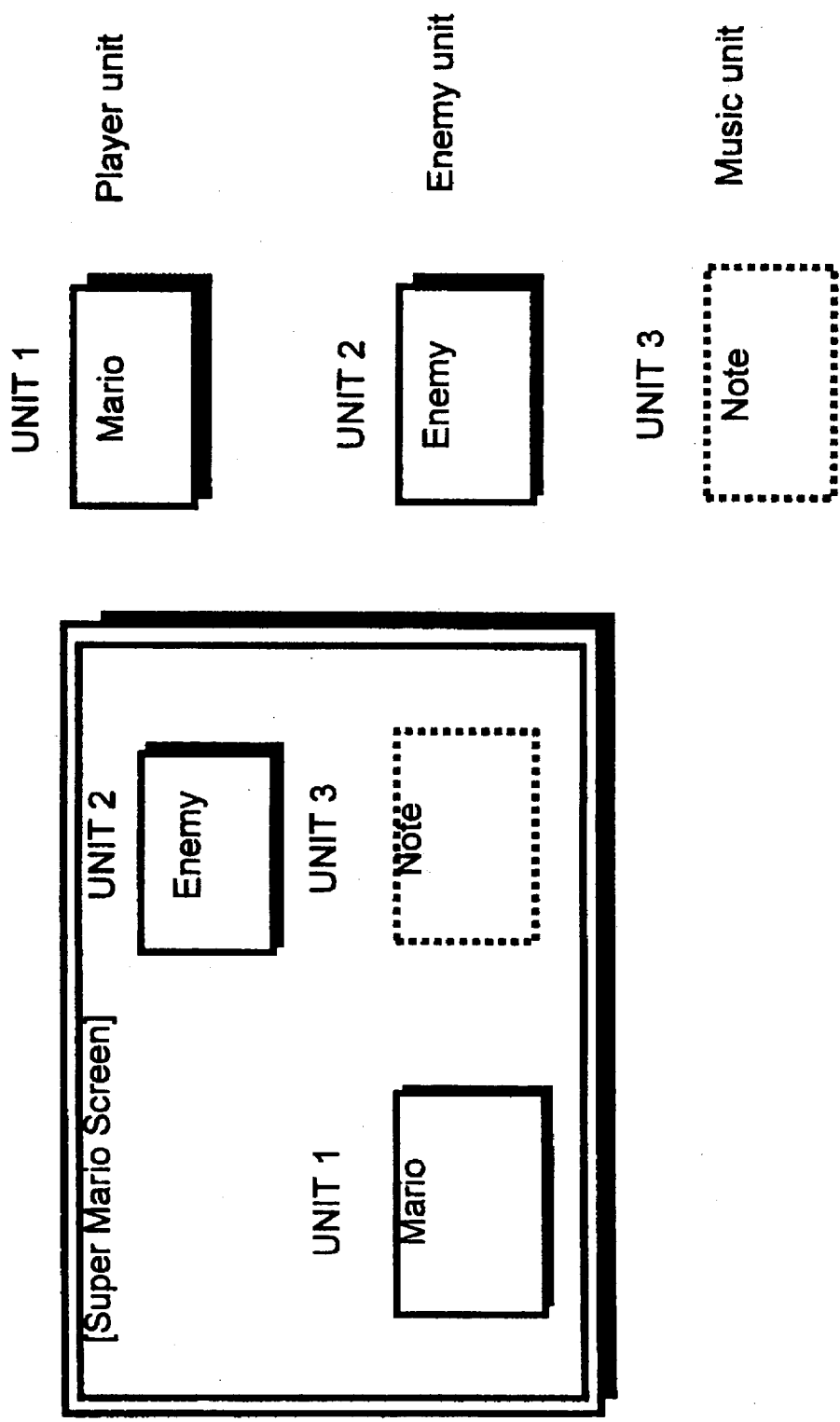
FIG. 28 is an exemplary unit work related display screen.

In Mario Factory, games are processed by processing many constituent "units". For example, in FIG. 28, a Super Mario screen is shown with a unit 1 being identified as Mario, which is a player controlled unit (e.g., controlled by a game controller 12, 14), a unit 2, which is labelled an "enemy" unit and a unit 3 which is a music unit. Significantly, all data and algorithms relating to a unit, such as graphic data, the appropriate responses to keys, and sound effects are stored for the unit, as is described below. This system also provides for music units which are not associated with graphic data. The game is edited by selecting a tool icon to make changes. For example, for FIG. 28, if the unit 1 is selected, a tool selection may be made in which the Mario graphics sound or programmed responses to conditions. From a programmer's point of view, a unit may be considered as a memory space for storing game play characteristics and a wide range of other data allocated on the game CPU 200 side.

As previously described, the preferred embodiment of the present invention includes a wide variety of editing tools for changing pictures, sounds and programs. Editors that are specialized for certain games may be included in the model software as expansion software. For example, for a shooting game specialized map editors or enemy path editors may be utilized. Similarly, for a role playing game, specialized map editors, dialogue editors and event editors may be included and in a puzzle game, a rule editor may be included as expansion software.

Each of these various types of tools are displayed for selection by the user. Icons are organized in layers and only the icon that is needed at a particular moment is displayed to the user. Unnecessary icons are not displayed, rather, they are recorded in the status file included in the model software.

Game editing revolves around the editing units and associated data structures. In an embodiment of the present invention, different editing functions are controlled based upon icon clicking at system break or from the tool box screen. In another illustrative embodiment, they are controlled based upon whether the left or right mouse button is depressed. After game play has begun, a system break is initiated and a mouse cursor appears on the screen. If it is desired to edit a particular unit displayed on the screen, for example, the left mouse button is clicked over one of the units shown, for example, in FIG. 28 and all the tools for editing the selected unit are displayed including graphics editing, program editing and sound editing features. If the right mouse button is clicked, various options are displayed such as "undo", "game", "file", "tool list", "unit" and "end". If the tool list option is selected, tools may, for example, be shown as a tree chart and the units that can be edited with the selected tools may be controlled to blink.

During this process, the edit screen is superimposed upon the game screen. After the desired edits have been made, game play may be resumed. In left mouse button edit operations, after a game screen is displayed and a system break is initiated, the mouse cursor appears on the screen and the user clicks on a character to be edited. The character to be edited appears in a box with the unit identified. Thereafter, modification of the unit takes place via the various editing tools. After editing, game play may be resumed.

With respect to right mouse button edit operations, on a combined screen a tool list is generated. The user then selects a tool and each of the editable units will be displayed for that tool. Thereafter, via the mouse, another tool may be selected and different editable "units" will be displayed. If a character is clicked on, the character appears in a box and a menu appears and editing continues in an identical manner as with left mouse button editing. In right mouse button editing, during Mario Factory operation, the status file is checked and the status is displayed. The unit header (which is a data area placed at the head of the unit storing information such as the tools with which the unit can be edited) is then checked and editable units are found.

In the present system, due to the model software selection screen, even without the model game software itself, the Mario Factory authoring tool can be started up and basic tools can be used. The Mario Factory program includes a status file, which is a text file which records the label names of tools to be placed in memory. By accessing the status file, the Mario Factory program can determine which tools need to be stored in DRAM 230. Some of the tools stored in DRAM 230 are displayed as icons. Such tools may include basic tools and expansion tools chosen from an object file written in main CPU 228 code.

Figure 29:
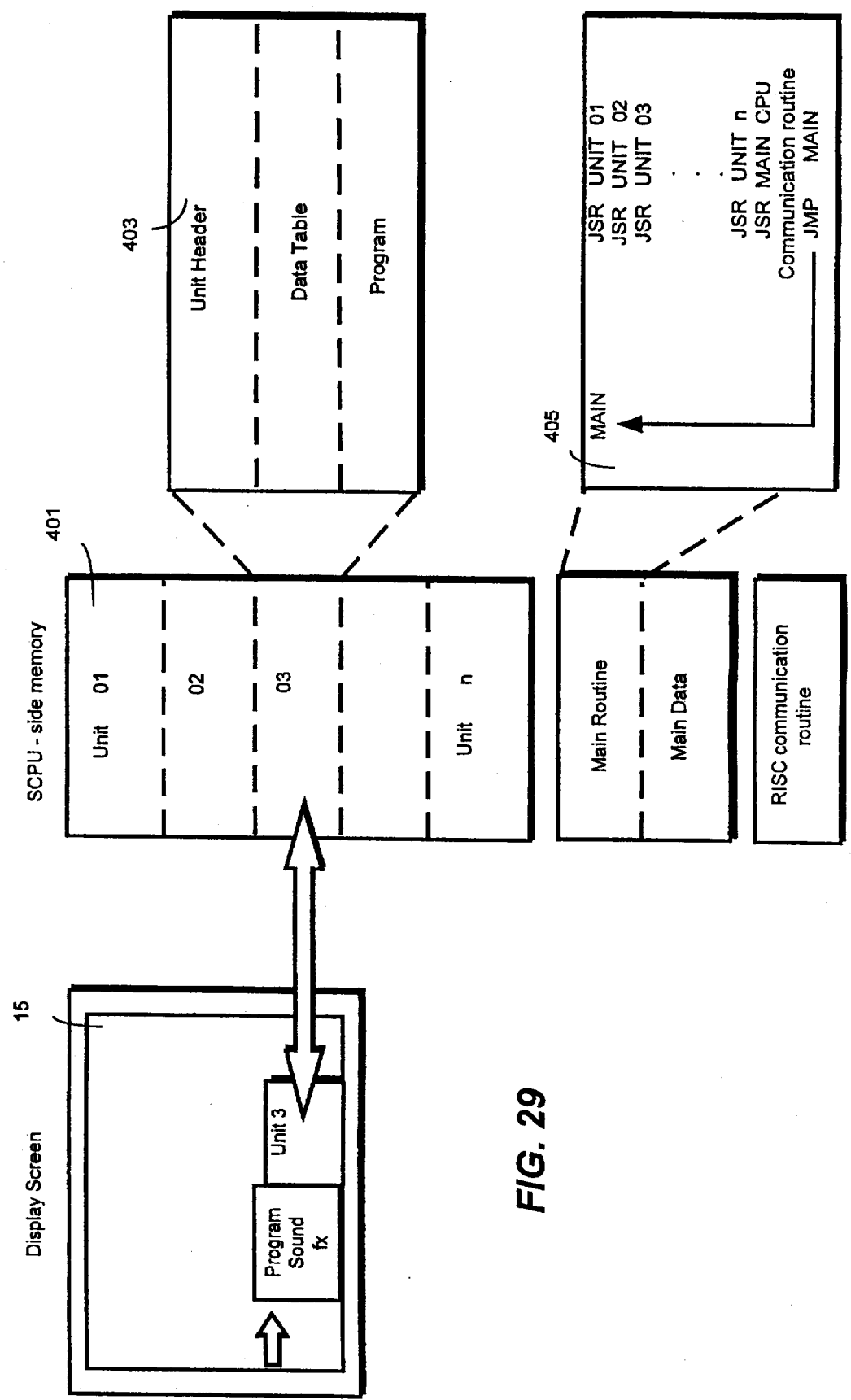
FIG. 29 is a block diagram which functionally demonstrates how programming is structured on a "unit" basis.

FIG. 29 is a block diagram which functionally demonstrates how programming is structured on a "unit" basis. Within the memory address space 401 of game CPU 200 is stored unit related data uniquely identifying each of the units which may be edited. There is a one-to-one correspondence between units which may be edited and unit related data structures stored in the game CPU memory address space.

As shown in FIG. 29, if a user selects unit 3 shown on display screen 15 during, for example, a system break operation, a corresponding portion of memory space 401 will include a unit data structure (or pointer) associated with unit 3 which will store (or point to) a unit header, a data table and a unit 3 related program. The unit header includes labels for tools that can be used to edit the particular unit and the storage address for edited data. The group of unit headers are also stored in the main CPU 228 address space. The data table includes data relating to a wide range of game play/ object characteristic information to be described below including not only graphics and sound but also information indicative of the path movement for each character. In essence, the graphics, sound and program associated with each unit may be viewed as being carried with or pasted on each unit.

The main game processing routine includes a sequence of instructions for processing each of the units 1 to N. The main routine (405) includes a sequence of jump to subroutine (JSR) for accessing the respective unit programs. Each unit program includes instructions designed with the assumption that it may be called up from the main routine during any given frame. The main routine 405 also includes a jump to the main CPU communication routine. This communication routine handles such operations as signal transmission of a mouse click point to the main CPU, and reception of signals relating to editing data associated with the editing tools and checking for a main CPU system break signal.

Figure 30A:
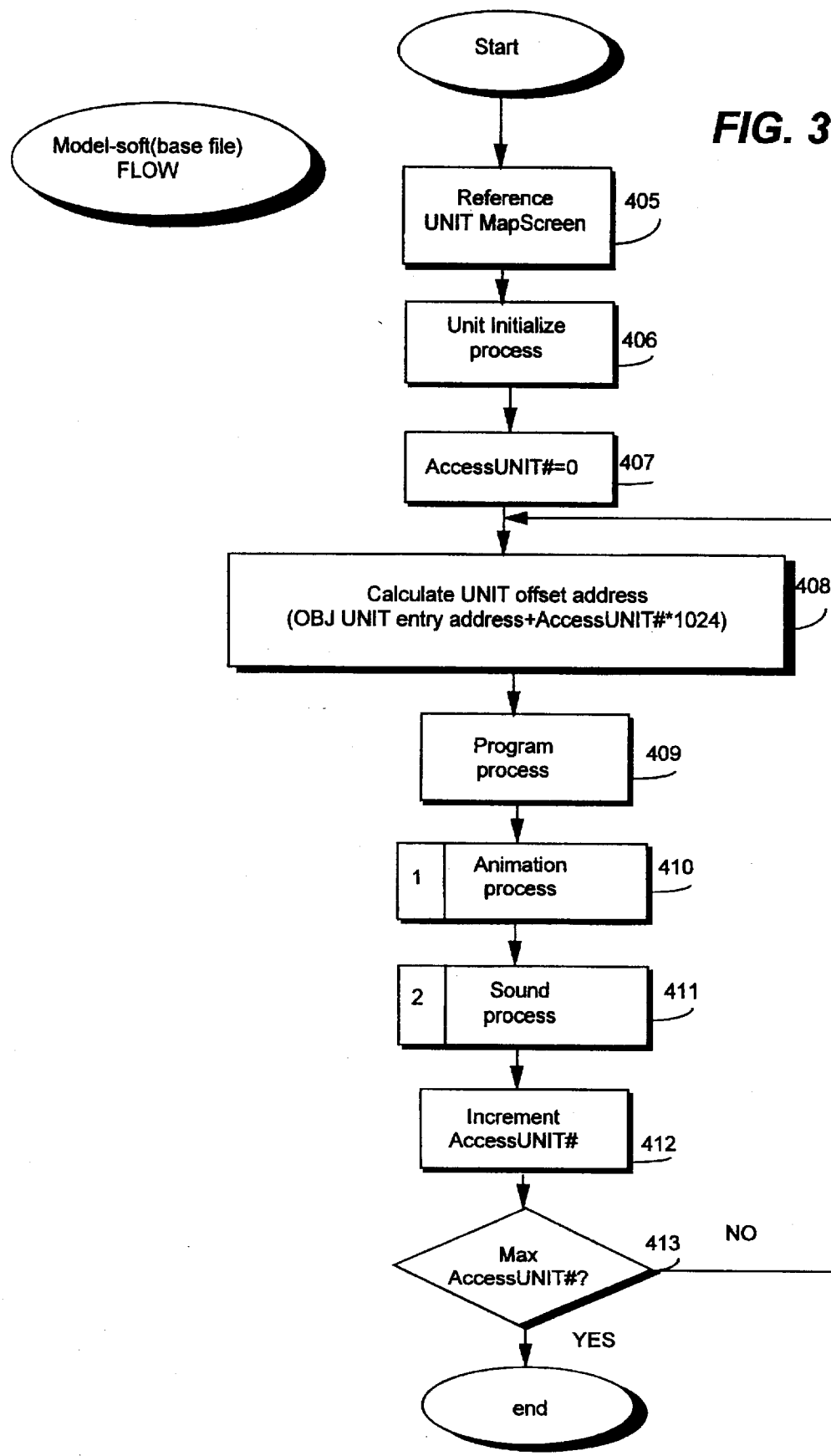

FIGS. 30A through 30C are a flowchart delineating the sequence of operations involved in processing unit data and outputting picture and sound signals to a user's display screen. As indicated in FIG. 30A, unit processing begins with the system referencing a unit map screen, which indicates the disposition of units by the unit screen editor. For example, if the background screen is scrolled by key control, a new portion on the unit screen map is referenced to judge whether new units appear (405). After a unit initialization process (406) in which the new unit is found on the unit map screen, an entry is made in the active unit list, the unit access counter is set to unit 0 (407) and the routine enters a unit processing loop in which the unit offset address is calculated (408). As indicated in block 409, the unit program associated with the unit is executed, and when applicable, animation processing (410) and sound processing (411) are performed. The counter is then incremented which keeps track of the unit to be accessed (412) and a check is made to determine whether the last unit number has been accessed (413). If the check at block 413 reveals that the last unit number has not been accessed, then the routine branches back to block 408 in which the next unit number to be processed is located in memory via the offset address calculation.

FIGS. 30B and 30C show the animation processing of block 410 in further detail. As shown in FIG. 30B, animation processing begins by identifying a pose number to be displayed for the unit being processed (414). Thereafter, the character address is calculated (424) and the character data stored at the calculated address is transferred to a memory buffer area for processing (425). A check is then made at block 426 to determine whether a user data override flag has been set. If the user override flag has been set, then the user selected data is overridden (427). If not, then the character data stored in the buffer area identified at block 425 is transferred to the object attribute memory area (428).

FIG. 30C shows the processing steps involved in deciding the display pose number for processing in FIG. 30B's block 414. Initially, a check is made at block 415 comparing the display ANIME number with predetermined backup data stored with the "unit" as shown in FIG. 33. If there is a match, then the routine branches to block 417. If there is not a match, then the ANIME data is transferred to the object unit RAM shown in detail in FIG. 33. Thereafter, "tempo" data is subtracted from the contents of the frame counter (417). A check is then made to determine whether the frame counter is less than zero (418). If the frame counter is less than zero, then the pose number is incremented (419). A check is made to determine whether the pose number is over the maximum allowable pose number (420). If the pose number is over the maximum, then the pose number (421), which determines unit pose in the animation sequence, is set equal to POSE MAX after # defined using the animation tools such as in FIG. 10. Thereafter, the pose data is transferred to the buffer area identified with respect to FIG. 30B, block 425, and the pose point location data (x,y) is transferred to the buffer (423). If the frame counter is not less than zero, then the routine branches directly to block 423.

Figure 30D:
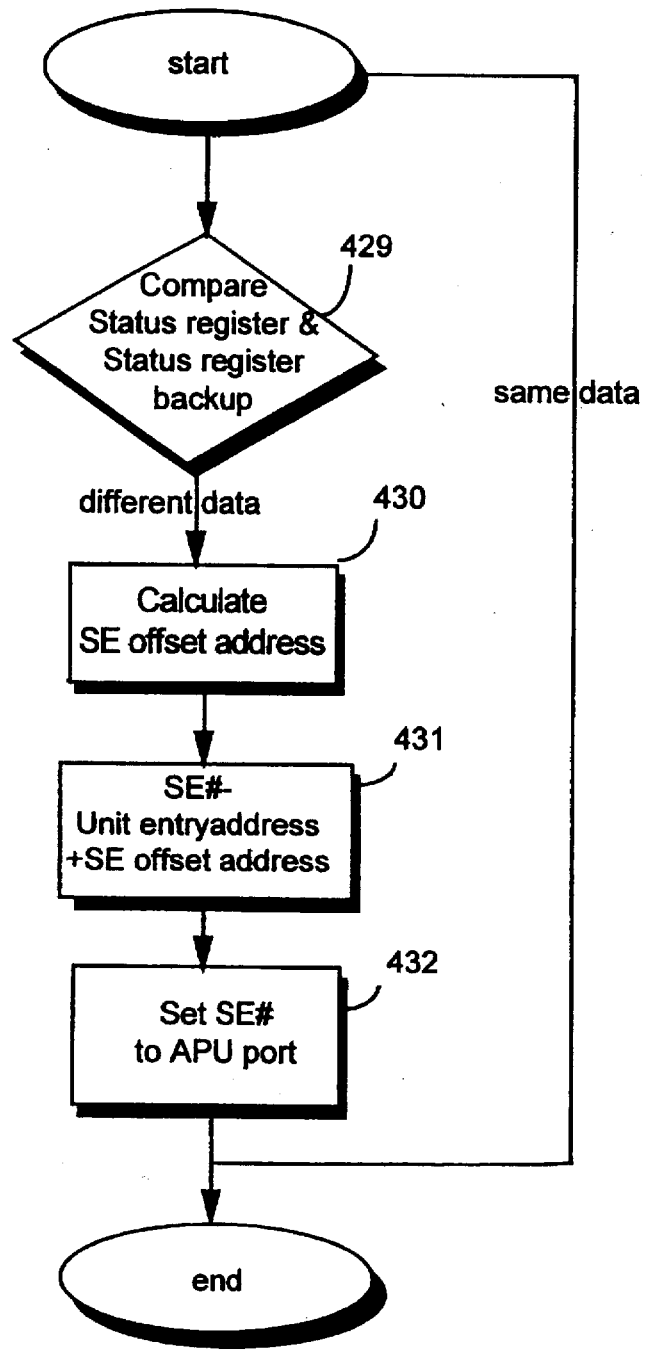

FIG. 30D is a flowchart of the sound processing associated with the unit being processed. Initially, a check is made at block 429 to compare the status register and the status register backup as stored in the object unit RAM shown in FIG. 33. If the check at 429 reveals that there is not a match, then a calculation is made to determine the sound effect data offset address 430. The sound effect number is calculated based upon the unit entry address added to the calculated sound effect offset address (431). The sound effect number is thereafter sent to the sound processor 208 port (432). Real sound effect data is stored in WRAM 210 with every sound effect number. The sound processor makes sound with the sound effect number and real sound effect data. If the check at block 429 indicates that the status register contents equal the status register backup contents, then the sound processing subroutine is exited and the routine continues processing at FIG. 30A block 412.

Figure 32:
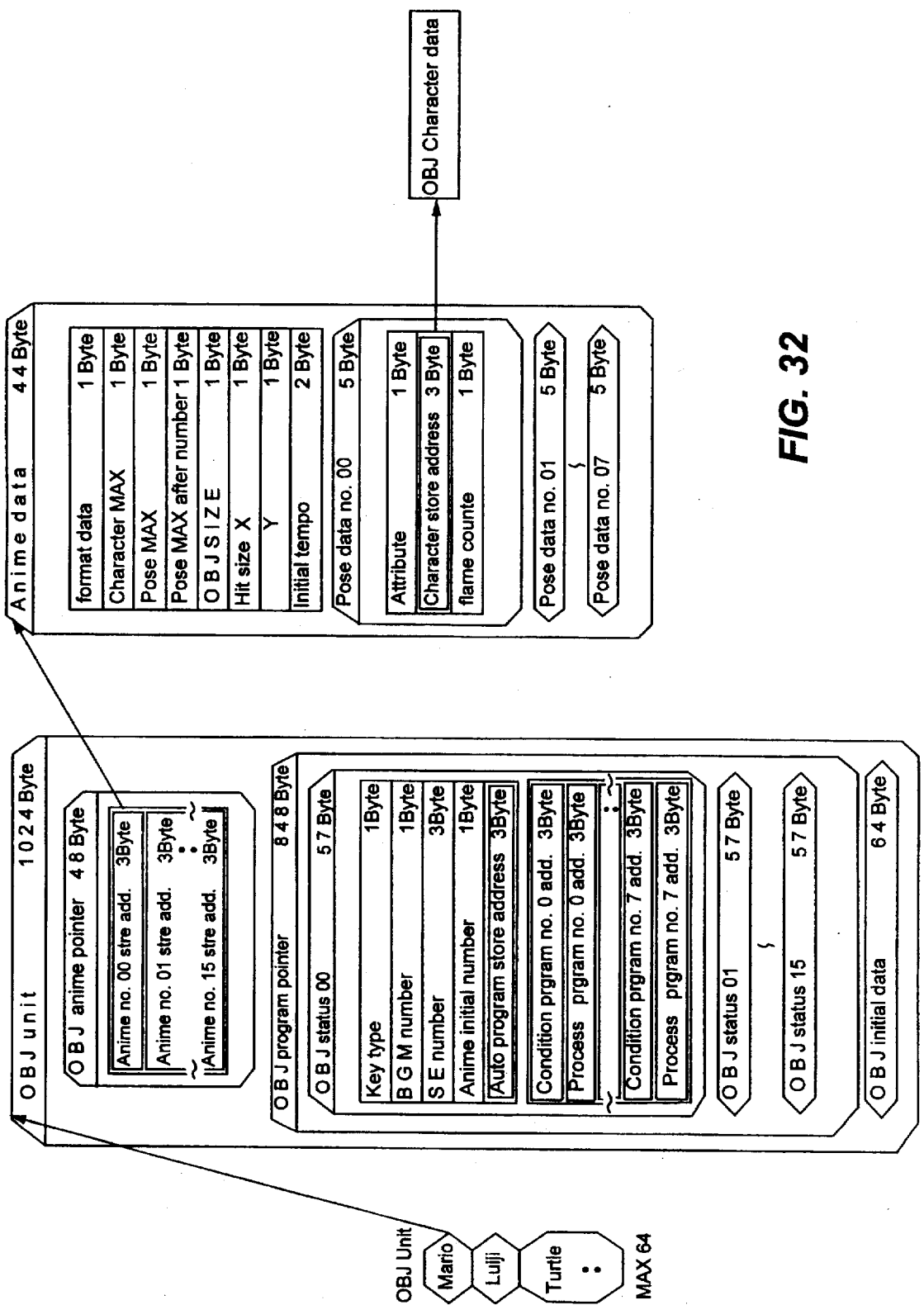

FIGS. 31 and 32 depict illustrative first and second model software formats structured such that main CPU 228 is able to efficiently process the information to permit ease of editing. Much of the information in FIGS. 31 and 32 will not be described here but will be understood by those skilled in the art in light of the description herein. As shown in FIG. 31, the first model software format is background related and contains a "stage" pointer section which points to stage (background) data stored at an identified set of locations in memory. The stage data in turn points to a wide variety of additional information such as font data, color palette data and other background related data such as the MAP DATA, UNIT MAP DATA, PANEL MAP DATA, PANEL UNIT MAP DATA and PANEL DATA.

FIG. 32 illustrates a second moving object related model software format in which identified "object units" such as Mario are assigned an associated object unit memory partition. Associated with each identified object unit is an object animate (ANIME) pointer which points to the block of animation data as shown at FIG. 32. Additionally, each object related unit includes object program pointer information identifying the various programs associated with each object unit.

FIG. 33 depicts an illustrative memory map of RAM information contents including an object unit RAM information area and a game background related RAM area. As shown in FIG. 33, the object unit information includes the object unit ID, status register and coordinate location and a wide range of other object information such as character size, pose information, etc. This information is stored in the buffer area of main CPU 228 and DRAM 230, which is shown in FIG. 2A and is used to edit with the control file. The control file has some cross reference data, label text and message text for assisting in editing. The data stored in the control file is not needed for game program execution but, is used to make editing easier. The background music data that is utilized during game play is transferred from main CPU 228 system portion back to game CPU 200 section.

Figure 34:
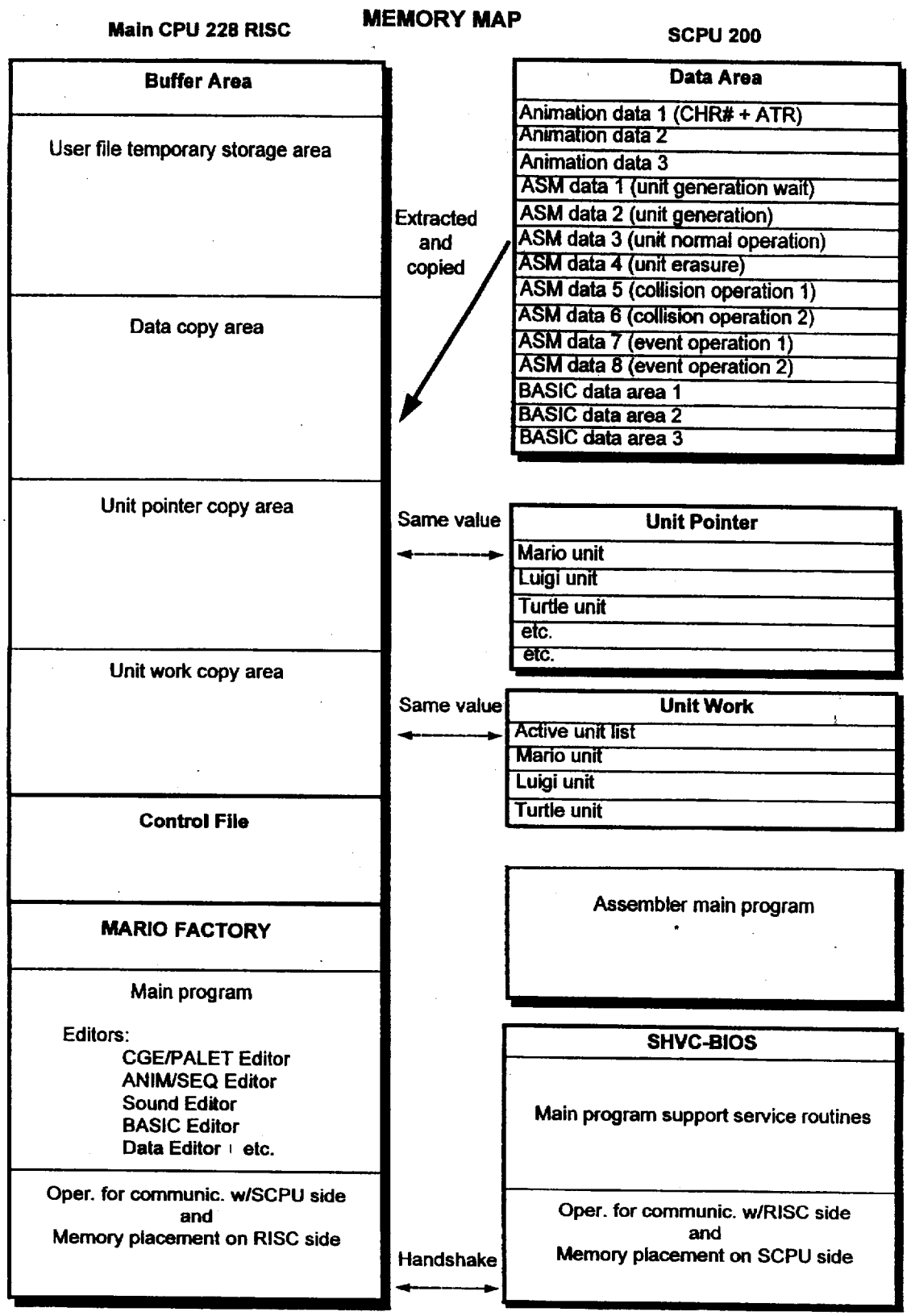
FIG. 34 depicts exemplary main CPU 228 and the game CPU 200 memory maps.

FIG. 34 depicts main CPU 228 and game CPU 200 memory maps and identifies the manner in which data is extracted and copied from game CPU 200 to main CPU 228 during a system break. It also depicts how certain common values are maintained in each memory area during editing so that main CPU 228 and game CPU 200 can efficiently coact.

In the data area in the CPU 200 portion of FIG. 34, graphic data, sound data and status (process program) are stored as animation data, ASM data and BASIC data. The memory area of game CPU 200 also includes the main program described in conjunction with FIG. 29 and the associated the main processor communication routine in SHVC-BIOS. The uneditable base file that is provided with copy protect mechanisms is stored as a portion of the data area, unit pointer and the assembler main program. In the main CPU 228 memory system, in addition to the basic editing tools of the Mario Factory, the CPU code is stored. The memory area of CPU 228 also includes the main program area to store the operating system program and main CPU communication routine. Additionally, the base file is stored as the control file and some portions in buffer areas including unit data, unit pointer and certain minor data for editing. These elements are loaded via the load program controlled by the user's model software selection in the Mario Factory program.

When the Mario Factory is executed, the execution results in the allocation in the main CPU 228 memory as shown in FIG. 34 and the display of the title screen. Then, if the load icon is clicked, certain files of the model software are loaded in CPU 228 memory and certain files are loaded to the game CPU memory via the communication routines in each memory. The model software includes some unit information written to the data area and unit pointer in SCPU 200 memory. The model software also includes the control file data that is the minor data for editing as cross reference data, label text or message text which is stored in the control file area in CPU 228. The control file data includes the attribute data to indicate whether the edited data is base file data (disable the edit) or user file data (enable the edit). In addition, the control file data includes the limit data to indicate the limit of editing. For example, a limit may be set specifying that Mario speed cannot be above one frame/8 dots. In accordance with an illustrative embodiment of the present invention, the user file includes the data area data and unit pointer data except for unit information of the base file. The user data also may include the differences between the default data and edited data.

Figure 35:
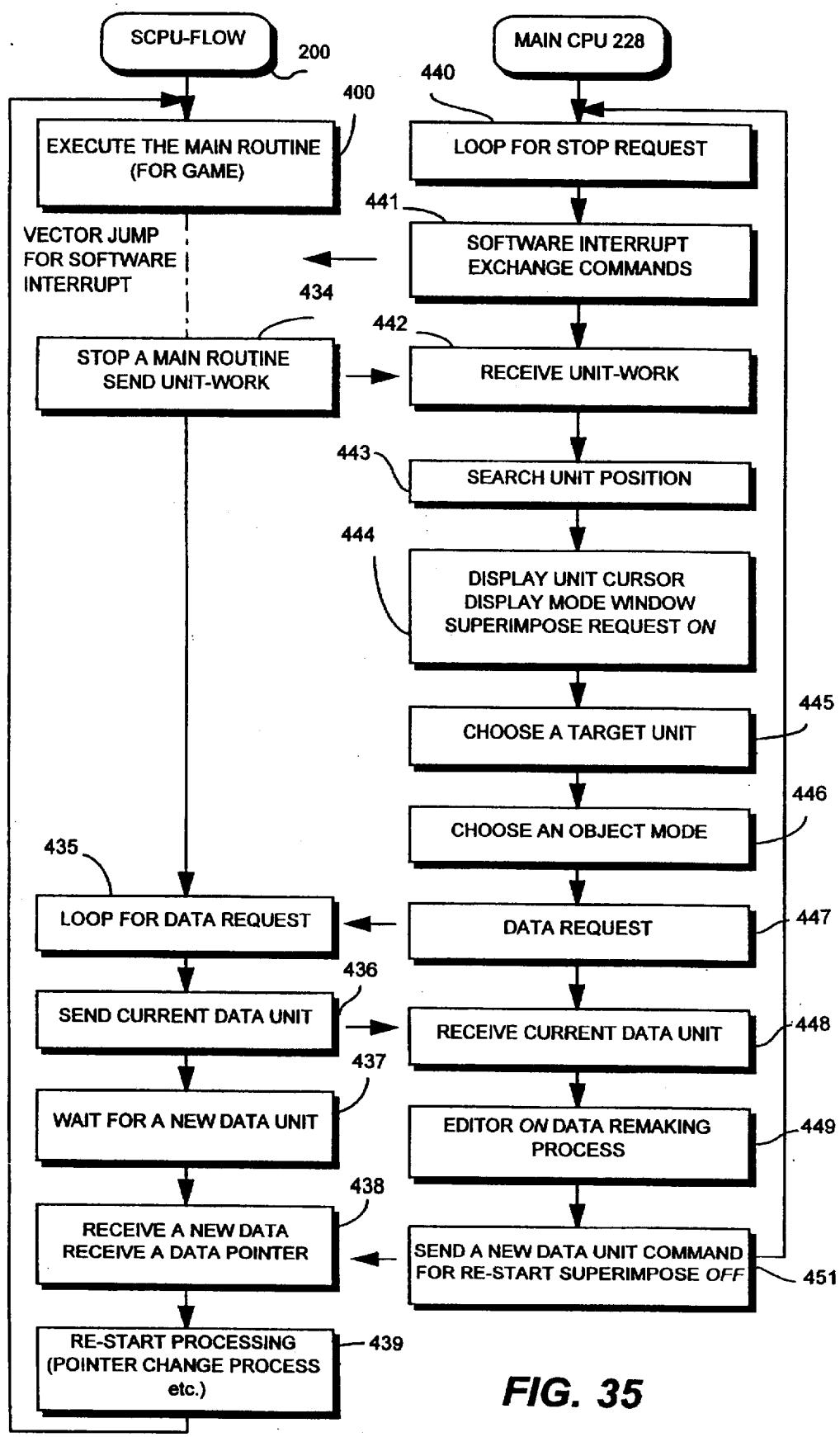
FIG. 35 is a flowchart delineating the sequence of operations performed by game CPU 200 and main CPU 228 during game fabrication processing.

The flowchart of FIG. 35 delineates the sequence of operations performed by the game CPU 200 and the main CPU 228 during game fabrication processing. It illustrates how a game program is executed, stopped for making game modifications and then resumed from the point at which editing occurred. The left portion of the flowchart depicts the flow for game CPU 200, whereas the right side of the flowchart indicates the flow for main CPU 228. The flow of main CPU 228 is shown in parallel with the game CPU flow to demonstrate the interaction and data exchange. Such interchange results from the stopping of a game screen and the selection of a particular unit for editing, e.g, Mario. The arrows between the columns indicate an exchange of data between the two processors.

Initially, once game play is to commence, the game CPU 200 is in control and begins executing the main routine for playing a game embodied in the model software as previously described (433). When a system break is initiated, a COP command is generated, as previously described, to cause a vector jump resulting in the software being executed out of the monitor ROM 204. When a system break is imposed and, for example, the character Mario is selected for modification, a unit identifier is generated. Information which is being changed during the system break is stored in the CPU work RAM 202. After the vector jump, game CPU executes out of the monitor ROM 204.

As shown in FIG. 35, the main CPU 228 executes a program loop to be described below, awaiting a stop request from the user for making a change in the model software game play. When the mouse button is depressed by the user, a stop request is detected (440) and a software interrupt occurs in which a COP command is coupled to the game CPU (441).

If the system break is imposed while the screen display is being created, the generated display will be compromised. The SCPU BREAK LOGIC shown in FIG. 26 delays the system break until no impact is possible on the generated displays such as at the end of a non-maskable interrupt (NMI) which occurs, for example, during the vertical blanking interval. When main CPU 228 provides a COP command to CPU 200 via the SCPU BREAK LOGIC at the end of the NMI interval, CPU 200 begins executing out of monitor ROM 204 to transfer data to be changed to main CPU 228 buffer area. The main CPU 228 is informed of the coordinate position of the character to be changed, the size of the object and the identifying unit number. The unit work RAM area of CPU 228 includes status information relating to the object. Thereafter, the game CPU responds by beginning to execute out of monitor ROM 204.

Figure 37:
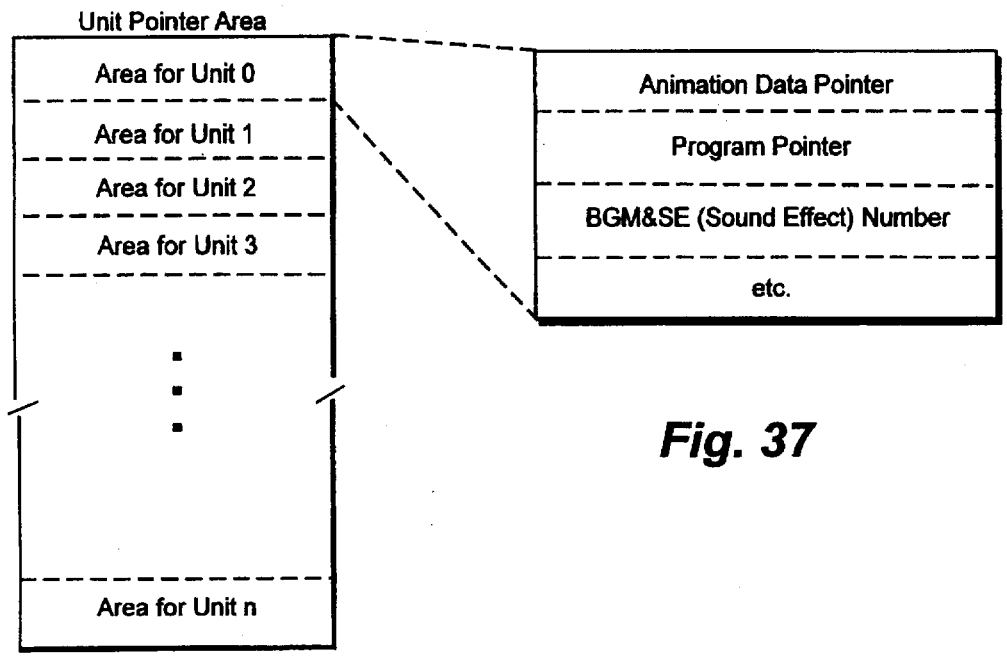
FIG. 37 shows a unit pointer area for all units which identifies exemplary unit data.
Figure 36:
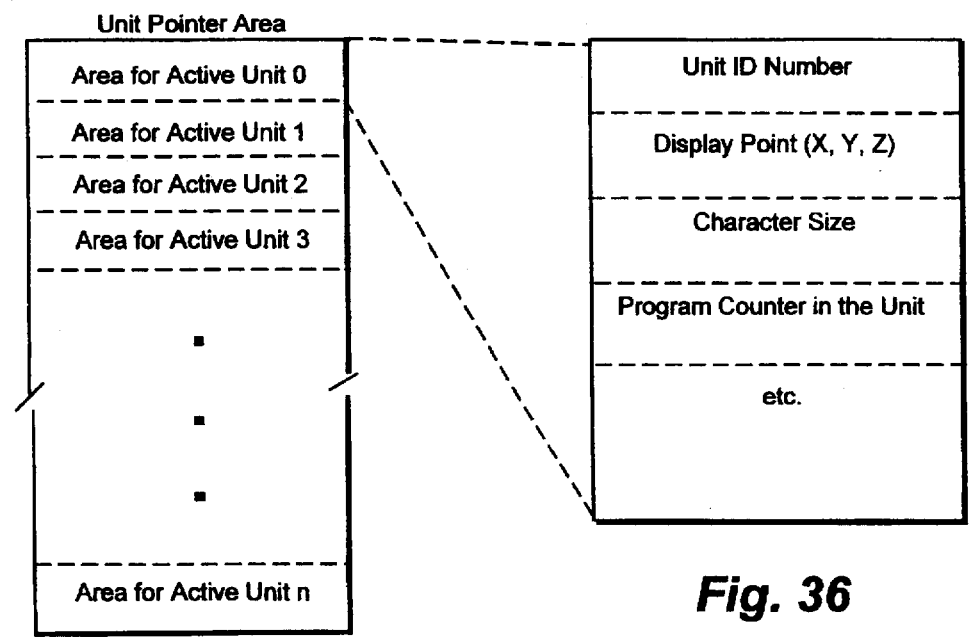
FIG. 36 shows a unit pointer area for active units and representative unit information for an identified active unit.

As indicated at block 434, game CPU 200 sends the unit work selected to main CPU 228 which receives the unit work (442). As can be seen in the memory map shown in FIG. 34 the unit work is contained in the CPU 200 memory space and a copy of the identified unit work is transferred to the main CPU 228 unit work copy area. FIG. 33 shows illustrative stored information relating to an object unit and FIG. 36 show a unit pointer area for active units and representative unit information for an identified active unit such as unit ID number, display points, character size, program counter in the unit, etc. FIG. 37 shows a unit pointer area for all units which identifies exemplary unit pointer data such as animation data pointer, program pointer, sound pointers, etc. In the preferred embodiment, all the unit information shown in the right hand column of FIG. 33 would be placed in a work copy area.

Turning back to FIG. 35, after CPU 200 sends out the unit work and after reception by main CPU 228, a search is made based on the cursor position to determine where the unit is located (443). The unit work relates to all the units displayed on a particular frame. Out of those active units, the user chooses a target unit to operate on. The object attribute information relating to the objects which may be processed are written into the object attribute memory associated with CPU 228 and the memory is monitored so that it can be determined where the modified units are to be displayed. Thereafter, a dialog box is displayed identifying a unit to be modified as has been previously described (444) and a superimpose request is turned on to thereby result in a display of both the game screen and a dialog box. The user may then choose a particular target unit to modify (445). After the user chooses a target unit, a further dialog box appears in which the user chooses an object mode (446). For example, the object mode to be selected may be the "dot icon" in which the user may change the character configuration on a dot by dot basis.

Game CPU 200 waits for the data request in a loop (435) and ultimately receives a request from main CPU 228 (447). Current user data is sent by CPU 200 as indicated in step 436 and main CPU 228 takes this data (448) and with one of the editors described herein, changes the data (449).

On the game CPU 200 side, the game CPU waits for a new data unit (437) which is being edited by main CPU 228 and receives the new data unit at block (438) which is sent to game CPU 200 via step (451) of main CPU 228 routine. The game CPU 200 also receives a data pointer at block 438 which is a two byte data block identifying the change made to the unit. After the information is received in block 438, game CPU 200 goes into a restarting process to resume execution of the game with pointers changed to identify the new unit information.

Through return from interrupt instructions, the game program continues at the same point in which the system break occurred. The return from interrupt is initiated after the COP instruction is no longer issued which occurs after the desired change has been made. The main CPU 228 branches back to block 440 where it stays in a loop awaiting another stop request.

Figure 38A:
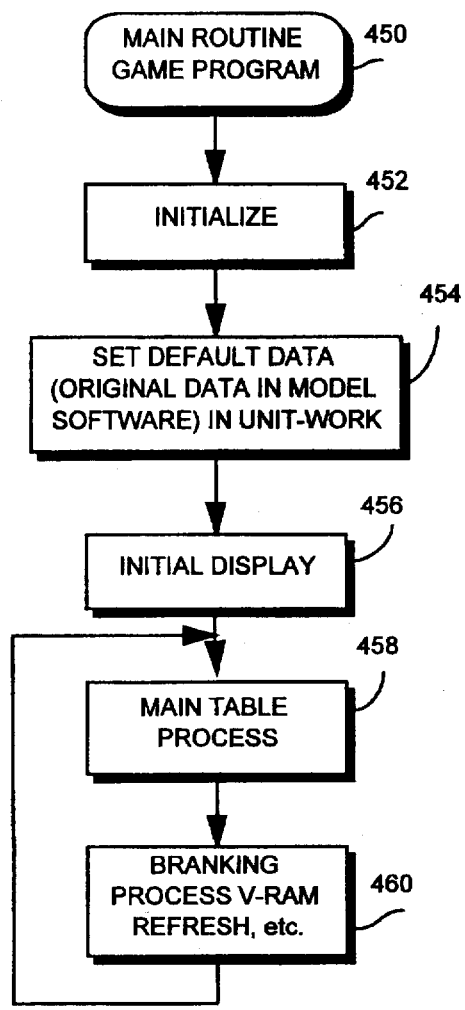
FIG. 38A and 38B is a flowchart showing how game program processing takes place using "unit work" table processing techniques.
Figure 38B:
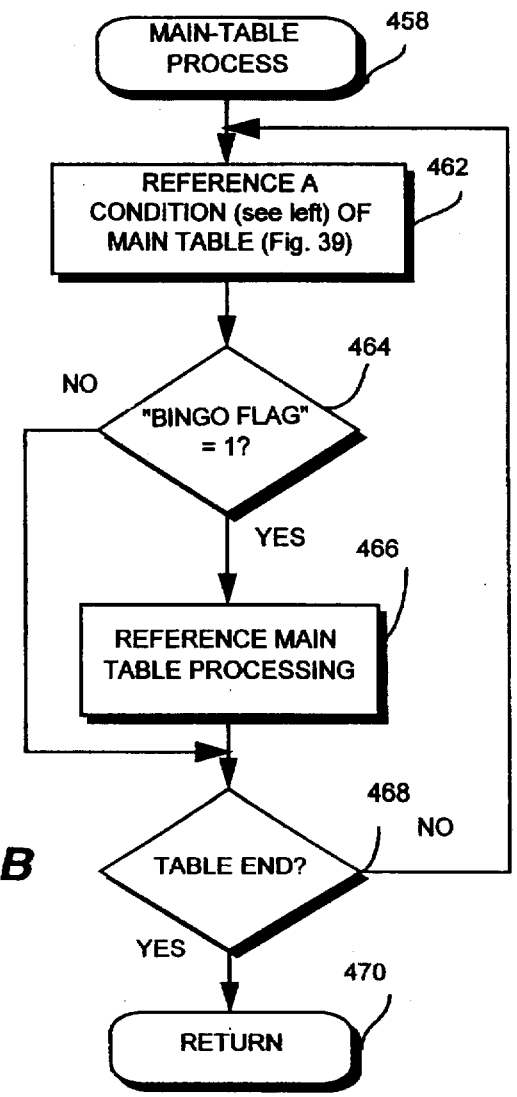

FIGS. 38A and 38B is a flowchart showing how game program processing takes place using "unit work" table processing techniques in accordance with the present exemplary embodiment. When the main routine game program (450) begins executing, the game CPU 200 is initialized (452) and initial values are loaded into the unit work area. Thereafter, default data is set in the unit work area in accordance with the original data in the model software (454). Based on such initial data, an initial display is generated (456). Thereafter, the entire main routine is processed during a main table processing subroutine 458 and blanking and VRAM refresh processing (460).

FIG. 38B is a flowchart showing the main table processing (458). The MAIN TABLE corresponding to the stage status in FIG. 31 indicates the game sequence. It is the upper most program routine of the program layers and the model software flow shown in FIG. 30A is executed by the MAIN TABLE. When the program process 409 in FIG. 30A is executed, the UNIT ACTION TABLEs corresponding to the OBJ status in FIG. 32 is referenced for each unit. In the main table processing subroutine 458, initially a reference is made to a condition identified in the main table such as the exemplary main table shown in FIG. 39 (462). As shown in FIG. 39, the main table includes a "condition" column and a "process" column. The condition column includes a number of routine addresses pointing to subroutines relating to identified conditions. Turning back to FIG. 38B, a check is made at block 464 to determine whether a predetermined condition identified in the condition column is met. The condition check is determined by the state of the "BINGO" Flag. If the predetermined condition is met, then the main table is referenced to identify the processing which takes place corresponding to the condition. The processing operation indicated in the processing column is performed by executing the process that is pointed to by the routine address pointer associated with the process identified in the process column. If the condition is not met as determined by the check at block 464, the main table processing routine branches to block 468, where a check is made to determine whether the main table has ended. If not, the routine branches to the next condition of the main table and continues such processing until all the entries in the main table have been processed whereupon a return to the main game program routine shown in FIG. 38A occurs (470).

Focusing back on the main table of FIG. 39, the entry relating to the "must" condition points to an address of a "must" routine which specifies a condition in which the unit must behave in a certain manner. In accordance with the must subroutine shown in FIG. 40 (475); a flag called "BINGO" is set to 1 (477) which means that the condition always will occur and the routine returns to the main table processing routine (479).

FIG. 41 shows the "Enemies Wipe-Out" condition subroutine (480) shown in the main table. This routine determines whether the enemies are eliminated and sets the "BINGO" flag. FIG. 41 also represents the "All Friends Wipe-Out" condition subroutine to determine whether all friends are destroyed (480). In accordance with the enemy (or friend) wipe-out routine, a check is initially made to determine whether the number of enemies (or friends) is equal to 0 (482). If the number of enemies (or friends) equals 0, then the BINGO flag is set to 1 (484) and the routine branches back to the main table processing subroutine. The Go Next Stage subroutine in FIG. 44 (or Go Ending subroutine in FIG. 45) is then executed in process 466 in FIG. 38B. If the number of enemies (or friends) are not equal to 0 then the BINGO flag is set to 0 (486). Thereafter, the routine returns to the main table processing routine. The corresponding process is not executed.

In accordance with the "unit action" subroutine process in the main table (500), a unit action table is processed such as the illustrative unit action table shown in FIG. 42 which, for example, describes actions relating to a "turtle" unit work. Focusing on the conditions specified in the unit action table, each of the conditions as well as the processes are identified by address pointers to a subroutine responsible for the condition and processing. The "must" condition routine has previously been explained in conjunction with FIG. 40. The condition following "must" relates to when the turtle is detected touching the right edge of the screen. The "BE-TREADED" condition refers to when the turtle is stepped on by another object. When the condition on the left side is met, the process indicated by the associated address pointer is executed. The processes associated with each of the conditions in the table shown in FIG. 42 are self-explanatory.

Figure 43:
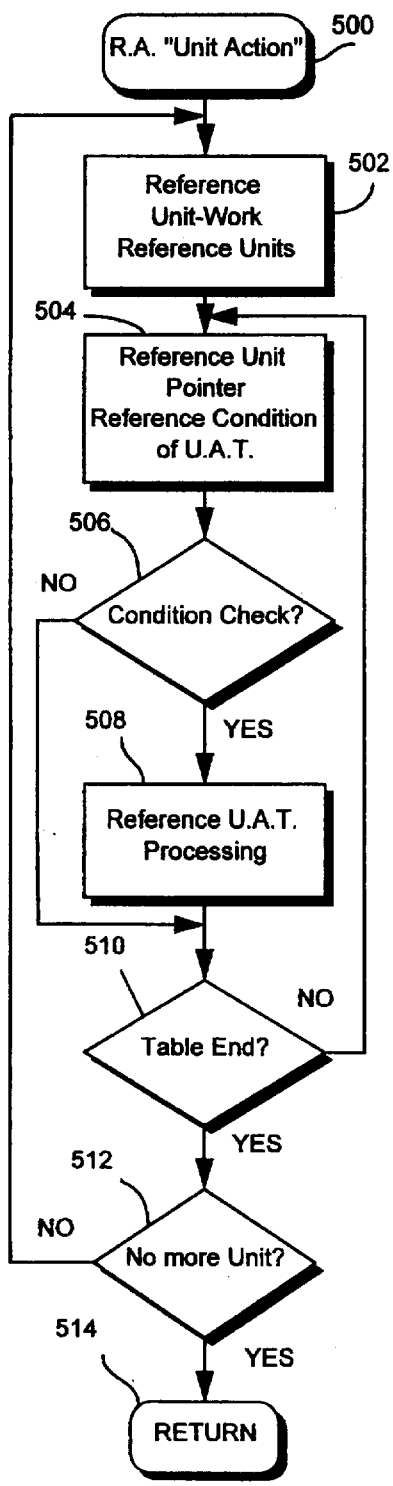
FIG. 43 is an exemplary "unit action" subroutine.

In accordance with the "unit action" subroutine shown in FIG. 43 (500), initially the routine references the unit data in the unit work area in FIG. 34 (502). Thereafter, the contents of the unit action table shown in FIG. 42 are processed by accessing the subroutine indicated by the routine address associated with each of the conditions (504). The unit action table may be modified by the user through the status editor using the display screen shown in FIG. 17. A check is thereafter made to determine whether a condition has been met (506). If the check at block 506 indicates that the condition has been met, then the process portion of the table in FIG. 42 is accessed to perform the associated processing such as, for example, move the turtle to the right (508). If the first condition associated with the unit action table is not met then the routine branches to block 510 where a check is made to determine whether the table is at an end by detecting the end mark. If the table has not ended, then the routine branches back to block 504 and processing continues. If the table is at an end, then a check is made at 512 to determine whether there are no more units to be processed. If this check does not reveal that there are no more units to be processed, the routine branches back to block 502. If there are no more units to be processed, then the routine returns back to the calling routine (514).

Figure 44:
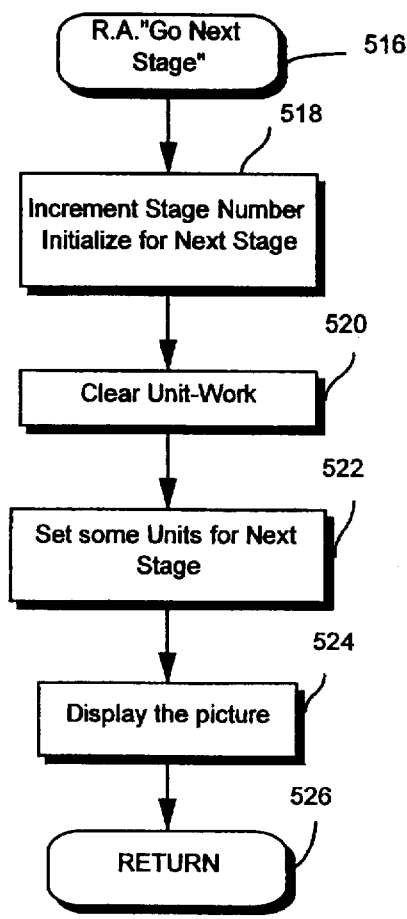
FIG. 44 is an exemplary "Go Next Stage" routine.
Figure 45:
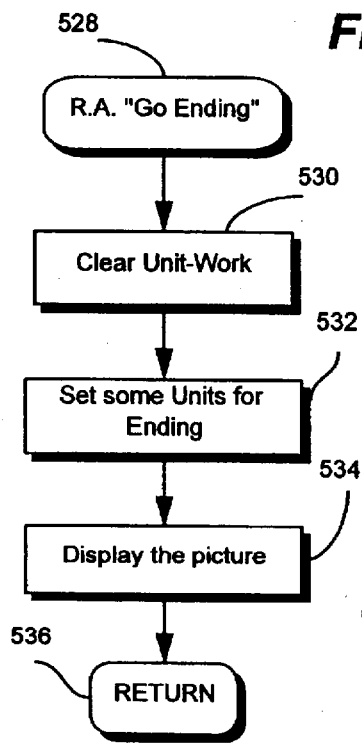
FIG. 45 is an exemplary "Go Ending" subroutine.

Turning back to the main table (in FIG. 39), if the condition Enemies Wipe-Out is detected, then the "Go Next Stage" routine is executed which is shown in FIG. 44 (516). Initially, the stage number is incremented to initialize for the next stage (518), Thereafter, the unit work area in FIG. 34 is cleared (520), some units are set and the background picture is displayed for the next stage (522). The next main routine is set to the next stage routine. Thereafter, the routine branches back to the calling routine (526). The last process shown in the main table is the "Go Ending" process which is executed upon detection of a friend's wipe-out condition. As shown in FIG. 45, when the Go Ending subroutine has been called (528) the unit work is cleared (530). Thereafter, units are set for ending (532) and the associated picture is displayed (534). The routine then branches back to the calling routine (536). The next main routine is set to the ending stage routine.

While the invention has been described in connection with what is presently considered to be the most practical and preferred embodiment, it is to be understood that the invention is not limited to the disclosed embodiment, but on the contrary, is intended to cover various modifications and arrangement included within the spirit and scope of the appended claims.

What is claimed is:

1. A method of developing a video game using an interactive computing system having a display screen, a dedicated game computer with game memory, a dedicated editing computer with editing memory, and interface circuitry for facilitating communications and data transfers between the game computer and the editing computer, comprising the steps of:

initiating play of a video game by executing in the game computer a corresponding video game program stored in the game memory where during play of the video game moving objects and background objects are displayed on a game playing region of the display screen;

a user identifying a moving object to be modified by pointing to one of the moving objects displayed in the game playing region of the display screen;

the editing computer monitoring operations of the game computer and initiating a break in play of the video game by stopping the video game program being executed by the game computer;

transferring by way of the interface circuits video game program information as currently configured including information pertaining to the one moving object displayed in the game playing region of the display screen to the editing computer;

the editing computer storing transferred video game program information in editing memory;

the user specifying a change to a characteristic of the identified moving object;

the editing computer modifying the transferred video game program information in response to the specified change;

transferring the modified video game program information by way of the interface circuitry from the editing memory to the game computer;

the game computer incorporating the modified video game program information to create a new video game program stored in the game memory; and resuming play of the video game by the game computer executing the new video game program.

2. A method of editing a video game according to claim 1, wherein the game memory is a cartridge memory further including the step of loading said video game whose execution is initiated into said computing system by inserting a cartridge memory into an external port of said computing system.

3. A method of editing a video game according to claim 1, further including the step of
loading said video game whose execution is initiated into said computing system from an external computing system via a modem.

4. A method of editing a video game according to claim 1, wherein said step of changing the video game includes the step of the editing computer detecting a user's identification of the moving object to be modified.

5. A method of editing a video game according to claim 4, further including the step of the editing computer displaying a moving object editing window for choosing an editing operation to perform relating to the user identified moving object.

6. A method of editing a video game according to claim 4, further including the step of changing a character pattern of said moving object.

7. A method of editing a video game according to claim 4, further including the step of changing an animation sequence associated with the user identified moving object.

8. A method of editing a video game according to claim 4, wherein the video game software includes a set of predetermined conditions each having a corresponding operation, the method further including the step of changing one of the predetermined conditions and the corresponding operation performed by the user identified moving object upon the detection of the one predetermined condition.

9. A method of editing a video game according to claim 4, further including the step of changing the pattern of movement associated with the user identified moving object.

10. A method of editing a video game according to claim 4, further including the step of changing the sounds associated with the user identified moving object.

11. A method of editing a video game according to claim 4, further including the step of the editing computer changing the game in response to the user identified moving object being detected in a predetermined condition.

12. A method of editing a video game according to claim 1, wherein said step of changing the video game includes the steps of the editing computer detecting a user's identification of the video game background for modification.

13. A method of editing a video game according to claim 12, further including the step of changing the background screen displayed at the point the video game was stopped.

14. A method of editing a video game according to claim 12, wherein the computer system further includes a dedicated sound computer, the method further including the step of changing the music associated with said background screen.

15. A method of editing a video game according to claim 12, further including the step of changing the background which will be displayed when a scrolling operation is performed.

16. A method of editing a video game according to claim 12, further including the step of displaying additional user selected background characters in association with a background screen displayed at the point the video game was stopped.

17. A method according to claim 1, wherein at the break in play, the game computer transfers control from the game program stored in the game memory to a program stored in another memory executed by the game computer to facilitate the transferring step.

18. A method in claim 1, wherein the information transferred between the computers includes graphics data, sound data, and program instructions relating to the one object being modified.

19. A method of editing a video game to create a new video game using an interactive computing system having a display screen a dedicated game computer with game memory, a dedicated editing computer with editing memory, and interface circuitry for facilitating communications and data transfers between the game computer and the editing computer, comprising the steps of:
loading model video game software to be modified by a user into the game memory of the game computer;
initiating play of the video game with the game computer executing the model video game software;
the editing computer monitoring operations for the game computer and stopping execution of the model video game software by the game computer at an appropriate point in the model video game software being executed;
transferring video game software pertaining to features of the video game to be modified by way of the interface circuitry to the editing memory;
the editing computer modifying the model video game software transferred;
transferring the modified video game software by way of the interface circuitry to the game memory; and
resuming play of the video game by the game computer executing the modified video game software.

20. A method of editing a video game according to claim 19, wherein said step of loading includes the step of transferring said model video game software from the editing memory to the game memory that is associated with an external memory cartridge which is removably connected to said computing system.

21. A method according to claim 19, wherein at the stop in play, the game computer transfers control from the game program stored in the game memory to a program stored in another memory executed by the game computer to facilitate the transferring step.

22. A method in claim 19, wherein the information transferred between the computers includes graphics data, sound data, and program instructions relating to the features of the video game being modified.

23. A method of editing a video game to create a new video game using an interactive computing system having an input device, at least one game playing device other than the input device, a display screen, a dedicated game computer with game memory, a dedicated editing computer with editing memory, and interface circuitry for facilitating communications and data transfers between the game computer and the editing computer, comprising the steps of:
initiating play of the video game by executing in the game computer video game software where a user moves at least one object on the display screen during game play using the game playing device;
using the input device, pointing to the at least one object in the displayed video game frame to be edited;
the editing computer monitoring operations of the game computer and initiating a break in play of the video game in response to the input device pointing to the at least one object in the displayed video game frame to be edited;
the editing computer stopping execution of video game software;
transferring by way of the interface circuitry a portion of the video game software as currently configured including information pertaining to the least one object to the editing computer;

the editing computer storing the transferred information in editing memory;

displaying a video game frame that the user desires to edit on the display screen displaying the at least one object;

changing an attribute associated with the object pointed to in the displayed game frame;

the editing computer incorporating the change into the video game software;

the editing computer transferring the changed video game software by way of the interface circuitry from the editing memory to the game computer;

the game computer integrating the changed video game software into the video game software stored in the game memory; and resuming play of the video game by the game computer executing the video game software as modified by the changed video game software.

24. A method of editing a video game according to claim 23, wherein said input device is a mouse and said predetermined signal is generated by depressing mouse switch.

25. A method according to claim 23, wherein at the break in play, the game computer transfers control from the game program stored in the game memory to a program stored in another memory executed by the game computer to facilitate the transferring step.

26. A method in claim 23, wherein the information transferred between the computers includes graphics data, sound data, and program instructions relating to the one object being changed.

27. A method of editing a video game program to create a new video game using a computing system having a display screen, an input device, a dedicated game computer with game memory, a dedicated editing computer with editing memory, and interface circuitry for facilitating communications and data transfers between the game computer and the editing computer, comprising the steps of:

loading a video game program to be edited into the game memory of the game computer;

the game computer executing the video game program and generating a display including background and moving objects, each object having one or more characteristics defined by the loaded video game program;

detecting a signal from the input device indicating an object currently displayed in a game playing region of the display screen for editing by a user;

in response to the detecting step, the editing computer stopping the video game program being executed by the game computer;

the game computer transferring by way of the interface circuitry a portion of the video game program as currently configured to the editing memory;

the editing computer storing the transferred video game program information in the editing memory;

the editing computer displaying an indication of a plurality of editorial options;

the user selecting one of the editorial options using the input device;

the editing computer, in response to indications received by the user from the input device modifying one of the characteristics of the indicated object to create a new characteristic for the indicated object that is different from the one or more characteristics for the indicated object defined by the transferred video game program information;

the editing computer transferring the modified video game program information by way of the interface circuitry from the editing memory to the game memory;

the game computer incorporating the modified video game program instructions and data to create a new video game program stored in the game memory; and resuming play of the video game by the game computer executing the new video game program.

28. A method of editing a video game according to claim 27, wherein the indicated object is an object that during game play moves across the display screen and the user indicates the moving object by pointing to the moving object on the display screen.

29. A method of editing a video game according to claim 28, wherein said displaying step includes the step of the editing computer displaying a moving object editing window for choosing an editing operation to perform relating to the user identified moving object.

30. A method of editing a video game according to claim 28, further including the step of the editing computer changing the graphic image defining character pattern of said moving object in response to selection of one of said editorial options.

31. A method of editing a video game according to claim 28, further including the step of the editing computer changing the animation sequence associated with the user identified moving object in response to selection of one of said editorial options.

32. A method of editing a video game according to claim 28, wherein the video game software includes a set of predetermined conditions each having a corresponding operation, the method further including the step of the editing computer changing one of the predetermined conditions and the corresponding operation performed by the user identified moving object upon the detection of a predetermined condition in response to selection of one of said editorial options.

33. A method of editing a video game according to claim 28, further including the step of the editing computer changing the pattern of movement associated with the user identified moving object in response to selection of one of said editorial options.

34. A method of editing a video game according to claim 28, further including the step of the editing computer changing the sounds associated with the user identified moving object in response to selection of one of said editorial options.

35. A method of editing a video game according to claim 28, further including the step of the editing computer changing the video game in response to the user identified moving object being detected in a predetermined condition in response to selection of one of said editorial options.

36. A method of editing a video game according to claim 27, further including the step of the editing computer changing the video game includes the steps of detecting a user's identification of the video game background for modification.

37. A method of editing a video game according to claim 27, further including the step of the editing computer changing the background screen displayed at the point the video game was stopped in response to selection of one of said editorial options.

38. A method of editing a video game according to claim 27, further including the step of the editing computer changing the music associated with said background screen in response to selection of one of said editorial options.

39. A method of editing a video game according to claim 27, further including the step of the editing computer changing the background which will be displayed when a scrolling operation is performed in response to selection of one of said editorial options.

40. A method of editing a video game according to claim 27, further including the step of the editing computer displaying additional user selected background characters in association with a displayed background screen in response to selection of one of said editorial options.

41. A method of editing a video game according to claim 27, wherein said input device is a mouse and said predetermined signal is generated by depressing a mouse switch.

42. A method according to claim 27, wherein at the stop in the video game program, the game computer transfers control from the game program stored in the game memory to a program stored in another memory executed by the game computer to facilitate the transferring step.

43. A method in claim 27, wherein the information transferred between the computers includes graphics data, sound data, and program instructions relating to the one object being changed.

44. A videographics program editing system for use in creating new videographics programs for generating displays on a display screen comprising:

a first processor for executing a videographics program that generates a sequence of displays on the display screen including one or more moving objects and one or more background objects;

an input device for permitting a user to command stopping the execution of said videographics program at a desired one of the sequence of displays, identify one of the objects in the one display, and select an editing operation that affects the identified object; and a second processor, responsive to the input device, to perform the selected editing operation on the videographics program; and interface circuitry facilitating communications and data transfer between the first and second processors, wherein the second processor monitors operations of the first processor and initiates a break in the execution of the videographics program in response to the user command, initiates transfer of a portion of the videographics program from the first processor by way of the interface circuitry, performs the selected editing operation on the transferred portion of the videographics program pertaining to at least the one object, and transfers the edited portion of the videographics program back to the first processor by way of the interface circuitry, and wherein the second processor resumes execution of the videographics program as edited by the second processor.

45. A videographics program editing system according to claim 44, further including at least one picture processing unit coupled to said first processor and said second processor for generating the sequence of displays.

46. A videographics program editing system according to claim 44, further including a removable cartridge having a read/write memory for storing said videographics program executed by said first processor.

47. A videographics program editing system according to claim 46, further including an external memory device removably coupled to said second processor for storing said videographics program and accessible by said second processor, said second processor being operable to access said videographics program and to initiate transfer of said videographics program to said removable cartridge.

48. A videographics program editing system according to claim 44, the interface circuitry further including:

a bus coupled to said first processor, and a memory device coupled to said bus for storing information from said bus, wherein said second processor is operable to monitor the contents of said memory device to determine when to stop the execution of said videographics program as a result of stopping the execution of said videographics program at the desired one of the sequence of displays.

49. A videographics program editing system according to claim 44, the interface circuitry further including:

a control register coupled to said second processor, a first memory coupled to said first processor, and a removable cartridge including a second memory coupled, in use, to said first processor, wherein said first processor is operable to initially execute instructions out of said first memory and to subsequently execute instructions out of said second memory depending upon the state of said control register.

50. The videographics program editing system according to claim 44, further comprising:

program stop circuitry which determines an appropriate time to stop execution of the videographics program.

51. The videographics program editing system according to claim 50, wherein the program stop circuitry stops execution of the videographics program when the second processor is about to read a next instruction to be executed.

52. A method of editing a video game program using a computing system having a display screen, a dedicated game computer with game memory, a dedicated editing computer with editing memory, and interface circuitry for facilitating communications and data transfers between the game computer and the editing computer, and an input device comprising the steps of:

generating a first display on said display screen in response to execution of the video game program by the game computer including moving objects and background objects that may be selected for modification;

the editing computer monitoring operations of the game computer and causing, in response to selection by a user with said input device of one of the moving and background objects in the first display, transfer by way of the interface circuitry at least a significant portion of the video game program as currently configured including information pertaining to the least one object to the editing computer;

the editing computer storing the transferred information in editing memory, generating a second display on said display screen identifying the selected object, and providing plural editing options for editing the selected object;

the editing computer generating a third display on said display screen corresponding to one of the plural editing options selected by the user from the second display providing a variety of editing tools for implementing editing operations that affect the selected object associated with the selected editing option;

the editing computer incorporating edited object into the video game program; and the editing computer transferring the video game as edited to the game computer by way of the interface circuitry.

53. A method of editing a video game according to claim 52, further including the step of loading said video game to be edited into said computing system by inserting a memory device into an external port of said computing system.

54. A method of editing a video game according to claim 52, further including the steps of loading model video game software to be modified by the user, and initiating the execution of the model video game software to be modified.

55. A method of editing a video game according to claim 52, further including the steps of the editing computer stopping the execution of said video game by the game computer and displaying a video game frame including an object that the user desires to edit on said display screen and detecting when a user generates a predetermined signal using said input device specifying the identified object on said display screen.

56. A method of editing a video game according to claim 52, wherein said input device is a mouse and the predetermined signal is generated when the user points on said display screen to the identified object and presses a button on the mouse.

57. A method of editing a video game according to claim 52, wherein said identified object is a moving object.

58. A method of editing a video game according to claim 57, further including the step of displaying a moving object editing window for choosing an editing operation to perform relating to the user identified moving object.

59. A method of editing a video game according to claim 57, further including the step of changing the character pattern of said moving object using said second display.

60. A method of editing a video game according to claim 57, further including the step of changing animation sequence associated with the user identified moving object character using said second display.

61. A method of editing a video game according to claim 57, wherein the video game program includes a set of predetermined conditions each having a corresponding operation, the method further including the step of changing one of the predetermined conditions and the corresponding operation performed by the user identified moving object upon the detection of the one predetermined condition.

62. A method of editing a video game according to claim 57, further including the step of changing the pattern of movement associated with the user identified moving object character.

63. A method of editing a video game according to claim 57, further including the step of changing the sounds associated with the user identified moving object character.

64. A method of editing a video game according to claim 57, further including the step of changing the impact on the game associated with the user identified moving object being detected in a predetermined condition.

65. A method of editing a video game according to claim 64, further including the step of changing the music associated with said background screen.

66. A method of editing a video game according to claim 64, further including the step of changing the background which will be display when a scrolling operation is performed.

67. A method of editing a video game according to claim 64, further including the step of displaying additional user selected background characters in association with a background screen.

68. A method of editing a view game according to claim 57, wherein said selected object is a video game background screen.

69. A method in claim 52, wherein the information transferred between the computers includes graphics data, sound data, and program instructions relating to the one object being changed.

70. A method of editing a sequence of display frames generated in response to execution of a graphics program using an interactive computing system having a display screen, a first computer, a second computer, and interface circuitry for facilitating communications and data transfers between the first computer and the second computer, said first computer executing said graphics program and generating a sequence of display frames on said display screen comprising the steps of:

initiating the execution of said graphics program by the first computer to generate a sequence of display frames;

the second computer commanding the first computer to stop the execution of said graphics program at a desired editing point in one of the sequence of display frames;

transferring by way of the interface circuitry a substantial portion of said graphics program as currently configured to the second computer;

the second computer storing the transferred graphics program information;

a user selecting a feature displayed in the one display frame;

the user indicating one or more changes to the selected feature in the one display frame;

the second computer modifying said graphics program to incorporate the one or more changes in the graphics program information;

transferring the modified graphics program by way of the interface circuitry to the first computer; and the first computer resuming execution of said graphics program as modified from the point at which execution of said graphics program was stopped at the one display frame.

71. A method of editing according to claim 70, wherein said step of stopping the execution of said videographics program includes the step of detecting when a user generates a predetermined signal selecting the feature to be changed using an input device.

72. A method of editing according to claim 70, wherein said step of changing includes the steps of detecting a user's identification of a character displayed on said display screen to be modified.

73. A method of editing according to claim 72, further including in response to the detecting step, the step of displaying an editing window relating to the user identified character for choosing an editing operation to change an aspect of the user identified character.

74. A method of editing according to claim 72, further including the step of changing the character pattern of said identified character.

75. A method of editing according to claim 72, further including the step of changing the animation sequence associated with the user identified character.

76. A method of editing according to claim 72, further including the step of changing the pattern of movement associated with the user identified character.

77. A method of editing according to claim 70, further including the step of changing the audio associated with said display frame.

78. A method of editing according to claim 70, wherein said step of changing the currently displayed frame includes the step of detecting a user's identification of the display frame background for modification.

79. A method of editing according to claim 78, further including the step of changing the background of the display frame at the point the video game was stopped.

80. A method according to claim 70, wherein at the stop in the graphics program, the first computer transfers control from the graphics program to another program executed by the first computer to facilitate the transferring step.

81. A method in claim 70, wherein the information transferred between the computers includes graphics data, sound data, and program instructions relating to the feature being changed.

82. A method of creating a unique sequence of display frames associated with a graphics program using a computing system having a display screen for executing said graphics program and generating a sequence of display frames, including a first computer, a second computer, and interface circuitry for facilitating communications and display transfers between the first computer and the second computer, comprising the steps of:

loading the graphics program into said computing system;

the first computer executing the graphics program to generate a sequence of display frames on said display screen;

the second computer monitoring the operation of the first computer and detecting generation of a first signal initiated by the user indicating that a currently displayed frame is to be edited;

transferring by way of the interface circuitry a substantial portion of the graphics program as currently configured to the second computer;

the second computer storing the transferred graphics program information;

the second computer detecting generation of a second signal initiated by the user indicating that a displayed feature in the currently displayed frame is to be edited;

in response to the detecting step, the second computer displaying to the user an indication of a plurality of editing options;

the user selecting one of the editing options and editing the displayed feature;

the second computer modifying said graphics program to incorporate the edited feature;

transferring the modified graphics program by way of the interface circuitry to the first computer; and the first computer continuing execution of the graphics program as modified.

83. A method of editing according to claim 82, further including the step of the editing computer detecting a user's identification of a displayed character to be edited.

84. A method of editing according to claim 83, wherein said displaying step includes the editing computer displaying a character editing window from which the user chooses the editing operation to perform relating to the user identified character.

85. A method of editing according to claim 83, further including the step of the editing computer changing the graphic image defining character pattern of said user identified character in response to selection of one of said editorial options.

86. A method of editing according to claim 83, further including the step of the editing computer changing the pattern of movement associated with the user identified character in response to selection of one of said editing options.

87. A method of editing according to claim 82, further including the step of the editing computer detecting a user's identification of the current display screens background for modification.

88. A method of editing according to claim 87, further including the step of the editing computer changing the audio associated with said display frame in response to selection of one of said editing options.

89. A method according to claim 82, wherein before transferring the substantial portion of the graphics program to the second computer, the first computer transfers control from the graphics program to another program executed by the first computer to facilitate the transferring step.

90. A method in claim 82, wherein the information transferred between the computers includes graphics data, sound data, and program instructions relating to the feature being changed.

* * * * *